United States Patent
Haynie et al.

(10) Patent No.: US 8,065,219 B2
(45) Date of Patent: Nov. 22, 2011

(54) SYSTEM ARCHITECTURE AND METHOD FOR ENERGY INDUSTRY TRADING AND TRANSACTION MANAGEMENT

(75) Inventors: Cynthia Haynie, Houston, TX (US); Kevin Trevor Mossop, Houston, TX (US); John F Pletka, Alpharetta, GA (US); Benjamin Curfman, Houston, TX (US); Daryl A Pever, Houston, TX (US); Leslie H Danielson, Missouri City, TX (US); Shannon Hugetz, Houston, TX (US); Joan Gilmer, Houston, TX (US); Sunny Stockton, Houston, TX (US); Robert Michael Alexander, League City, TX (US); Philip J Savoie, Pearland, TX (US); Nitin Kadam, Houston, TX (US); Josiah Hamilton, Houston, TX (US)

(73) Assignee: SunGard Energy Systems Inc., Houston, TX (US)

( * ) Notice: Subject to any disclaimer, the term of this patent is extended or adjusted under 35 U.S.C. 154(b) by 1449 days.

(21) Appl. No.: 10/480,335

(22) PCT Filed: Jun. 13, 2002

(86) PCT No.: PCT/US02/18781
§ 371 (c)(1),
(2), (4) Date: Aug. 10, 2005

(87) PCT Pub. No.: WO02/101510
PCT Pub. Date: Dec. 19, 2002

(65) Prior Publication Data
US 2006/0036448 A1    Feb. 16, 2006

Related U.S. Application Data

(60) Provisional application No. 60/297,745, filed on Jun. 13, 2001.

(51) Int. Cl.
*G06Q 40/00* (2006.01)
(52) U.S. Cl. .......................................................... 705/37
(58) Field of Classification Search ............... 705/35–45
See application file for complete search history.

(56) References Cited

U.S. PATENT DOCUMENTS

| | | | |
|---|---|---|---|
| 5,457,797 A | 10/1995 | Butterworth et al. | 395/650 |
| 5,794,212 A | 8/1998 | Mistr, Jr. | 705/26 |
| 5,893,079 A | 4/1999 | Cwenar | 705/36 |
| 6,115,698 A | 9/2000 | Tuck et al. | 705/37 |
| 6,236,977 B1 | 5/2001 | Verba et al. | 705/10 |
| 7,340,426 B1 * | 3/2008 | Frutuoso et al. | 705/37 |
| 2002/0019802 A1 * | 2/2002 | Malme et al. | 705/37 |

* cited by examiner

*Primary Examiner* — Rajesh Khattar
(74) *Attorney, Agent, or Firm* — Woodcock Washburn LLP

(57) ABSTRACT

A system architecture and method for energy industry trading and transaction management includes a business logic server-based layer and a database layer. The business logic server-based layer includes a parameter-based configuration of at least one business logic service. The business logic service is configurable to enable a deployment of the system to be compatible with a respective business practice of at least one client customer. The at least one business logic service is configured to support energy trading and transaction management and to utilize business rules operable on an event basis for processing via an API at least one of energy trading and transaction management data, including data specific to the at least one client customer. The database layer operatively connects to the business logic layer for storing the data processed by the business logic layer in a database.

52 Claims, 39 Drawing Sheets

| REMOTE METHOD CALL | | |
|---|---|---|
| Purpose: | Client sends this message when he wants to execute a remote method | |
| Subject: | RPC | |
| *Field Name* | *Data Type* | *Description* |
| uid | String | *A string that uniquely identifies the user. This field will be required for every message published on this subject. This should be obtained by calling a logon api.* |
| id | String | *This parameter is* OPTIONAL. *If included and is not "", it represents an actual instance of a remote bean. This id will be used for stateful session beans to tie the client to the actual remote object.* |
| obj | String | *This should be the EJB object name without any prefix decoration* |
| met | String | *This is the method name you want to call* |
| p | Object | *There are 0..n of these representing the parameters to the method. Ideally for performance reasons, the object type in the method should match the actual parameter type in the method. Conversion will be supplied if the types do not match, and strings should always be valid* |

FIG. 6

| REMOTE METHOD CALL RESPONSE | | |
|---|---|---|
| Purpose: | The middleware will return this message to the calling client | |
| Subject: | Message reply -- no subject | |
| *Field Name* | *Data Type* | *Description* |
| status | *String* | *"OK" if it succeeded, "FAILED" if the call failed* |
| reason | *String* | *This parameter is OPTIONAL. It will only be present if the status = "FAILED". This will be the String representation of the remote exception* |
| result | *Object* | *This is the object returned by the method call. The datatype of this field should match the datatype of the return value of the method* |

FIG. 7

| CREATE REMOTE OBJECT | | |
|---|---|---|
| Purpose: | If the client wants to create a remote object that requires conversational support, (Statefull session beans for example), he will make this call. The reply message will be the same as the RPC call, with the result field being a String that contains the remote Object ID | |
| Subject: | CREATEOBJECT | |
| *Field Name* | *Data Type* | *Description* |
| uid | String | *A string that uniquely identifies the user. This field will be required for every message published on this subject. This should be obtained by calling a logon api.* |
| obj | String | *This should be the EJB object name without any prefix decoration* |

FIG. 8

| DealHeader |
|---|
| dealHeaderId |

| Deal |
|---|
| dealId
dealHeaderId
dealName
dealStatus |

| DealLocation |
|---|
| dealLocationId
pointId
dealHeaderId |

| DealParty |
|---|
| dealPartyId
businessAssociateId
dealHeaderId |

| Point |
|---|
| pointID
pointName |

| BusinessAssociate |
|---|
| businessAssociateId
businessAssoicateName |

FIG. 10

JEDI ▶ Trading    Make Deal

| Make Deal | Manage Deal | Contract Administration | confirm Deals | Cash Position | Pricing | Portfolio | Service Type |

Search Criteria     Select User Defined Search     Search

Portfolio
- Portfolio A
- Portfolio B

| Deal Group | Deal | Status | Begin Date | End Date | Type | Level | |
|---|---|---|---|---|---|---|---|
| ACME P1 | ACME P1 | Approved | 01/01/2002 | 01/31/2003 | Purchase | Firm | A |
| ACME P2 | ACME P2 | Approved | 01/01/2002 | 01/31/2003 | Purchase | Firm | A |
| ACME S1 | ACME S1 | Approved | 01/01/2002 | 01/31/2003 | Sales | Firm | A |
| ACME S2 | ACME S2 | Approved | 01/01/2002 | 01/31/2003 | Sales | Firm | A |
| CGPurchaseDeal | CGPurchaseDeal | Approved | 06/01/2001 | 06/01/2002 | Purchase | Firm | A |
| Commodity D-56 | Commodity D-56 | Approved | 01/01/2002 | 01/31/2002 | Sales | Firm | S |
| Commodity D-57 | Commodity D-57 | Approved | 01/01/2002 | 01/31/2002 | Sales | Firm | S |
| Commodity D-58 | Commodity D-58 | Approved | 01/01/2002 | 01/31/2002 | Sales | Firm | S |

Quick Deal Entry

| Deal Group | ACME P1 | Type | Purchase | Level | Firm | Term Code | Spot |
| Accounting Company | ACME CORP | Trader | | Begin Date | 01/01/2002 | End Date | 01/31/2003 |
| Counterparty | CROSSPIPE | Contact | | Contract | | Price | 5.00 | USD |
| Facility | ROCKY | Location | | Point | RPP Rec 1 | Quantity | 500.0 | Dth |
| Broker | | Broker Contact | | Region | | Broker Fee | | |
| Classification | Deal | | | | | | | |

Full Create    Save As New    Save    New

| Unit | Receipt | Delivery | Fuel Rate |
|------|---------|----------|-----------|
| Dth | 1000/1.050 Btu | 990/1.001 Btu | 1 |
| Mcf | 952 | 989 | -3.9% |

Main Window: Operations

Nomination Planning

Accounting Company | display only | Facility | display only | Nomination Period | Cal Box | to | Cal Box | Flow Period | Spin Edit | Unit of Measure | Combo

Supply

| Deal ID | Start | End | Term Ind | Supplier | Facility | Receipt Location | Rank | Deal QTY | Avail QTY |
|---|---|---|---|---|---|---|---|---|---|
| 1 | | | | S1 | PipeA | Rec1 | 200 | 100 | 100 |
| | | | | | | Rec2 | 200 | 5 | 5 |
| | | | | | | Up3 | 200 | 5 | 5 |
| 2 | | | | S2 | PipeA | Rec1 | 500 | 50 | 50 |
| 3 | | | | S3 | PipeB | Rec4 | 700 | 8 | 8 |
| | | | | | PipeA | Rec5 | 700 | 10 | 10 |
| | | | | | | Up4 | 700 | 3 | 3 |
| | | | | | | Up5 | 700 | 7 | 7 |

Market

| Avail QTY | Deal QTY | Rank | Delivery Location | Facility | Market | Term Ind | Start | End | Deal ID |
|---|---|---|---|---|---|---|---|---|---|
| 15 | 15 | 600 | Del1 | PipeA | PartyD | | | | 5 |
| | | | K100 | | | | | | |
| | | | K200 | | | | | | |
| | | | K300 | | | | | | |
| | | | P100 | | | | | | |
| | | | P200 | | | | | | |
| | | | P30 | | | | | | |
| 119 | 119 | 500 | Del3 | PipeA | PartyD | | | | 6 |
| 24 | 24 | 500 | Del4 | | | | | | |
| 8 | 8 | 300 | Del5 | Pipe B | PartyF | | | | 7 |

WhiteBoard Detail

Pipeline: NOVA
Gas Day: Sept 23, 1999
Display UOM: GJ

* = "Swing Deals"

| Purchase | | | | Converted | | Sales | | | |
|---|---|---|---|---|---|---|---|---|---|
| Deal ID | Price | Quantity | Flow Unit | | Flow Unit | Quantity | Price | Deal ID | |
| P-AMACO-PET-0004 | 1.7975 | 5,000 | Dth | 5,275 | GJ | (5,000) | 2.1235 | S-ALLIANCE-0015 * |
| P-AMACO-PET-0036 * | CGPR | 15,825 | GJ | 15,825 | GJ | (5,000) | 2.4560 | S-AQUILA-0088 |
| P-AQUILA-0055 * | CGPR | 1,500 | GJ | 1,500 | GJ | (5,000) | CGPR | S-COAST-0011 |
| P-DUKECAN-0026 | 2.2810 | 5,000 | GJ | 5,000 | GJ | (15,825) | CGPR | S-DUKE-0126 |
| P-ENGAGE-0009 * | CGPR | 2,853 | GJ | 3,010 | GJ | (5,000) | 2.9745 | S-TRANSCANADA-0304 * |
| P-TRANSCANADA-0066 | CGPR | 1,500 | GJ | 1,500 | GJ | 0 | 0.0000 | S-TRANSCANADA-0306 |
| | | | | | GJ | (5,000) | CGPR | S-WESTCOAST-0046 |
| | | | | | GJ | (2,000) | CGPR | S-WHITTE-0084 * |
| | | | | | GJ | (500) | 3.0795 | S-WHITTE-0087 |
| Deal Sub Total | | | | 32,110 | | (43,325) | | Deal Sub Total | |
| TETCO P-Interconnect | | 2,950 | Dth | 3,115 | GJ | (1,000) | | S-Interconnect | Texas Gas |
| ANR P-Interconnect | | 11,246 | Dth | 11,865 | | | | | |
| Interconnect Sub Total | | | | 14,980 | | (1,000) | | Interconnect Sub Total | |
| Total Purchases | | | | 47,090 | | (44,325) | | Total Sales | |
| | | Difference | | 2,765 | | | | | |

FIG. 35

| Deal ID | Volume | | Price/Index | | Points | | | Service | Spot/Term | DealMaker |
|---|---|---|---|---|---|---|---|---|---|---|
| | | Flow Unit | Currency | Curr Unit | | Area | Region | | | |
| P-MFS-0001 | 100000 | Dth | USD | 1.35 Dth | | 6 ... | | | | |

FIG. 36

WhiteBoard Summary

Gas Day: Sept 23, 1999   Msgs: [ ]   [Details]

| Pipeline | Unit of Mass | Total Diff | Baseload | | | Swing | | | Interconnect | | |
|---|---|---|---|---|---|---|---|---|---|---|---|
| | | | Purch | Sales | Diff | Purch | Sales | Diff | Purch | Sales | Diff |
| Nova | GJ | 2,765 | 27,600 | (31,325) | (3,725) | 4,510 | (12,000) | (7,490) | 14,980 | (1,000) | 13,980 |
| NWP | Dth | 0 | 130,500 | (150,000) | (19,500) | 22,040 | 0 | 22,040 | 4,960 | (7,500) | (2,540) |
| Pipeline... | Dth | ... | ... | ... | ... | ... | ... | ... | ... | ... | ... |
| Pipeline... | GJ | ... | ... | ... | ... | ... | ... | ... | ... | ... | ... |
| Pipeline... | GJ | ... | ... | ... | ... | ... | ... | ... | ... | ... | ... |

Total Dth
Total GJ

FIG. 37

| Column Name | Data Type | Length | PK | FK | Null | Default Val | Description |
| --- | --- | --- | --- | --- | --- | --- | --- |
| ItemId | Numeric | 10 | Y | N | N | | A unique ID Key representing a word or phrase that needs to be translated. |
| LanguageId | Numeric | 4 | Y | N | N | | A unique ID Key representing a language that can be translated to. |
| TermSetId | Numeric | 4 | Y | N | N | | A unique ID Key representing a specific set of terms that can override the base translation of different items in a language. (Value of zero indicates default terms for a language) |
| Translation | VarChar | 255 | N | N | N | | Translation to be returned. |
| PriorityKey | Numeric | 8 | N | N | N | | LanguageId * 10000 + TermSetId |

FIG. 38

| Column Name | Data Type | Length | PK | FK | Null | Default Val | Description |
| --- | --- | --- | --- | --- | --- | --- | --- |
| SystemUserId | Numeric | 4 | Y | Y | N | | A unique ID Key representing a single user |
| LanguageId | Numeric | 4 | N | Y | N | | A unique ID Key representing a language that can be translated to. |
| TermSetId | Numeric | 4 | N | Y | N | | A unique ID Key representing a specific set of terms that can override the base translation of different items in a language. (Value of zero indicates default terms for a language) |

FIG. 39

| Index Attribute Table | | | |
|---|---|---|---|
| Attribute Names | Required | Data Rules | Default Value |
| Index Short Name | Y | Unique | |
| Index Name | Y | Unique | |
| Description | N | | |
| Publication Name | Y | Existing Publication | |
| Publication Frequency | Y | Valid Frequency (Ex: Monthly, Weekly, Daily) | |
| Commodity Type | Y | Valid Commodity Type | |
| Currency | Y | Valid Currency | |
| Currency Unit | Y | Valid Currency Unit | |
| Begin Date | Y | Valid Date | |
| End Date | Y | Valid Date | |

| FIG. 41A |
| FIG. 41B |
| FIG. 41C |

| Ex | Description | Qty Type | Pattern | Qty Unit | Flow Rate | Pattern Detail | Max Qty | Min Qty | Min Temp | Max Temp | Load Factor (LF) | Percent | Flow Rate |
|---|---|---|---|---|---|---|---|---|---|---|---|---|---|
| 1 | Standard Gas Energy Deal | MDQ | RTC | Dth | Day | RTC | 10,000 | 10,000 | | | | | |
| 2 | Standard Gas Volume Deal | MDQ | RTC | Mcf | Day | RTC | 10,000 | 10,000 | | | | | |
| 3 | Gas Energy Deal - Monthly | MDQ | RTC | Dth | Month | RTC | 10,000 | 10,000 | | | | | |
| 4 | Gas Energy Deal w/ Min and Max | MDQ | RTC | Dth | Day | RTC | 10,000 | 8,000 | | | | | |
|  |  | EXP | RTC | Dth | Day | RTC | 9,300 | 9,300 | | | | | |
| 5 | Gas Energy Deal w/ Min Daily LF | MDQ | RTC | Dth | Day | RTC | 10,000 | 10,000 | | | MIN | 80% | Day |
| 6 | Gas Energy Deal w/ Min Annual LF | MDQ | RTC | Dth | Day | RTC | 10,000 | 10,000 | | | MIN | 90% | Year |
| 7 | Gas Energy Deal w/ 20% Tolerance | MDQ | RTC | Dth | Day | RTC | 10,000 | 10,000 | | | MAX | 120% | Day |
|  |  |  |  |  |  |  |  |  | | | MIN | 80% | Day |
| 8 | Gas Energy Deal w/ Daily & Monthly Quantities | MDQ | RTC | Dth | Day | RTC | 1,000 | 1,000 | | | | | |
|  |  | MMQ | RTC | Dth | Month | RTC | 10,000 | 10,000 | | | | | |
| 9 | Gas Energy Deal w/ Daily & Annual Quantities | MDQ | RTC | Dth | Day | RTC | 100 | 100 | | | | | |
|  |  | MAQ | RTC | Dth | Year | RTC | 35,000 | 35,000 | | | | | |
| 10 | Gas Energy Deal w/ Daily Tolerance + Monthly & Annual LFs | MDQ | RTC | Dth | Day | RTC | 10,000 | 10,000 | | | MAX | 105% | Day |
|  |  |  |  |  |  |  |  |  | | | MIN | 95% | Day |
|  |  |  |  |  |  |  |  |  | | | MIN | 90% | Month |
|  |  |  |  |  |  |  |  |  | | | MAX | 110% | Year |

FIG. 41A

| | | | | | | | | | | | | |
|---|---|---|---|---|---|---|---|---|---|---|---|---|
| 11 | European Gas Energy Deal w/ "Weather Options" | MDQ | RTC | Dth | Day | RTC | 10,000 | 10,000 | 50 | | | | |
| | | | | | | RTC | 12,000 | 12,000 | 40 | 50 | | | |
| | | | | | | RTC | 15,000 | 15,000 | | 40 | | | |
| | | | | | | | | | | | | | |
| 12 | European Gas OffPeak Deal | MDQ | OffPeak | Dth | Hour | S-S 0-24 | 500 | 500 | | | | | |
| | | | | | | M-F 0-8 | 600 | 600 | | | | | |
| | | | | | | M-F 17-24 | 600 | 600 | | | | | |
| | | | | | | Holidays 0-24 | 500 | 500 | | | | | |
| 13 | Power Peak Deal | MDQ | Peak | MWh | Hour | M-F 8-17 | 100 | 100 | | | | | |
| 14 | Power OffPeak Deal | MDQ | OffPeak | MWh | Hour | S-S 0-24 | 100 | 100 | | | | | |
| | | | | | | M-F 0-8 | 100 | 100 | | | | | |
| | | | | | | M-F 17-24 | 100 | 100 | | | | | |
| | | | | | | Holidays 0-24 | 100 | 100 | | | | | |

FIG. 41B

| | | | | | | | | | | |
|---|---|---|---|---|---|---|---|---|---|---|
| 15 | Daily Quantity captured by hour | MDQ | 24H | Dth | Day | 0-1 | 10,000 | 10,000 | | | |
| | | | | | | 1-2 | 10,000 | 10,000 | | | |
| | | | | | | 2-3 | 10,000 | 10,000 | | | |
| | | | | | | 3-4 | 10,000 | 10,000 | | | |
| | | | | | | 4-5 | 10,000 | 10,000 | | | |
| | | | | | | 5-6 | 10,000 | 10,000 | | | |
| | | | | | | 6-7 | 10,000 | 10,000 | | | |
| | | | | | | 7-8 | 10,000 | 10,000 | | | |
| | | | | | | 8-9 | 10,000 | 10,000 | | | |
| | | | | | | 9-10 | 10,000 | 10,000 | | | |
| | | | | | | 10-11 | 10,000 | 10,000 | | | |
| | | | | | | 11-12 | 10,000 | 10,000 | | | |
| | | | | | | 12-13 | 10,000 | 10,000 | | | |
| | | | | | | 13-14 | 10,000 | 10,000 | | | |
| | | | | | | 14-15 | 10,000 | 10,000 | | | |
| | | | | | | 15-16 | 10,000 | 10,000 | | | |
| | | | | | | 16-17 | 10,000 | 10,000 | | | |
| | | | | | | 17-18 | 10,000 | 10,000 | | | |
| | | | | | | 18-19 | 10,000 | 10,000 | | | |
| | | | | | | 19-20 | 10,000 | 10,000 | | | |
| | | | | | | 20-21 | 10,000 | 10,000 | | | |
| | | | | | | 21-22 | 10,000 | 10,000 | | | |
| | | | | | | 22-23 | 10,000 | 10,000 | | | |
| | | | | | | 23-24 | 10,000 | 10,000 | | | |
| 17 | Hourly gas example with qty stated as daily flow rates | MDQ | DayBy Hour | Dth | Day | 0-9 | 72,000 | 72,000 | | | |
| | | | | | | 9-19 | 24,000 | 24,000 | | | |
| | | | | | | 19-22 | 48,000 | 48,000 | | | |
| | | | | | | 22-24 | 72,000 | 72,000 | | | |
| 18 | Typical hourly gas example | MDQ | Hourby Hour | Dth | Hour | 0-9 | 3,000 | 3,000 | | | |
| | | | | | | 9-19 | 1,000 | 1,000 | | | |
| | | | | | | 19-22 | 2,000 | 2,000 | | | |
| | | | | | | 22-24 | 3,000 | 3,000 | | | |
| 19 | Daily gas example with qty stated as monthly flow rate | MDQ | RTC | Dth | Month | RTC | 31,000 | 31,000 | | | |

FIG. 41C

SYSTEM ARCHITECTURE AND METHOD FOR ENERGY INDUSTRY TRADING AND TRANSACTION MANAGEMENT

This application claims the benefit of the earlier filed provisional application Ser. No. 60/297,745, filed Jun. 13, 2001, the disclosure of which is incorporated by reference.

BACKGROUND

Over the past several years, it has become apparent that the computing architectures upon which a business is based cannot be closed or proprietary if the business is going to have a chance of surviving. Since no dominant software vendor has emerged within the energy industry, the typical energy company has adopted a "best of breed" approach to fulfilling its technology needs. While this approach sounds good in theory, the end result has been a jumble of systems that do not communicate and which force users to enter duplicate data in multiple databases in multiple formats.

In the energy trading software market, existing products suffer from a number of limitations. The limitations include an inability to readily adapt to a changing business environment, for example, with respect to hourly, regulatory compliance. In addition, existing products suffer from limited extensibility. For example, the traditional gas marketing software model couples contracts and deals with accounting via multiple separate operations for purchase, pooling, transportation, imbalance, sale, storage, and inventory.

The markets for pipeline and gas marketing systems are rapidly changing. Present products are unable to satisfy the needs of the new markets. Demands for new functionality from customers representing international markets (primarily European) are continuously placing more pressure on present systems.

Accordingly, it would be desirable to provide a method and system architecture to overcome the problems in the art.

It would also be desirable to provide an energy trading transaction management system and software having major functional additions in the areas of contracts, deals and pricing, operations, and accounting.

In addition, it would be desirable to provide an energy trading transaction management system and software that includes technical/architectural opportunities with respect to scalability, being web based, and providing integration.

SUMMARY

According to one embodiment, a system architecture for energy industry trading and transaction management includes a business logic server-based layer and a database layer. The business logic server-based layer includes a parameter-based configuration of at least one business logic service. The business logic service is configurable to enable a deployment of the system to be compatible with a respective business practice of at least one client customer. The at least one business logic service is configured to support energy trading and transaction management and to utilize business rules operable on an event basis for processing via an API at least one of energy trading and transaction management data, including data specific to the at least one client customer. The database layer operatively connects to the business logic layer for storing the data processed by the business logic layer in a database.

BRIEF DESCRIPTION OF THE DRAWINGS

FIG. 6 is a table definition for a remote method call according to an embodiment of the present disclosure;

FIG. 7 is a table definition for a remote method call response according to an embodiment of the present disclosure;

FIG. 8 is a table definition for creating a remote object according to an embodiment of the present disclosure;

FIG. 10 illustrates various header tables of deal objects according to an embodiment of the present disclosure;

FIG. 12, 13, 14, 15 are exemplary screen views of various modules of the Gas Marketing Business Process according to one embodiment of the present disclosure;

FIG. 24 is a screen view of the operations screen in further detail;

FIG. 25 is a screen view of the operations screen in further detail;

FIGS. 26, 27, 28 include a screen view of the operations screen of FIG. 25 in further detail;

Figure 29:
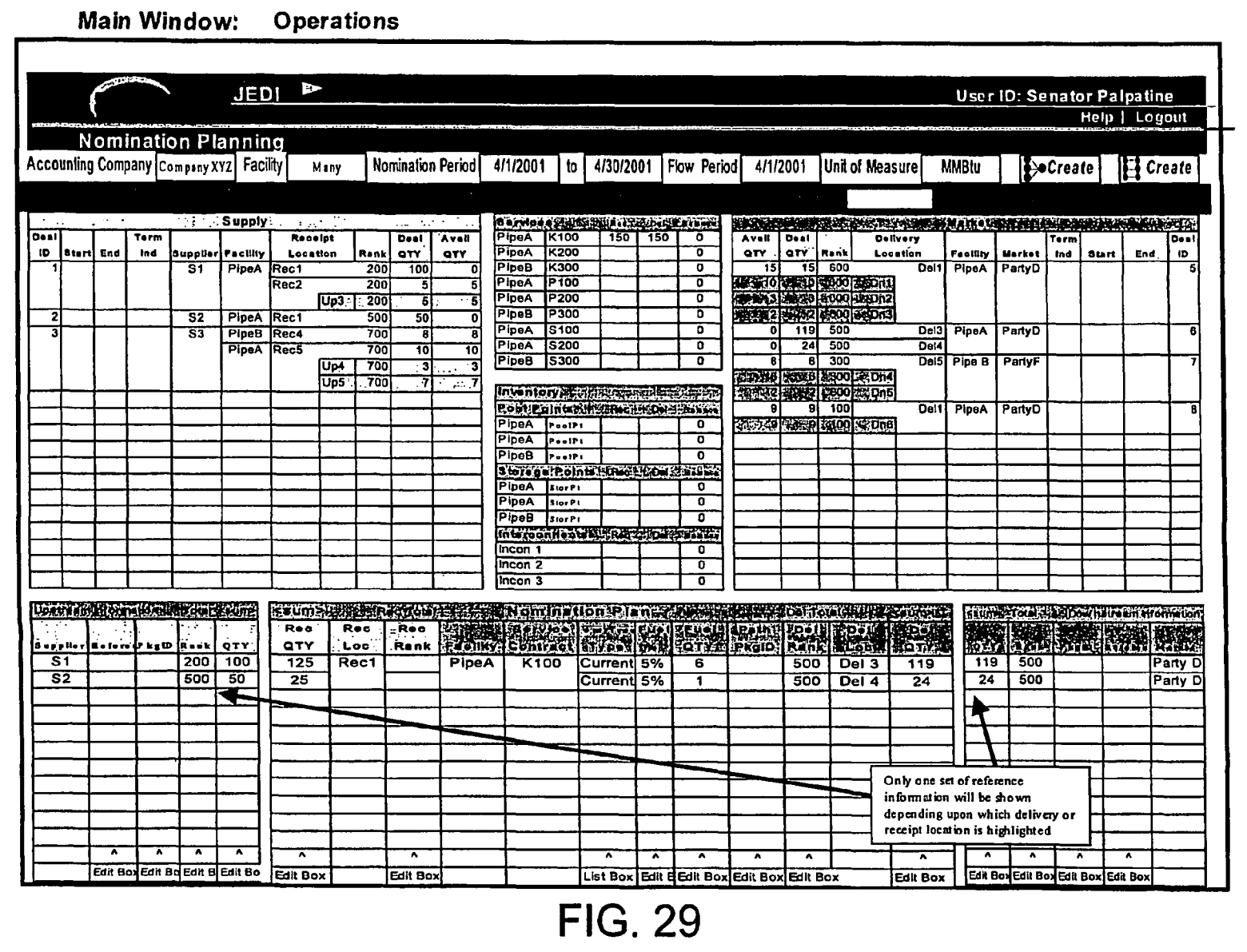

FIG. 29 is a screen view of the operations screen of FIG. 25 in further detail;

FIG. 30 is a screen view of the operations screen of FIG. 25 showing additional nominations detail;

FIG. 31 is a screen view of the operations screen of FIG. 25 showing additional nominations detail;

FIG. 32 is a screen view of the operations screen of FIG. 25 showing additional nominations detail;

FIG. 33 is a screen view of the operations screen of FIG. 25 showing additional nominations detail;

FIG. 34 is a screen view of the operations screen of FIG. 25 showing additional nominations detail;

FIG. 35 is a screen view of a whiteboard detail, for nomination planning according to one embodiment of the present disclosure;

FIG. 36 is a further screen view of the whiteboard detail of FIG. 35;

FIG. 37 is a further screen view of the whiteboard detail of FIG. 35;

FIG. 38 is a view of an embodiment of a language translation table;

FIG. 39 is a view of an embodiment of user language profile table;

FIG. 40 illustrates a price index attribute table according to an embodiment of the present disclosure; and FIG. 41 is a table view of a number of deal quantities produced using the Deals Quantity Use Case, according to one embodiment of the present disclosure.

DETAILED DESCRIPTION

Figure 1:
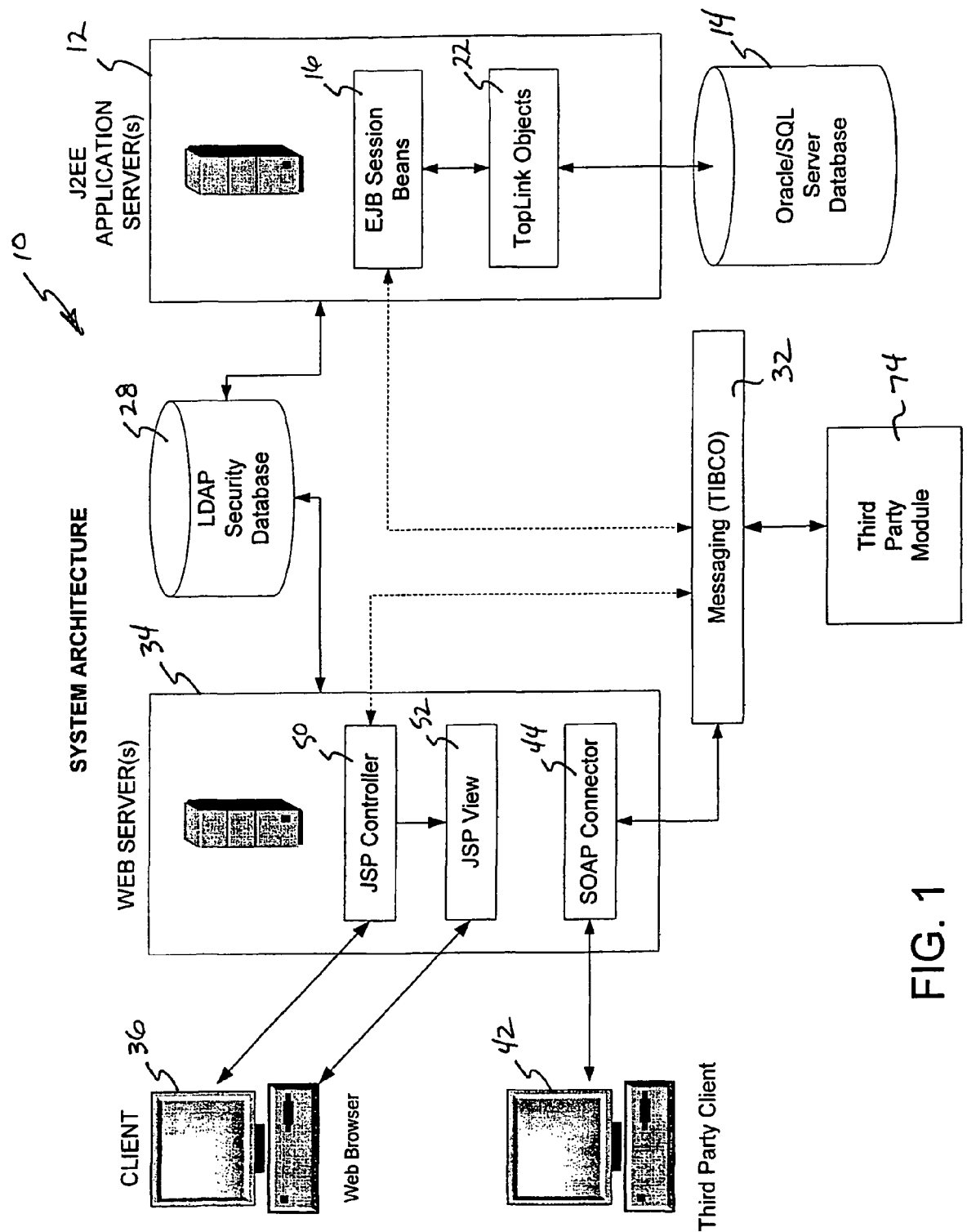
FIG. 1 is a block diagram view of the system architecture according to one embodiment of the present disclosure.

According to one embodiment, a system architecture for addressing energy trading, transaction processing, risk management, and decision support is based upon open standards, such as SOAP and J2EE. The system architecture includes having built-in ties into enterprise messaging systems. Accordingly, the architecture allows nearly any client, including Visual Basic, to talk to the architecture, and allows the architecture's engine to run on enterprise class UNIX hardware. In addition, the architecture includes built-in messaging configured to permit seamless integration with existing systems.

According to another embodiment, the architecture provides for extensibility, scalability, integration, performance, and rapid development for meeting the changing requirements in energy markets. With respect to extensibility, the architecture accommodates one or more sets of business rules of various customers. That is, the architecture is configured to allow default system logic and logic modules, which are subject to being customized by one or more customers, to be easily swapped out with logic customized by the one or more customers. Accordingly, the architecture is configured to allow customization of business logic that does not lock respective ones of the users into a particular language or protocol.

Further with respect to extensibility, the architecture of the present disclosure is configured to link its energy market software application with other third party applications. Accordingly, the architecture is configured to tie its functionality into the capabilities of other systems. The architecture is further adapted to have one or more entire sub-applications or modules within the architecture be replaceable with applications that are developed by a third party. As a result, the architecture enables a "plug-and-play" swapping of components and subsystems that requires minimal reconfiguring, and without re-coding.

With respect to scalability, the architecture addresses both vertical and horizontal scalability. On the vertical front, the system architecture provides an ability for its energy market software application to run on large, enterprise strength hardware. That is, the software application and system architecture provide a cross platform to the extent that the software application and system architecture run on commercially available hardware, for example, UNIX mainframes from Sun Microsystems™ or IBM™, without the necessity of re-coding.

On the horizontal front, the system architecture and its energy market software application provide for an ability to operate on several smaller machines for load balancing and fail-over. The system architecture handles management of load balancing by keeping the various units of hardware synchronized. The system architecture handles session fail-over in the event that one of the hardware units crashes.

With respect to integration, the system architecture facilitates integration of a multitude of disparate systems. While the system architecture and energy market software application can provide a gas management system of choice, many companies may want to run some portions of the gas management system software with different software applications, for example, a Risk Management, Accounting, or Customer Relationship Management (CRM) system. For an application's value to be maximized, all of the various systems should be configured to talk to each other.

The system architecture of the present disclosure utilizes enterprise messaging systems for its integration. For example, all business logic can be called through messaging and all requests coming from a client can be routed through messaging to be pre-processed, redirected or transformed. In addition, as data gets changed within the system architecture, subsequent messaging messages can be sent out with the new data information. In one embodiment, the system architecture includes TIBCO™ messaging for facilitating an operation of the energy market software application. Alternatively, with an appropriate configuration change and possibly, some custom code, other messaging systems can be easily supported. For example, the messaging system may also include WebMethods™.

The system architecture and its energy market software application can be configured to handle business for one or more energy related companies. Accordingly, stability is built into the system architecture and energy market software application. Besides the goal of not crashing or corrupting data, the architecture supports on-the-fly re-configuring, along with isolation of various systems making up the architecture, so as to prevent a problem arising in one area of the architecture from affecting or bringing down the entire system.

The system architecture and energy market software application are also configured to provide for an acceptable performance, for example, in terms of speed. The system architecture can be configured to render a typical response within a few seconds. Lastly, while the architecture is necessarily complex, its design facilitates rapid development by software application developers and for operation with respect to a given energy market application.

Referring now to FIG. 1, a system architecture 10 for energy industry trading and transaction management includes an application server 12 and a database server 14. The application server 12 is configured as a business logic server-based layer. In one embodiment, the business logic layer includes a parameter-based configuration of at least one business logic service configurable to enable a deployment of the system to be compatible with a respective business practice of at least one client customer. In one embodiment, the applications server 12 includes a Java 2 Platform, Enterprise Edition architecture making use of EJB Session Beams 16, as discussed herein.

The at least one business logic service is configured to support energy trading and transaction management and utilize business rules operable on an event basis for processing at least one of energy trading and transaction management data, via an API, including data specific to the at least one client customer. An event may include at least one of a client customer request, a transaction event, a third party event, and a system event. The business logic layer further includes a standard API for use per data object of the energy trading and transaction management data. The database layer is operatively connected to the business logic layer for storing the data processed by the business logic layer in a database 14. In one embodiment, the applications server 12 is separate from the database server 14.

In one embodiment, the business logic layer is configured to provide flexibility, scalability, and extensibility with the use of parameter driven business rules. In another embodiment, the business logic layer is further implemented as a hosted application service provider (ASP). The system architecture 10 is an open architecture configured for an ease of integration with a client system.

ASP capability enables multiple customers to utilize the single database via single instances without having access to data of other customers. A resource identifier is included with corresponding data in the database. Data is characterized by system level data and customer specific data. Each customer is required to login to the system and accordingly each customer is assigned an ASP Customer ID. In this manner, the system architecture provides a security mechanism based upon the ASP Customer ID.

The parameter-based configuration of the system architecture 10 includes base data attributes that are date effective. The base data may include one or more of a business associate, facility, point, and accounts. The base data may further include one or more of contract party data, deal party data, and transactional data that are rendered date effective.

The database server 14 of the system architecture 10 further includes security features for partitioning data within the database. In one embodiment, the applications server 12 is configured to communicate to the database server 14 through database connectivity drivers. Data layer (DL) objects 18 (FIG. 3) contained within a module 20 of the applications server 12 can be configured to communicate data to and from the database via database 14 connectivity drivers.

In another embodiment, the business logic layer further includes an object-relational mapping tool 22 configured to provide access between the business logic layer and the database layer. The object-relational mapping tool is configured to map objects to database tables 24 (FIG. 3) in the database. Objects created by the object-relational mapping tool are used to query data in the database and to get query results back.

Figure 3:
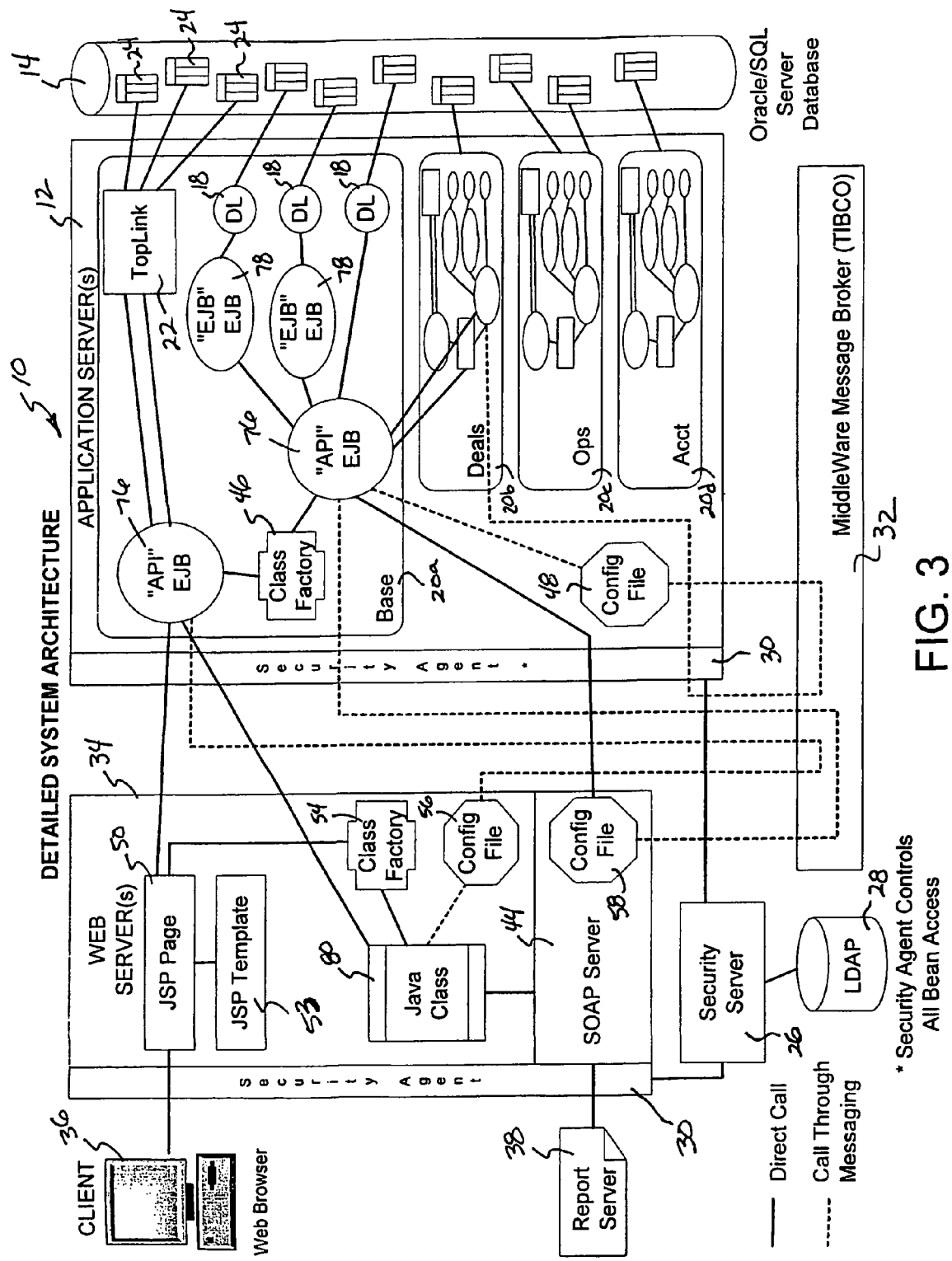
FIG. 3 is a detailed block diagram view of the system architecture according to one embodiment of the present disclosure.

The system architecture 10 further includes a security layer implemented via one or more of a security server 26, LDAP Security Database 28, and security agents 30 (FIG. 3). The security layer operatively connects the configurable business logic server-based layer and is configured to filter requests to the configurable business logic layer according to a system security. In one embodiment, the security layer is further configured to provide a secure access to the configurable business logic server-based layer, and wherein the business logic server-based layer is further configured to provide security at an object and client company level within the system architecture.

In one embodiment, security can also be provided on a per module (or data object) basis, rendering a finer grain security to the overall system. The security implementation provides a secure access to each module according to a user access listing of userids having rights to access and use a respective module (or data object).

The system architecture 10 further includes a messaging layer 32 operatively connected to the business logic layer. The messaging layer is configured to facilitate an XML-based interchange and open messaging transport communication link between the business logic layer and another layer.

The system architecture 10 still further includes a presentation layer 34 configured to receive at least one of a client request 36, a reporting request 38, a migration request 40, and a third party request 42. The messaging layer operatively connects between the presentation layer and the business logic layer. Accordingly, the messaging layer is configured to facilitate an XML-based interchange and open messaging transport communication link between the presentation layer and the business logic layer.

In one embodiment, the system architecture further includes a simple object application protocol (SOAP) server 44 operatively connected to the presentation layer 34 and the messaging layer 32. The simple object application protocol server 44 is configured to provide a message based protocol to carry an XML based payload for accessing the business logic layer 12.

SOAP provides a means for communicating between the web server 34 and the API's of the application server 12 via XML documents. Each module (20 *a,b,c,d*) of the application server 12 has its own class factory (i.e., each module builds it own classes). The class factories and configuration files determine a dynamic direction of a request, whether to the application server or a message. Accordingly, a dynamic proxy is created. Similarly, the class factories and configuration files of the web server 34 provide a dynamic proxy applicable to the JSP's and messages. The class factory of Base Module 20*a* is indicated by the reference numeral 46 in FIG. 3. The configuration file of the application server 12 is generally indicated by reference numeral 48 of FIG. 3.

Figure 2:
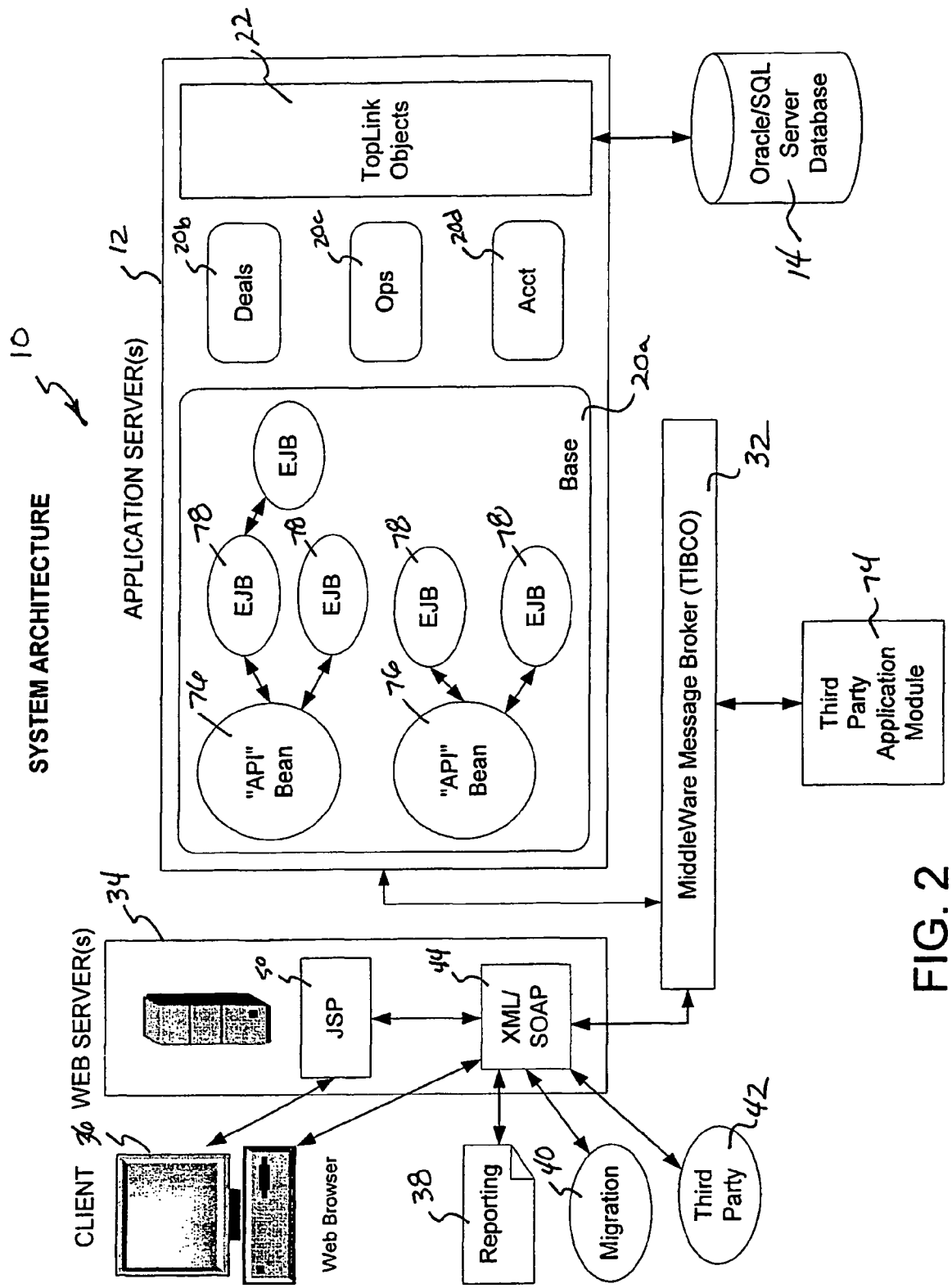
FIG. 2 is a block diagram view of the system architecture according to one embodiment of the present disclosure.

In addition, the presentation layer includes a browser based web server 34 presentation layer configured to construct Java Server Pages, handle JSP requests, and provide a functional graphical user interface for handling web requests via JSP controller 50 and JSP view 52 of FIGS. 1-3. The presentation layer further includes a class factory 54 and a configuration file 56 (FIG. 3). The class factory 54 is configured to establish a category of objects defined by common properties of different objects that belong to the class, wherein a path of an incoming request to the business logic layer is dynamically determined as a function of the configuration file and the class factory. The path includes either a direct call from the web server 34 to the applications server 12 or a proxy call from the web server 34, through the messaging layer 32, to the applications server 12.

Soap

According to one embodiment, the system architecture 10 utilizes SOAP server 44 and configuration file 58 (FIG. 3) for enabling simple object access protocol (SOAP) for communication between software components of the architecture, as disclosed herein. SOAP is based on extensible markup language (XML), and is configured for accessing remote objects over a network. Accordingly, SOAP allows access to services, objects, and servers in platform independent environments, thus acting as the common link between heterogeneous software components. With respect to implementation, SOAP is configured to use hypertext transfer protocol (HTML) for transport and XML for data encoding.

Utilizing SOAP provides numerous benefits. SOAP is a standard protocol and complies with established Internet standards. SOAP is also configured to be language and platform independent. In addition, SOAP integrates well with Microsoft development tools. Accordingly, SOAP provides simplicity and extensibility.

Figure 4:
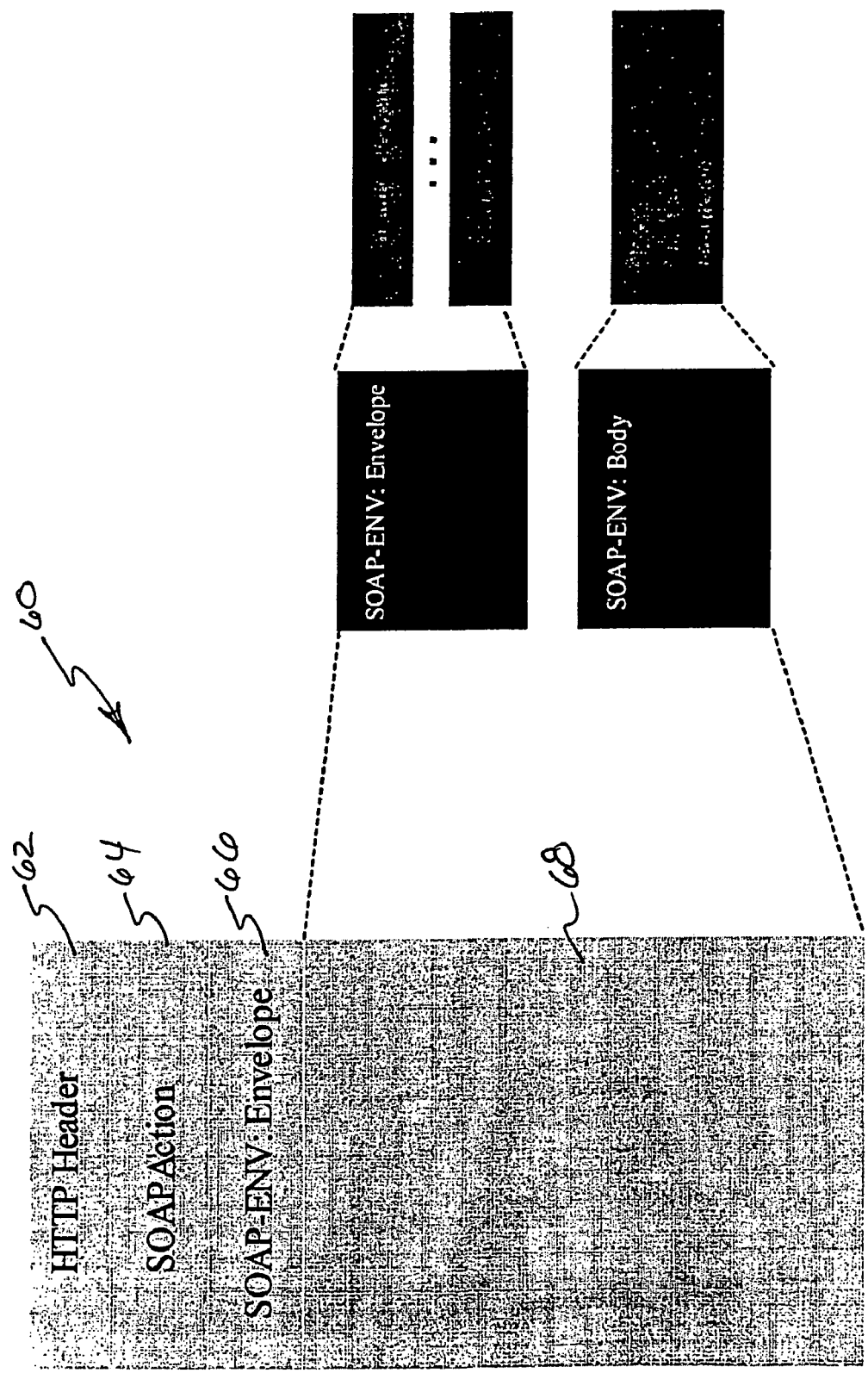
FIG. 4 is a diagram view illustrating an embodiment of a SOAP packet.

SOAP utilizes packets to transmit information between software components. FIG. 4 provides a diagram view depicting the structure of a SOAP packet 60. The SOAP packet 60 includes an HTTP header 62, a SOAP Action 64, SOAP-ENV: Envelop 66, and SOAP-ENV:Body 68. In addition, the SOAP-ENV: Envelope includes one or more header elements. The SOAP-ENV:Body includes one or more objects, methods, or parameters.

Operation of SOAP can be described generally as follows. A client executes a single method of a function call (limited to one method or function call per HTTP request). In response, a server executes the method or the function call and transmits a response. The client receives the response including data, and then processes the data. Finally, the client transmits the data (updated) back to the server in another remote call.

More specifically, the client includes a software process for building the SOAP request. The software process for the SOAP request may include XML statements. The client may also include software processes developed using tools such as Visual Basic (VB), Microsoft SOAP toolkit, and Jscript. An example SOAP request is shown below:

```
<SOAP-ENV: Envelope>
    <SOAP-ENV:Body>
        <findAliases ns1="base/Alias">
            <p0>555</p0>
            <p1>345</p1>
        </findAliases>
    </SOAP-ENV:Body>
</SOAP-ENV:Envelope>
```

On the other hand, the server includes a software process for handling the SOAP request, performing the requested method or function, creating the SOAP response, and transmitting the response back to the client The server's software process may include a java servlet, an active server page (ASP) script code, a COM object, or other software components adapted to perform the above functions. An example SOAP response generated by a server is shown below:

```
<SOAP-ENV: Envelope>
    <SOAP-ENV:Body>
        <findAliasesResponse ns1="base/Alias">
            <Name>AliasName</Name>
        </findAliasesResponse>
    </SOAP-ENV:Body>
</SOAP-ENV:Envelope>
```

An example of the SOAP response generated by the server in response to an error is shown below:

```
<SOAP:Envelope>
    <SOAP:Body>
        <SOAP:Fault>
            <faultcode>400</faultcode>
            <faultstring>Invalid XML Document sent</faultstring>
            <faultactor>Error Generator</faultactor>
        </SOAP:Fault>
    </SOAP:Body>
</SOAP:Envelope>
```

According to one embodiment, the client, written in Java Server Pages (JSP), may include a GET or a POST method. The GET method may include the following statement, for example:

GetObject(Object, Method, Parameters, FormatCols, TranslateCols)

In the above example, the client executes a GET request to the server. The search also returns an XML data set to display in a data grid. In response to the GET request, the server calls EJB objects and the specified method. If the request is successfully handled, then the server translates and formats the data, and returns the data set to the client If the request is not successfully handled, then an error string is returned to the client.

The POST method may be invoked by the following statement, for example:

ExecuteObject(Object, Method, Parameters)

Figure 5:
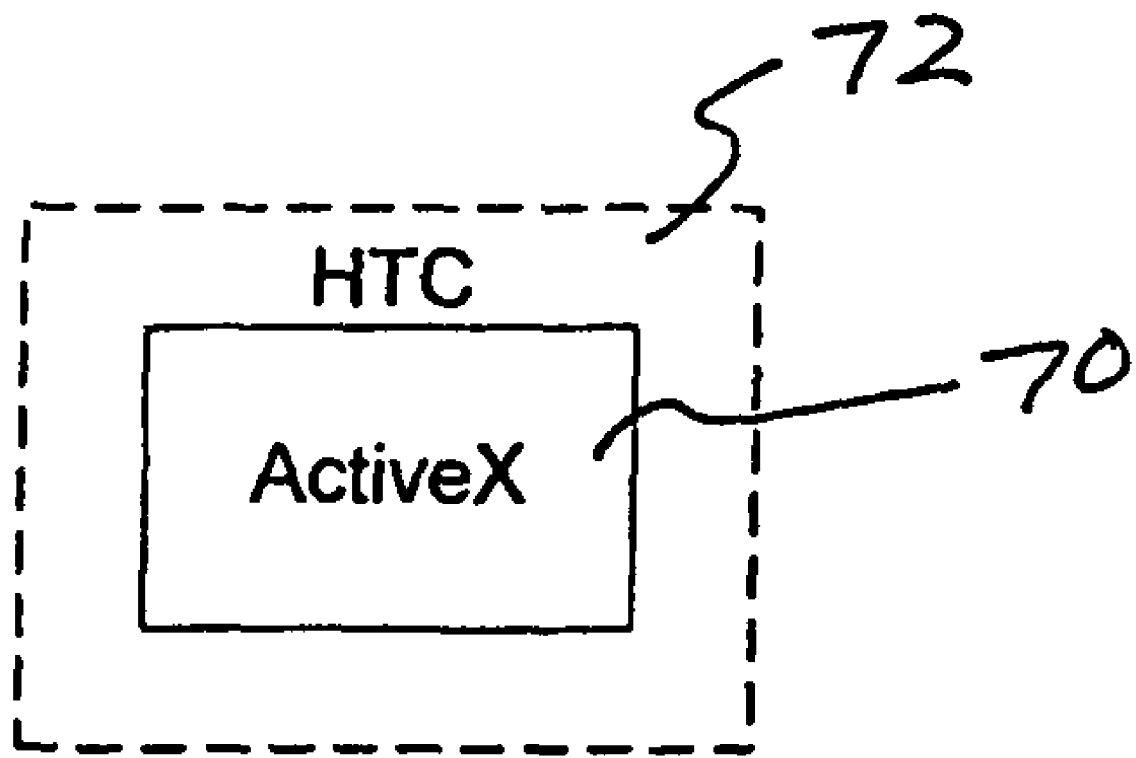
FIG. 5 is a diagrammatic view of an ActiveX component contained within an HTML component as implemented according to one embodiment of the present disclosure.

Referring again to FIGS. 1-3, the browser based web server presentation layer of the system architecture 10 is further configured to deploy at least one item of web browser page content in a manner wherein the deployment of the content mimics a client/server operation. Deployment of the at least one item includes placing the at least one item into an ActiveX component 70 within an HTML component 72, as shown in FIG. 5 and as further discussed herein.

According to another embodiment, the messaging layer 32 is configured for enabling one or more of the following. The messaging layer 32 can be configured to enable an integration of an existing $3^{rd}$ party application or business system 42 into the system architecture 10 (FIGS. 1,2). The messaging layer can be configured to process at least one of a client request 36 and a system request 12, wherein processing the request includes at least one of capturing the request, transforming the request, and routing the request to at least one destination 74 selected from the group consisting of a legacy system destination and a system architecture destination 12.

The messaging layer 32 may further be configured to implement a client specified business rule prior to accessing core business functionality within the business logic layer. The messaging layer 32 may still further be configured to enable bi-directional communication between incompatible enterprise applications 74 of a third party (FIG. 3) and the system architecture via messages across a common platform. Lastly, the messaging layer may be configured to enable bi-directional communications between enterprise java beans (EJBs) 76 of the business logic layer and an external application 74.

In one embodiment, the system architecture further includes a security layer operatively connected to the presentation layer and the business logic layer for providing a secure access to the presentation layer and the business layer. The security layer can include an LDAP compliant database 28 server-based security layer configured to manage userids, passwords, and roles in the system. In one embodiment, the business logic layer includes a J2EE applications server 12, and wherein the database layer includes a database server 14 separate from the application server. The security layer further includes a means for handling EJB security, the security means including for example a security agent 30 operatively connected to the J2EE applications server for filtering requests to the J2EE application server. Lastly, the security layer still further including an application level security means configured to render method level security on objects processed within the applications server for example, via APIs and data bound objects, as further discussed herein.

In another embodiment, the system architecture further includes a secure sockets layer connection operatively connected between a client browser and a presentation layer GUI. The secure SSL connection creates a unique session id and wherein the messaging layer is further configured to call an appropriate enterprise bean 76 within the business logic layer under correct credentials in response to the userid, password, and session id.

In yet another embodiment, the business logic layer of the system architecture includes a Java 2 Platform, Enterprise Edition applications server configured for running an applications program of a hierarchy of modules. The applications server 12 further includes a configuration file 48 (FIGS. 2 and 3) adapted to configure the hierarchy of modules for use in the parameter-based configuration of the at least one business logic service. The hierarchy of modules includes a base module 20a, a deals module 20b, an operations module 20c, and an accounting module 20d. The system architecture further comprises: (1) a presentation layer configured to receive at least one of a client request 42, a reporting request 38, a migration request 40, and a third party request 42 (FIG. 2); (2) a messaging layer operatively connected between the presentation layer and the business logic layer, the messaging layer configured to facilitate an XML-based interchange and open messaging transport communication link between the presentation layer and the business logic layer; and (3) a security layer operatively connected to the presentation layer and the business logic layer for providing a secure access to the presentation layer and the business layer.

As mentioned above, the business logic layer includes the applications server for running an applications program of a hierarchy of modules 20a, 20b, 20c, and 20d (FIGS. 2 and 3). For implementation of the hierarchy of modules, the applications server includes a configuration file 48 adapted to configure the hierarchy of modules for use in the parameter-based configuration of at least one business logic service. The hierarchy of modules includes at least a base module 20a. The base module 20a is configured to maintain information about baseline data required by the system architecture, including at least one selected from the group consisting of counter-parties, pipelines, nomination points, meters, and units.

A next module in the hierarchy of modules includes a deals module 20b. The deals module 20b includes a contract sub-module configured to maintain information about at least one selected from the groups consisting of buy/sell, transportation, storage, pooling, and capacity release contracts that a client has with the client's customers; contracts and custody contracts containing base agreement information; specifications representing terms, points, quantities, and pricing details that are used for billings and payments; and pricing indices. The deals module can further include a deal making sub-module configured to maintain information about transactions and deals of a client, the transactions and deals including at least one selected from the groups consisting of buy and sell deals, broker commissions, multiple pipelines, point-level pricing, multi-component formula-base price calculations, and deal points, quantities and pricing details used for invoices and remittances.

A further module in the hierarchy of modules includes an operations module 20c (FIGS. 2 and 3). The operations module 20c includes a nomination sub-module configured to receive and/or create transportation, storage, pooling, and interconnection nominations, and to perform pool-to-pool transfers, the nomination sub-module further configured to process various nomination models, including at least one of GISB and international requirements. The operations module 20c may further include a capacity management and confirmations sub-module configured to perform at least one selected from the groups consisting of schedule pipeline capacity and prioritize contractual volumes based on parameter driven scheduling and curtailment rules; enable a user to model a pipeline and to set constraint points and other criteria that permit tariff compliant reduction of flowing volumes; and obtain confirmation of nominated and/or scheduled quantities at the nomination point level by operator, agent, or shipper. The operations module 20c may further include an allocations and balancing sub-module configured to perform at least one selected from the groups consisting of maintain allocations information including configurations of tiers, PDA Rules, and rules; and accept meter and point information and calculate imbalances and point variances based on nominated, scheduled, and measured volumes.

A yet further module in the hierarchy of modules includes an accounting module 20d. The accounting module includes an accounting and settlement module configured to provide at least one selected from the groups consisting of provide necessary processing to consolidate all the contracts, deals, scheduling and allocations information for generating invoices and/or remittances for a client; support external penalty calculations configurable for differing pipeline tariffs; specify override rates and prices, process prior month adjustments, and calculate taxes; G/L account assignment, calculation of accruals for business not yet finalized, and support of interfaces to external General Ledger and Accounts Receivable systems.

Further with respect to the system architecture wherein the applications server includes a Java 2 Platform, Enterprise Edition architecture, at least one module of the hierarchy of modules includes (i) a class factory and (ii) one or more of (a) an API enterprise java bean component 76 operatively connected to an object-relational mapping tool 22 and (b) an API enterprise java bean component operatively connected to (b1) an EJB enterprise java bean object 78, (b2) a data layer (DL) object 18, and (b3) one or more of a class factory and an API enterprise java bean component of another of the modules in the hierarchy of modules. The class factory is configured to establish for a respective module a category of objects defined by common properties of different objects that belong to the class.

Within the Base module 20a, the class factory 46 includes a base class factory configured to establish a category of base objects defined by common properties of different objects that belong to the base class. The base objects may include one or more of counter-parties, pipelines, nomination points, meters, and units.

Within the Deals module 20b, the respective class factory includes a deals class factory configured to establish a category of deals objects defined by common properties of different objects that belong to the deals class. The deals objects may include one or more of contracts, pricing, deal making, and transactions.

Within the Operations module 20c, the respective class factory includes an operations class factory configured to establish a category of operations objects defined by common properties of different objects that belong to the operations class. The operations objects may include one or more of nominations, capacity management, capacity confirmations, allocations, and balancing.

Within the Accounting module 20c, the respective class factory includes an accounting class factory configured to establish a category of accounting objects defined by common properties of different objects that belong to the accounting class. The accounting objects may include one or more of invoices and remittances.

An advantage provided by the hierarchy of the Base, Deals, Operations, and Accounting modules, is that a customer can choose to replace one or more modules with the customer's own respective module in a reverse order of the hierarchy. For example, the customer may choose to implement the customer's own accounting module such as illustrated by reference numeral 74, while using the Operations, Deals, and Base modules of the system architecture. The customer may likewise choose to implement the customer's own accounting module as well as the Accounting module of the system architecture. In addition, the customer may choose to implement the customer's own accounting module and operations module.

In the embodiment including the Java 2 Platform, Enterprise Edition applications server, the API enterprise java bean component 76 is configured to establish a common interface of EJB enterprise java bean components 78. The API enterprise java bean component 76 is further configured to execute an entity validation utility for validating incoming data prior to routing the data to an EJB enterprise java bean component 78. In addition, the application server 12 further includes a method for validating data received via the messaging layer 32, prior to placing the data into the database 14. Accordingly, the application server 12 provides a means for performing entity validation as a standard method to do validation and provide consistent error messages.

The EJB enterprise java bean component 78 is further configured to act as a remote object to a calling API enterprise java bean component 76. In addition, the EJB enterprise java bean component 78 is further configured to carry out a parameter based business rule for a respective class.

In the embodiments discussed above, the configuration file 48 contains configuration information for the applications program. Responsive to an execution of the applications program, the applications program accesses the configuration file 48 to identify parameters that are in effect for the at least one business logic service.

According to another embodiment, the business logic layer includes at least one module for performing the at least one business logic service. In this embodiment, the business logic service includes a parameter based configuration. The parameter based configuration includes date and time effective attributes.

According to another embodiment, the web server 34 includes templates 53 for building the GUIs for the various screen views of the applications. In one embodiment, the templates are configured to provide a look and feel like that of separate applications. XSDs (XML Schema Documents) determine the display and relationships. The XSDs include tree level structures, for example, Deal includes Price, Volume, Counterparty [0–n], and Location (an object), further wherein each Counterparty includes legal name, and each Location includes a name. All data includes data bound objects.

In one embodiment of the system architecture, the deployed web pages of an application are configured to run as a client/server environment. Accordingly, the applications implemented via the GUIs appear more responsive, that is, handling incremental changes within a web page without having to perform an entire refresh of the web page. For example, the application may require serving up different languages and data sets for translation. Implementation of the translation can include use of term tables having, for example, term_id, termset_id, language, and term. Implementation may further include filtering data, formatting data, and translating data via the GUI front-end.

In another embodiment, ActiveX components are contained within an HTML component (HTC) as discussed with respect to FIG. 5. This simplifies the building of web pages, creating a layer of abstraction by substituting out code. On the JSP side, using a function similar to the HTC, tags are customized for a given control function. For example, tags may include <JSP: grid> or <JSP: combo box> for dynamic insertion of appropriate data into a corresponding location on a GUI screen. In addition, the data for the tags may be saved, for example, as a user preference.

High Level Overview

On a macro level, the architecture can be divided into five different layers. The layers include a presentation layer, a security layer, a messaging layer, a business logic layer, and a database layer. Each of the layers is loosely coupled to the other layers. As a result, any one or more of the layers may be swapped out and replaced by a custom layer to meet the needs of a particular energy management application and/or customer.

Presentation Layer

The architecture's presentation layer is browser based. In one embodiment, a web server 34 constructs pages using Java Server Pages (JSP™) on the web server. The presentation layer also follows W3C™ standards for HTML and JavaScript™ code, as may be appropriate for a particular implementation. For example, a browser implementation for use in connection with the presentation layer can include Microsoft Internet Explorer™ version 5.5 or higher, available from Microsoft™ Corporation. Accordingly, the presentation layer is configured to support a rich, fully functional, graphical user interface (GUI).

In one embodiment, a web tier implements the presentation layer. The web tier is configured to is handle web and JSP requests, for example via a server running on a Windows™ 2000 Server operating system. Alternatively, Solaris™, AIX™, and Linux™ may also be used to support the web tier. The application server may include an Orion, BEA Weblogic Integration™, or IBM's WebSphere™, or other suitable server, for example.

Business Logic Layer

According to one embodiment, the business logic is written in Java™ and contained in stateless session beans running in a J2EE™ environment on an application server. Data access is handled through TopLink™ mapped objects. Top level objects follow the naming convention of <DomainObject>API. For example, "PointAPI." The stateless session beans are designed to manipulate complex data structures and run processing logic. Data is passed into them using an XML mapped object. The XML mapped object is automatically constructed from XML within the SOAP server before being passed to the bean. All of the system's XML bound objects have an attribute that controls it's processing (CREATE.UPDATE.DELETE). Accordingly, a single method ("process(DataObject)") is generally used for all data processing requests.

Security Layer

A Lightweight Directory Access Protocol (LDAP) compliant database manages user id's, passwords, and roles in the system. Accordingly, the system architecture is configured to integrate with existing security architectures, such as Microsoft™ Windows NT™ Domain servers, or Netscape™ LDAP servers. In one embodiment, a third party security product, for example, EnTegrity™, is configured to handle security for EJBs and is operatively connected to the web server, filtering all requests coming in. Application level security is handled through a built-in mechanism in J2EE that allows for very granular security down to the method level on all objects.

Clients and/or customers desiring to access the system through the system's web GUI must log into the system through a Secure Sockets Layer (SSL) connection. After login, a unique session id is written as a cookie to the user's browser and thereafter identifies the user during a session. A session automatically terminates upon a timeout of 30 minutes of inactivity, the timeout being configurable by the system administrator, for example. As part of the logon process, a user id, password, and session id are sent to the messaging layer so that the messaging layer can call the appropriate enterprise beans under the correct credentials.

Messaging Layer

The messaging layer offers a simple way to integrate existing business systems seamlessly into the architecture of the present disclosure. Since all work requests from a client pass through the messaging layer, the architecture is configured to capture, transform and route requests to different destinations.

For example, if a client company has its own accounting system that the company desires to continue using, then by overriding the default message routing in the messaging layer, the architecture directs accounting requests over to the legacy system. Alternatively, if a client company desires to run a legacy system in parallel to the system architecture of the present embodiments, then the messaging layer can be configured to direct a copy of the corresponding accounting requests/messages to the relevant accounting system of the system architecture, as well as, over to the company's legacy system.

In addition, if a client company has a specific workflow procedure, the messaging can be configured to enable the particular workflow procedure to take place. For example, if the client company has a rule that all deals must be approved by a supervisor before being entered into the database, the message to create a new order can be captured, routed to the supervisor, then forwarded onto the Enterprise JavaBeans™ layer when approved, without having accessed the core business functionality.

The messaging layer facilitates the creation of a very extensible architecture. While every customer may not require or need the flexibility offered by the messaging layer, the API's used to access backend services can be switched to go directly to the Enterprise JavaBeans layer. This can be accomplished by making a configuration change and then re-starting the web server. If a customer's particular business requirements are to go directly to the Enterprise JavaBeans layer, then the customer has an option to extend the application via suitable Java code for implementing the interfaces of the system architecture.

In one embodiment, the messaging layer is implemented with the use of commercially available messaging technology middleware, for example, available from TIBCO or WebMethods. The messaging layer includes messaging software configured to enable bi-directional communications between incompatible enterprise applications by transporting messages between the applications across a common platform. For example, the messaging layer enables bi-directional communications between EJBs and other applications. In addition, the interface into the messaging layer is configured in a manner so that supporting other middleware protocols is possible with relatively minimal effort Database Layer In one embodiment, the database is run on a separate server from the application server and web server. For example, the database layer can be implemented to run on Oracle™ 8i and Microsoft SQL-Server 2000. In addition, the installation of the database is configured to run in an ASP (Application Service Provider) mode, the database preferably including additional security features for partitioning data. The application server communicates to the database through JDBC™ drivers. In the case of the Oracle 8i, the database uses an Oracle JDBC-OCI driver. The Microsoft SQL-Server 2000 uses a pure Java JDBC driver.

In another embodiment, the architecture's database access is handled through an Object-Relational mapping tool, such as TopLink, which is commercially available from WebGain Inc. of Santa Clara, Calif. In most instances, use of the TopLink mapping tool will not require writing actual SQL statements. Instead, objects created from the mapping tool are used to both query the data and get the results back. With the mapping tool, Java objects mapped to database tables are transparently stored in the relational database without SQL coding. Accordingly, rather than using entity beans, the same effect is achieved through the mapping tool in a much lighter weight and more flexible fashion.

Implementation

Implementation of the architecture according to one embodiment of the present disclosure is discussed in further detail below.

Web Browser Presentation

As discussed herein, the presentation layer is configured to utilize a web browser or graphical user interface (GUI). The web browser can include Microsoft Internet Explorer (IE) or any other suitable browser. In one embodiment, the GUI is made W3C compliant, as much as possible, and may include a number of advanced IE features. Specifically, IE behaviors are used to create client-side components, and data binding is used to display XML data in tables. All color, font, and style details are stored in a separate CSS (Cascading Style Sheet) file so that any changes and customizations can be easily handled without having to modify the JSP code of the presentation layer.

In addition, the GUI is configured to be highly responsive to a system user. From the users perspective, the GUI acts and feels like a stand-alone application, rather than a web page. The GUI accomplishes this through rich controls, such as popup menus, calendar components, and simple form validation used within the browser. In one embodiment, client side scripting is done in JavaScript.

In another embodiment, the controls are created using ActiveX™ to provide a desired performance and functionality. The controls are wrapped by an HTML component (HTC) so that existing terms will not have to change. The controls include, for example, a grid control, a combo box control, and a date picker control.

Web Server Scripting Details

According to one embodiment, the client application is written in Java Server Pages (JSP). The client application provides for a clean separation of the business logic and the HTML results. A "controller" servlet/jsp page handles an initial request from a client or system user. The "controller" servelet/jsp page takes the appropriate business actions, stores the results in a request variable, then forwards the results to a view page. The view page creates the HTML needed to display the results back to the client, via the web browser.

The benefits of the above-described client application include an ability to cleanly break the client interface into graphical user interfaces (GUI's), separate from business rules and work flow, without having the business rules and work flow be concerned about the client display. In addition, the client application is configured to the system architecture to substitute different views dynamically based upon the particular client request. For example, if static pages were created containing different language settings, a controller servlet/jsp page could automatically route the results to the correct language page based on the client's local setting. In another case, an automated system might want to submit a request to a web page and get the results back as XML. A separate jsp page could be created to format an XML response, instead of the normal HTML response. This can be accomplished without having to change the business logic flow of the controller.

In addition, user profiles and customization can be stored in the database and loaded into a session variable after a user logs into the system. Access to the user profiles and customization can be accomplished through a design pattern similar to other database data (i.e., XmlRowsets returned from a session bean).

Controller Responsibilities

The controller is responsible for and configured to collect all information required by a view, as well as to ensure that the information required for the action is present. The controller is further responsible for ensuring that the user is properly logged on. The controller is still further responsible for creating a connection to the "business abstraction layer"; calling the remote methods to execute the business logic; and making a call to a bean to accomplish a particular action.

In connection with collecting information required by a view, the information may include data for drop down lists, information for grids, etc. Ensuring that the information required for the action is present may refer, for example, to checking to ensure that the user did not forget to enter any critical fields. Note, however, the controller is only responsible for ensuring the information is there and that it can be parsed into the correct data type. The controller is not responsible for the validity of the information.

The validity of information is the responsibility of the business logic bean. With respect to ensuring that the user is properly logged on, action level security checks are handled by the bean. The connection to the "business abstraction layer" can be created by a remote interface to an enterprise bean in a pure J2EE application, or to the messaging system. In one embodiment, calls across to the enterprise beans are course grained. In other words, the controller should be able to make one call to a bean to accomplish an action—not a separate call for each step.

View Responsibility

The view JSP pages are responsible for the formatting of results according to needs of a corresponding client, managing display level security, handling client side business logic, handling language translation and unit conversion, and configuring the GUI based on user preferences and security settings.

Formatting the results according to the way the client wants them may include, for example, creating HTML or XML to output to the client. Managing display level security may include restricting a user to a subset of buttons or menu choices for a particular GUI. Client side business logic includes JavaScript on the client computer. With respect to language translation and unit conversion, JSP taglibs are configured to handle unit conversion, date/time localization, language translation and number formatting.

In one embodiment, the client presentation layer is written in JSP with an emphasis on keeping embedded Java code to a minimum, as much as possible. The view pages are designed to fit within a template based upon the purpose of the screen or view. Accordingly, a page type is characterized by a corresponding template. Each individual page puts different content within a series of defining tags, which the template is responsible for rendering. This allows the entire look and feel of the application to change simply by modifying the template.

Unlike traditional web pages, the pages of the present architecture are designed to allow a user to submit changes and requests without requiring a reloading of the page. This is accomplished through the SOAP interface and Javascript. All of the grids on the screen are populated post-load from a URL, for example, via a modified SOAP call. Combo Boxes can be populated either pre-load on the JSP side or post-load through a URL the same way the grid controls are. Complex information is submitted to the EJB layer by embedding XML within a SOAP call. According to one embodiment, most of the business objects in the system are modeled in XML and defined in a schema document. As a result, this XML is configured as a primary means of manipulating data within the system.

For situations where the screen is required to manage very complex data, a mediator is created to sit between the web page and the EJB side. The mediator is a standard Java class 80 that runs locally on the webserver box 34 and is accessed through SOAP 44 (FIG. 3). This Java class has access to the user's session object, which is used to store intermediate data. The purpose of the mediator is to allow the user to manipulate complex data in an environment that is isolated to him, then submit the changes all at once to the EJBs. It also allows the view of the data to be customized without having to change the EJBs feeding that data.

User preferences for such things as grid column sizing and placement will be handled through a custom JSP tag. All user preference data is stored in the system database as indexed XML strings and is accessed through a Session bean. User preferences will be stored locally at the user's session variable on the webserver while the user's session is valid.

Overview of EJB FileTypes

As mentioned, in one embodiment, the system architecture includes a J2EE application running on a J2EE server. The J2EE application is made up of the following file types: .java, .class, .jar, .jsp, .jpx, and .ejbgrp. The file type java are Java language code files. These Java language code files are compiled to .class files. The .class are then used to create .jar files. The .jar files contain compiled source code (.class files). The .jar files are similar to Zip files. The .jsp files are used to generate the web pages and require no compilation. The .jpx files contain a JBuilder project and will typically reference one or more .ejbgrp files. The .ejbgrp files represent a deployable entity that contains one or more Enterprise Java Beans. The .ejbgrp files also contain deployment descriptors that are used by an EJB server to run. Furthermore, the .ejbgrp files can be selected to generate jar files.

Application Level Security

Application level security on the client side includes deciding which pages a user can view, and what options the user has on the pages the user can view. According to one embodiment, all security configurations are formulated within the scope of a user's role. On the JSP page, configuration fragments are wrapped within a taglib entry. Everything between the tags are included if the user has the proper role. A more permission based security approach may also be used. An illustrative example of a taglib entry is provided below:

```
<altra:userInRole role="NominationManager"
   include="true">
        <button name= "submitChanges"
   action= "javascript: nomForm.submit( )">
   <br>
</altra:userInRole>
```

Integration vs. Extension/Customization

Although they are often lumped together, the ability to integrate with other systems is a very different problem than the ability to extend or customize existing functionality. While both could be accomplished either through messaging exclusively, or through EJBs exclusively, there are reasons for using different techniques to solve different problems.

Integration

Integration is the ability to tie the system of the present embodiments with other systems, including pre-existing systems. For example, a client company may have its own accounting system that the client wants to use in place of the accounting system running on the system of the present disclosure. Another scenario may include the client company having an accounting system that handles its corporate books that the client desires to keep updated with information from the gas accounting system of the system according to another embodiment. In the first example, the client company substitutes one system for the other. In the second example, the client company uses the accounting system of one embodiment of the present disclosure, while comparing the calls in real-time to drive a second system. In either instance, it is an entire subsystem that is being affected.

In the system architecture of the present disclosure, integration is accomplished through messaging. Integrating a client company's pre-existing system with the system architecture of the present disclosure involves setting up a subsystem class factory to use a proxy implementation. For example, with accounting, this can be accomplished by setting a parameter "Dcom.altra.accounting.AccountClass Factory=com.altra.accounting.AccountingClassFactory ProxyImpl" for both the JSP server, as well as the EJBs server. Accordingly, objects/methods are mapped to the Application Program Interface (API) of the client company's system.

Extension/Customization

Extension and customization of the system architecture of the present disclosure is accomplished through standard EJB means. This involves writing a class in Java that either extends the system bean, or implements the system's remote interface, and then configuring the ejb-jar.xml to point to the new bean. While in theory this could be accomplished in the messaging layer, that technique is much more complicated, the performance is slower and maintenance is complex. While there are some disadvantages to limiting extensions and customizations to the EJB layer (i.e., coding is in Java, make upgrades slightly more complex), the advantages far outweigh them.

Messaging Layer Details

A class factory provides all access to the Enterprise Java Beans. A separate class factory is provided for every module in the system. All modules have an abstract factory class that serves as the interface to the create functions and an EJB and Proxy implementation of the class. A runtime property with the name of the abstract class defines which implementation is actually returned when a class factory is requested. For example, in the base module there is an abstract class named "com.altra.base.BaseClassFactory." To specify that a current JVM™ should use the Proxy implementation of this class, the command line "-Dcom.altra base.BaseClassFactory=com.altra.base.BaseClassFactoryProxyImpl" is added when starting the application. In the absence of specifying a proxy, the default uses the EJB implementation.

If the EJB version of the class factory is used, then a createXXX(CallContext) performs a Java Naming and Directory Interface (JNDI) lookup for the Home interface and returns the Remote Interface created in the Home.create ( ) method. JNDI names include "module/RemoteInterface." For example, if there was an object with the remote interface of "Contract" in the base module, the JNDI name will be "base/Contract."

Every Enterprise JavaBean includes a Proxy object that implements the bean's remote interface and extends BaseProxy. In the implementation of each method in the remote interface, the Proxy packages the parameters up as an array of objects and calls a method in the base class to send the message and wait for the results. The object name is dynamically determined by the base class function getObjectNameForMessage( ).

According to the embodiments of the present disclosure, the purpose of messaging is integration, as opposed to extensibility. However, since there is no way to pass transaction context information through messaging, ACID transactions are only supported with straight EJB calls (or possibly to CORBA™ services depending on the application service provider). ACID is an acronym used to describe the four properties of an enterprise level transaction, i.e., atomicity, consistency, isolation, and durability. To override a certain piece of functionality, the override is preferably done within the EJB space.

One of the purposes of creating the XML bound data objects was to get a complete set of data processed in a single call to minimize the need for transaction control. Since most of the data processing for the system architecture of the present disclosure is contained in a single call, this allows more freedom in using messaging which cannot participate in multi-call transactions.

Configuring Client Messaging

A properties file, for example, "tibco.properties", informs the client which network to connect to and which subject prefix to use when publishing messages. The properties file is located under a directory in which a middleware proxy application (i.e., the MiddlewareProxyApp) is started. The subjectPrefix parameter is the prefix that will be pre-pended to all published TIBCO messages and allows different levels such as development, QA, Production, etc. to exist on the same network bus. For example, "JEDI_D" can be used for development, "JEDI_Q" for QA, and "JEDI" for production. When the MiddlewareProxyApp is started, the application listens only for messages that begin with the subjectPrefix stated in its property file.

For example, one subjectPrefix could be defined by:

| | |
|---|---|
| host = | ebiz1-hou.altra.com |
| port = | 80 |
| subjectPrefix = | CAMINUS.ETMI_D |
| timeout = | 45000 |

Configuring the Middleware Proxy App

The Middleware Proxy App is a stand-alone application that listens for messages from the client, makes the requested EJB call for the client, and then returns the results. The middleware proxy app is multi-threaded and employs bean caching for all stateless session beans. The application also supports stateful session beans through the object ID parameter ("oid"). If the client desires to create a stateful session bean, the client can do so by sending a "CREATE_OBJECT" message to the middleware proxy app. This can be accomplished by using a remote caller to create a remote object (i.e., RemoteCaller.createRemoteObject( )). The middleware creates the object and returns an object id to the client.

To inform the Middleware Proxy App which application server to connect to, there must be an ejbserver.properties file in the directory that the application is started from.

For example, an ejbserver.properties file could be defined by:

```
url=ormi://localhost/etm
icf=com.evermind.server.ApplicationClientInitialContextFactory
```

-continued

```
user=admin
password=password
```

To start the Middleware Proxy App, a bat file is created and run. The following is an illustrative example of such a bat file. If desired, using a -DDEBUG=true parameter allows the bat file to output all messages to a console.

```
java -classpath
  "d:\orion\lib\Middleware.jar;D:\orion\ejb.jar;D:\orion\jndi.jar;D:\
  orion\orion.jar;D:\orion\jdbc.jar;D:\orion\lib\rvjpro.jar;D\orion\lib\
  ClientCommon.jar;D:\orion\lib\ServerCommon.jar;d:\orion\lib\
  RemoteInterfaces.jar;d:\orion\lib;." -DDEBUG=false
  com.altra.middleware.tibco.MiddlewareProxyApp
```

API Message Protocol

Regardless of which vendor messaging system is selected for implementing messaging, the messages passed between objects should contain the same information. The format for these definitions assumes a "Publish/Subscribe" metaphor where the client publishes the request to a subject defined by a string. It is assumed in all these API calls that the given subject is prefixed by a string that identifies which system it should be running on (for example, "CAMINUS.E™").

In one embodiment, the API calls include a REMOTE METHOD CALL, a REMOTE METHOD CALL RESPONSE, and CREATE REMOTE OBJECT. The REMOTE METHOD CALL defines a message indicative that the client wants to execute a remote method, with RPC as the subject. The REMOTE METHOD CALL RESPONSE defines a message returned by the middleware to the calling client. Lastly, the CREATE REMOTE OBJECT defines a message indicative that the client desires to create a remote object that requires conversational support, for example, Statefull session beans. For the CREATE REMOTE OBJECT api call, the reply message will be the same as the RPC call, with the result field being a string that contains the remote ObjectID. See, for example, FIGS. 6, 7, and 8 containing additional detail.

EJBs Development Details

According to one embodiment, all communications end up going through a messaging layer, and only simple Java types are supported for method parameters and return types. Simple types include String, Long, Integer, Short, Double, Float, Character, and Boolean. One exception to this rule is the com.altra.common.XmlRowSet. The com.altra.common.XmlRowSet provides a standard data passing mechanism for all return types requiring complex data. In the straight EJB implementation, this is passed around as a CachedRowSet with all the data stored internally. If the CachedRowSet is used throughout messaging, it is converted into an XML string before being returned to the client.

Except for special cases such as user information that needs to be cached, all beans are Stateless session beans and extend com.altra.common.ejb.BaseSessionBean. The base class includes methods for obtaining database connections, getting user information and handling logging.

For embodiments of the present disclosure not implemented with the use of the TopLink relational mapping tool, alternate guidelines can be applied to the database tables. That is, a basic design philosophy for each database table can be to have a session bean to manage the data within it. In addition, a Session bean with the naming convention of "<DomainObject>API" can manage the coordination between them all. Accordingly, the Session beans are responsible for loading and manipulating data in a database. In connection with embodiments of the present disclosure that utilize the TopLink relational mapping tool, the "API" beans are used.

Figure 9:
FIG. 9 is a table representation of an EJB layer divided into two classes.

With respect to the alternate guidelines applied to the database tables, the EJB layer is divided into two classes—a Base class which only contains generated code and the actual bean class which extends the Base class. The naming convention for this layer can include RemoteInterfaceBase and RemoteInterfaceEJB, for example. FIG. 9 illustrates one embodiment of the EJB layer divided into two classes.

Data Access Layer

For the most part, Enterprise beans will not talk directly to the database. According to one embodiment, a separate object (RemoteNameDL) handles the database interaction. While the data layer includes similar method names as the EJB layer, the methods have different responsibilities. The EJB layer is responsible for all validations of the data and the DL layer is responsible for actually putting the data in the database.

The data layer, like the EJB layer is split into two classes. A BeanDLBase is generated from the code generator and contains constants for the tables and columns used by the bean, as well as a default implementation of all the data access functions. A second class BeanDL extends BeanDLBase and is where custom code and method overrides occur. Modifying code in the DL layer alone enables regeneration of the underlying code.

According to one embodiment, the system is configured to manipulate the data as objects instead of just RowSets. For certain requirements of the system, the use of Entity beans may be insufficient. In addition, Container managed beans may lack necessary capabilities and Bean managed beans may be too slow for the large volume data queries needed. Accordingly, manipulation of the data as objects can be accomplished with the use of the TopLink relational mapping tool to manage O-R mapping and data management. O-R mapping can be accomplished through the TopLink graphical mapping tool, then encoded into a Java class (e.g., etmProject.java).

In the embodiment using the TopLink relational mapping tool, data is submitted from the GUI as XML (which is automatically converted into the corresponding Java class by the SoapServer) to the API Session bean. The data object (following the naming convention "DomainObject Data") validates itself and it's children. If the validation passes, the API bean registers it with TopLink. When the transaction commits, all objects contained by the current transaction are written to the database.

Header Tables

Many header tables in the system architecture are configured to provide a unique master ID key for an associated detail table. For those header tables that serve no other "business" function, the respective header tables have no corresponding EJB component. Rather, these header tables only have a Data Access Layer component. Accordingly, the DL component is called by the detail table's data access layer alone.

When a record is created on a detail table, the EJB layer "create" method is called to create a detail record. Inside the detail table's EJB Layer "create" method, the header table's Data Access Layer "create" method is called to generate a new header record. The detail table's EJB Layer "create" method will call the EJB Layer "create" method with the ID key of the header record created. The detail table's EJB Layer "create" method will also return the ID key of the header record created.

When a record is removed on a detail table, the detail table's EJB Layer "remove" method is called to remove all detail records for the corresponding header record. Inside the detail table's EJB "remove" method, the header table's Data Access Layer "remove" method is called to delete the corresponding header record. This occurs after the records have been deleted from the detail table.

Note that some header tables will contain information other than an ID key for detail records. Accordingly, these other header tables will have a corresponding EJB component.

With the embodiment of the architecture having the TopLink relational mapping tool, header tables gain more importance once they represent the foreign key that all children point to. Every table in the database will eventually be mapped to an object, including header tables. The data tree can either be built to flow down the hierarchy (child has foreign key to parent) or up the hierarchy (parent has foreign key to child) based on the domain object. For most objects, the flow is down. For example, consider the tables of FIG. 10.

In one embodiment, the object tree resembles the following:

```
DealHeader
+---Deal
+---DealLocation
    +---Point
    .
    .
    .
+---DealParty
    +---BusinessAssociate
```

The above is an illustrative example of walking down the hierarchy. Objects with foreign keys live under the table that contains the foreign key. In one embodiment, a majority of the data objects are organized in this manner.

According to the embodiments of the present disclosure, the energy market trading system, software, and method are directed to energy marketing and trading, and in particular, marketing deals and nominations. The energy market trading system provides a real-time system configured for use by traders, schedulers, and other system users. The system matches a workflow for system users and includes a number of usability features, as further discussed herein.

The energy market trading system is adaptable to meet a customer's business needs and requirements. The system includes software and hardware modules configured to provide a high degree of flexibility, scalability, and extensibility, for example, with the use of parameter driven business rules. The system also provides extensive hourly and sub-hourly capabilities.

System modules handle one or more of multi-currency, multi-unit, and multi-commodity energy marketing and trading requirements. The system modules further provide for a multi-language support. Implementation of the system can be accomplished via a hosted ASP or be locally deployable. The system is further characterized by an open architecture for supporting an ease of integration, as further discussed herein.

The energy market trading system, software, and method embodiments of the present disclosure provide a model for coupling a) contracts and deals with b) accounting via a single operations model architecture. That is, the system model operations architecture processes one or more of purchase, pooling, transportation, imbalance, sale, storage, and inventory between a) contract and deals and b) accounting. Functional examples of the operations model architecture include date effectiveness, deal entry, a pricing model, position management, inventory accounts, and nominations, as further discussed below.

With respect to date and time effectiveness, the architecture is configured to include base data attributes that are date effective. For example, base data corresponding to business associates, facilities, points, and accounts are configured to include date effective attributes. Date effective attributes enable tracking of changes in base data according to corresponding attributes over time. For example, a company name may change on a particular date, as indicated via a date effective attribute. Accordingly, on any given date, the energy trading and marketing system identifies the company by its most current name, as per the date effective attribute. Furthermore, the base data attributes enable the energy trading and marketing system to maintain accurate, reproducible results.

In addition to base data attributes, contract and deal parties are rendered date effective. Accordingly, the energy trading and marketing system supports mergers, acquisitions, and reassignments. Furthermore, with the system, all transactional data is time based. Accordingly, the system can perform auditing for all transactional data via the date effective attributes associated with transactional data.

With respect to deal entry, the energy trading and marketing system addresses and supports a number of deal types, including physical gas deal types, financial gas deal types, and scratchpad deals. The physical gas deal types can include one or more of purchase, sales, transportation, capacity release, and storage. The financial gas deal types can include one or more of swaps, futures, and options. Lastly, the scratchpad deals provides a workspace for one or more partial deals, pending deals, and "what if" deals.

In addition to supporting different deal types, the system facilitates quick deal entry via its usability. That is, the system provides quick deal entry with the use of multiple sets of preferences by user (search, displays, defaults), templates, price packages, profiles/patterns, and duplicate functionality. System time intervals include at least one of monthly, daily, hourly, sub-hourly, and patterns/profiles. The system further provides support for deals at trading locations, as well as a portfolio/book structure for deal entry.

With respect to the pricing model, the system includes a common logic model that applies across the entire application, including one or more of contracts, deals, purchases, sales, transportation, storage, imbalance penalties, cash in, cash out, and inventory valuation, in any combination. The system applies pricing with the pricing model in connection with contract, deal, and location, as well as with defaults, overrides, and best fit logic.

Accordingly, the pricing model offers flexibility and consistency. With respect to flexibility, the pricing model includes price formulas and quantity formulas, as well as extensive tier-ing scenarios. The pricing model utilizes any quantity type within the system. Furthermore, the pricing model offers flexibility in price packages and templates.

The pricing model offers familiarity and consistency for users across the system. The pricing model includes a single pricing engine for generation of consistent results. Furthermore, a single price resolution mechanism of the pricing model provides for easy reporting. The pricing engine includes a computer program configured to execute instructions according to various functionalities of the pricing model, as discussed herein, using programming techniques known in the art.

With respect to position management, the system architecture provides tracking of a deal by one or many positions.

Positions are the foundation for managing exposure in cash and future periods. The system architecture is configured to split positions across multiple books/portfolios. The system architecture also provides support for transferring positions between books/portfolios. Still further, the system architecture is configured to enable viewing of exposures by point, trading location, point groups, books and portfolios.

In connection with inventory accounts, the system architecture includes a configurable grouping mechanism for transactions. The configurable grouping mechanism supports one or more of balance calculations, imbalance management, cash in/cash out, imbalance trading, storage balances, interconnect balances, pool balances, inventory valuation, and inventory penalties. The system architecture provides support for grouping of inventory accounts for roll up purposes. The grouping mechanism utilizes price structures for penalties, valuation, cash in, and cash out.

With respect to nominations, the system architecture includes a full featured nominations interface. The nominations interface is configured to optimize scheduler's workflow. In addition, the nominations interface provides support for partial nominations (e.g., in progress), duplicate functionality, support for hourly and sub-hourly nomination, profile/pattern support, and focuses on usability and optimizing schedulers' workflow. Still further, the nominations interface is configured to track movements between deals and/or inventory accounts.

Details incorporated into the system architecture of the embodiments of the present disclosure include an object oriented design, a fully web enabled user interface, extensibility via plug in modules, use of published API's, security at the object and client company level, as well as, audit capabilities for all transactional data. Extensibility via the plug in modules provides an ability to readily adapt custom requirements into the base portion of the system architecture. The published API's provide a standardized mechanism for information exchange within the system architecture and with external applications as well.

The system modules communicate with one another via API's. The API's insulate the graphical user interface (GUI), reports, interface and custom applications from the architecture's database and any database changes. In addition, the API's use an XML-based interchange and open messaging transport. Accordingly, the API's facilitate real-time integration with other systems, such as, Risk, Exchange, and similar systems. Still further, the modules of the system architecture can be extended and/or replaced if desired for a particular implementation, via the API.

The system architecture according to one embodiment of the present disclosure includes a single multi-tiered architecture for operatively connecting different client systems into an integrated system utilizing a common interface method.

The system architecture further provides for data migration from a source database to a target database of the system architecture using a data preparation application, a staging preparation database, and a migration application. In addition, the migration application is operatively connected to the messaging layer. Messaging and business layer logic exercises the API and provides validated database entities on the target database.

The international pipeline and gas marketing market is following the U.S. market in its movement towards a deregulated and unbundled marketplace. This presents the need to address non-U.S. pipeline requirements, while maintaining GISB-compliance to address US market requirements. Accordingly, the system architecture provides a flexible product in support of the international market, further to provide international software that can easily handle regional settings and languages.

The system architecture of the present disclosure provides a highly scalable product that can perform satisfactorily in both small and large implementations. The system architecture also provides a flexible product that can be functionally configured to address the varied requirements of small and large pipelines alike.

As energy becomes more and more deregulated, the system of the present disclosure can be adapted to serve at least some of the business needs of the local distribution companies. These companies will need highly flexible systems that can effectively work with other systems and the somewhat unique requirements of the localities they serve.

The system of the present disclosure can be applied for use in the upstream production and gathering areas of the gas marketplace, in that the system can be configured and tailored to satisfy their needs.

The system of the present disclosure offers integration, flexibility and extensibility to allow for the incorporation of the most advanced analytics and optimization tools available in support of front office analytics and optimizations techniques of energy marketing and trading companies.

The system further provides a web-based product to support a variety of clients and that can be accessed through multiple browsers and platforms.

Furthermore, the system architecture integrates open browser support, e-mail, fax, instant messaging and integration with external systems to meet the needs of increasing growth of B2B (business to business) commerce.

The system also provides a highly scalable and configurable architecture with enhanced security and access services to meet growing demand for an Application Service Provider system solution.

The system architecture of the present disclosure provides greater flexibility in structuring deals. Capabilities include support for deals spanning multiple pipelines, more sophisticated deal pricing capabilities, deal pricing at the transaction point level and user specifiable rounding techniques.

A key aspect of a good gas pipeline and marketing system is demonstrated in how meter and station level information is entered and maintained. The system architecture of the present disclosure distinguishes between stations of a gas pipeline and marketing system, which are logical nomination points, and meters, which are physical measurement devices. Furthermore, certain station information, such as zone, maximum daily capacity, taxing jurisdiction, etc. are date-sensitive in the system architecture. To meet these growing needs of the domestic and international gas pipeline market, the system architecture restructures the way meter and station data is retained and managed.

With respect to providing support for hourly business processes, the system architecture supports hourly changes to nominations and is configured to comply with GISB intra-day nomination change requirements. The system architecture recognizes aspects of hourly business, such as individual hourly nominations, measurement, allocations or settlement. The system architecture is further configured to measure, allocate and calculate penalties for hourly variances. The system architecture also contemplates future hourly pipeline services that are likely to include hourly (or time of day) service rates and invoice settlements.

The system architecture provides support to manage customer business cycle intervals other than on a calendar month basis. For example, using time effective base data, the system provides the functional capability to invoice on a semimonthly, quarterly or annual basis, as well as, on a non-calendar month business cycle basis.

The system implements a multi-tier system architecture with clean logical componentization and parameterization, thus providing the larger pipeline market with a highly scalable, functional and flexible energy market trading and transaction product. The system architecture facilitates easy external customization through applications programming interfaces (APIs) that can be configured to handle the unique needs of a particular pipeline (such as penalty calculations).

The gas and pipeline marketing and transaction management solution of the present disclosure addresses new and enhanced functionality as described herein as well as having an ability to address the emerging domestic and international requirements. A brief discussion of some of the functionality of the gas and pipeline marketing and transaction management solution are provided below.

The base information module maintains information about baseline data required by the rest of the system, such as, Counter-Parties, Pipelines, Nomination Points, Meters, Units, Currencies, Rates etc.

The contracts module maintains information about buy/sell, transportation, storage, pooling and capacity release contracts that the marketer or pipeline has with its customers. The contracts module includes Title Contracts and Custody Contracts containing base agreement information, and specifications representing terms, points, quantities and pricing details that are used for billings and payments. Additionally, pricing indices are maintained within the contracts module.

The Deal Making module maintains information about the transactions and deals that marketers are involved in. The module includes Buy and Sell deals along with other applicable transactions such as broker commissions. Provisions for multiple pipelines and point-level pricing are included along with complex multiple-component formula-based price calculations. Deals points, quantities and pricing details are used for invoices and remittances.

The Nomination module is configured to receive and/or create transportation, storage, pooling and interconnect nominations, and to perform pool-to-pool transfers. The module provides the capability to handle various nomination models, including GISB and international requirements.

The capacity management and confirmations module is configured to enable scheduling of pipeline capacity and prioritize contractual volumes based on parameter-driven scheduling and curtailment rules. The function of the capacity management and confirmation module allows the user to model a pipeline and to set constraint points and other criteria that permit tariff compliant reduction of flowing volumes. The module is also configured to provide confirmation of nominated and/or scheduled quantities at the nomination point level by operator, agent or shipper.

The allocations and balancing module maintains allocations information including configurations of tiers, PDA Rules, and rules. The module accepts meter and point information and calculates imbalances and point variances based on nominated, scheduled and measured volumes.

The accounting and settlement module provides suitable processing to consolidate all contracts, deals, scheduling and allocations information for generating invoices and/or remittances for the marketer or pipeline customers. The module also supports external penalty calculations to be configurable with differing pipeline tariffs. Other capabilities include specification of override rates and prices, processing of prior month adjustments, and calculation of taxes. The accounting and settlement module also includes G/L account assignment, calculation of accruals for business not yet finalized, and support of interfaces to external General Ledger and Accounts Receivable systems.

Gas Marketing Business Process Overview

Figure 11:
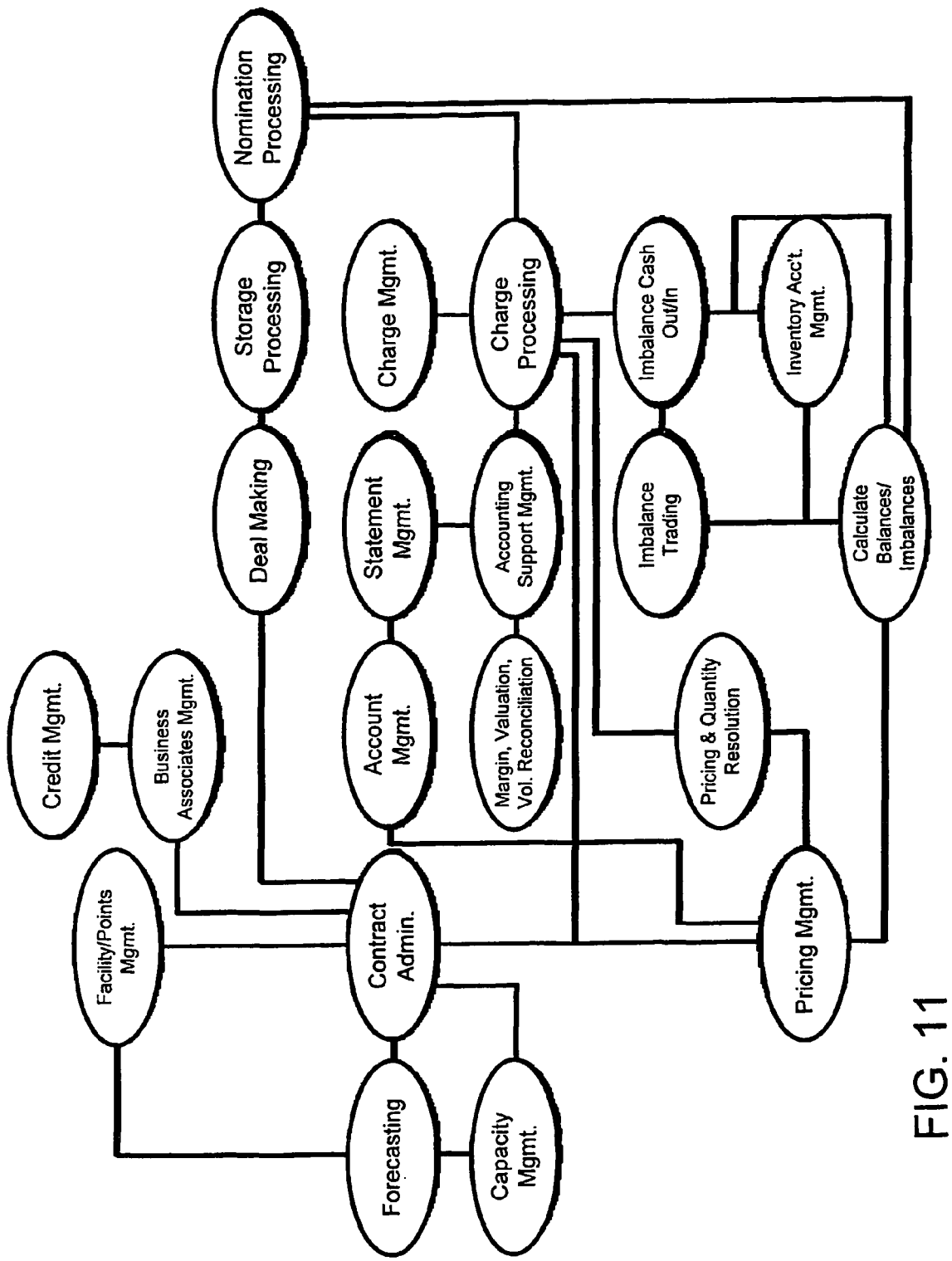
FIG. 11 illustrates a flow diagram view of a Gas Marketing Business Process, according to one embodiment of the present disclosure.

The following discussion relates to the flow diagram of FIG. 11, which illustrate interconnections of the various modules of the system of the present embodiments.

Imbalance CashOut-CashIn

Imbalance CashIn/CashOut is related to the requirements of Charge Processing, Charge Management, and Inventory Account Management, which describe the balance levels and the rules surrounding the calculation of the imbalance quantity.

The process of CashIn and CashOut involves the increase or reduction of the imbalance quantity and creating an associated charge. A CashIn is usually from the aspect of increasing or establishing an imbalance quantity. A CashOut is usually from the aspect of decreasing or removing an imbalance quantity. However, these requirements do not limit the direction of imbalance adjustment.

The two methods provided to manage imbalance quantity and create imbalance charges in accounting are Auto CashOut and Manual CashOut/CashIn. Auto CashOut uses user defined cashout rules associated with an Inventory Account of Imbalance that will control the creation of charges and adjustment of imbalance based on desired rules. Manual CashOut/CashIn requires the user to enter the quantity and the price for each increase or reduction.

Prior Period Adjustments of imbalance are supported. The effect of these prior period adjustments can cascade through many periods of imbalance. Any charges or penalty-based charges can be reversed and adjusted.

Charge Management

Charge Management is related to the requirements of Charge Processing and Accounting Requirements. The main business requirements related to managing generated charges are: viewing charges, approving charges, updating charges, managing charge statuses, and finalizing charges as outlined below. In one embodiment a user can go to one screen to accomplish one or more of these functions.

Charge Processing

Charge Processing is related to the requirements of Price Management, Deal Maker, Accounts, Contract Administration, Imbalance CashIn/CashOut and Gas Control. Charges produced by the Energy Transaction Accounting System represent the types of activities priced at any of the defined objects.

Various types of charge calculations can be performed and business charges generated. The calculation methods or algorithms can be user supplied which offers flexibility in charge production.

Various processes occur in conjunction with producing a charge or evaluating a charge for recalculation. For example: performing a unit conversion requires the storage of utilized heating values, removing obsolete charges that are no longer applicable, performing a currency conversion requires tracking the currency exchange rates utilized and the requirement to evaluate existing charges to determine if a prior period adjustment needs to be created.

Various requirements exist for Tax Charges. Taxes are significantly different from regular charges in their timing and application. Multiple jurisdictions can apply to a location with each having multiple tax types and multiple exemptions.

Margins, Volume Reconciliation and Valuations

Margin Analysis and Volume Reconciliation are business activities that provide summarized information on quantities and dollars. Margin analysis places emphasis on the dollars, while volume reconciliation places the emphasis on the quantities.

Margin analysis includes operating P&L and Balance Sheet views. These views provide summarization and comparison of revenues vs. expenses and balance sheet items in order to estimate or analyze the margin, assets, and liabilities of the organization. Organizations use different methods to calculate their margin and deferrals, so there must be flexibility in defining charges as revenue, expense, asset or liability.

Statement Management

Statement Management relates to the requirements of Charge Management and introduces the requirements of statement generation separately from charge generation and management. Subsequent statement generation will be using grouped charges to produce a statement.

Charges will default to be grouped by Account and manual grouping (overriding the Account) can occur if required. Only those charges that have been approved/updated are available for the statement generation process unless a parameter has been defined stating approval of charges is not required. Once charges are processed for statement generation, records are written to the statement table.

When finalizing a statement (either batch or manual), the status of the charge record is marked as 'Final'. Physical separation of the statement generation process from the charge management process facilitates the separation of the charge information from the statement information.

The print process can be separate and external to the statement generation function found in the system. The capability to view charges is provided from the perspective of statement generation if needed for an external process. The statement data is one of the sources for sub-ledger or GL interfaces.

Accounting Support Management

Accounting Support Management has functions that will precede charge process (i.e. Price Component definition, Tax Rate Management) while others can follow charge production (i.e. Accrual Management or Accounting Close). Many of these functions are optional depending on the business rules to be enforced within a company.

Accounting Management

Account Management is an integral part of the overall accounting process and requires familiarity with the requirements for Business Associates Management. An Account is a grouping of charges for settlement and will be used for statement generation and processing parameters. Accounts provide the ability to group or segregate charges. Grouping all Purchase and Sales activities on one statement will support a statement-netting requirement and can separate the statements by activity type.

Account Groups supports the linking of multiple Accounts. Account Groups allow flexibility in determining which Business Associate(s) are responsible for the accounting and which get copies only of the statements.

Pricing may be at the Account level, as opposed to the Contract or Deal level. For example, Broker Fees or Subscription Fees may apply to a Business Associate, regardless of any trading or contractual activity that may occur. The Account information may include, for example, one or more of: Entity; Business Associate; Type of Account; Language to be used for the Statement; Currency; or Statement Terms.

Business Associate Management

A Business Associate is defined as any party with whom the owner of the system is doing business or tracking transactions and may be a corporation, company, or an individual.

Business Associate Management includes the maintenance of all information that is associated with a Business Associate. Most of the information will be maintainable on a date effective basis, due to the high number of mergers, acquisitions, and name changes. The Business Associate Information change history will be readily accessible to users.

Business Associate Management also includes the maintenance of Entity information—who is the 'owner' of the information contained within the system, who generates statements for the customers, etc.

System users may have an interest in maintaining contact information, which is an integral part of Business Associate Management, however that function may be limited to a group of users who will be responsible for managing the bulk of the Business Associate information.

The EDI agreements, which are critical for Interstate Pipelines, are managed as a function of Business Associate Management. This information includes the terms of the agreement and the data sets that are included within the agreement.

Credit Management

Credit Management consists of several key areas. Typically, the credit management team within an organization will assume the responsibility of monitoring the outstanding credit exposures, receiving notification when credit limits are exceeded, and setting and maintaining the credit limits for their Business Associates. Available Credit is defined as the Credit Limit(s) less any outstanding Credit Exposure.

Credit exposure is calculated for all Contracts and Deals that are managed within the system. In addition, it is a requirement to allow credit exposure to be effected by transactions outside of the system, whether they are manually entered or processed through an API. The impact of the Contract or Deal credit exposure can also be overridden if more accurate information is available.

Credit checking will be a requirement within Credit Management, Contract Administration, Deal-Making, Capacity Release, and Account Management. For each business activity that has pricing associations, the credit implications must be reviewed. If the value of the deal, contract, or other credit-related business activity exceeds the credit limit for the Business Associate, Credit Management will either need to extend the credit limit, or the business activity will be rejected.

Credit Management determines the action to be taken when the credit limit is exceeded by business activities. These actions are set at the entity level, but may be over-ridden at the Business Associate level.

Facilities and Points Management

Facilities and Points management is a critical area of operational information, both from a Marketer's perspective and a Facility Operator's perspective. Nomination, Confirmation, and Scheduling transactions are based on facilities and points.

A Facility is a representation of either a logical or physical operational grouping of points. Examples of facilities are Pipelines, Gathering Systems, Storage Systems, and Power Transmission Facilities.

Points are defined as a place to capture physical or conceptual business transactions within a facility. Points are used extensively within all functional areas of an organization including Contract Administration, Deal-making, Operations, Forecasting, and Accounting.

Not all facility types will perform the same business activities. The focus of the requirements is to address the business needs of the FERC Regulated pipelines and other facility types, including the international pipelines, gatherers, and transmission facilities.

The Facility information may include, one or more of: Type of Facility (Pipeline, Gathering System); Regulatory Agency (FERC, TRRC); Operational Business Activities that a Facility performs (Nominations, Confirmations, Scheduling, Allocations); Cycles for the Business Activities; Groupings within a Facility (Zones); Segmentation of a Facility; and/or Defaults to be used for Facility Management.

The Point Management information may include, one or more of: Type of Point (Transmission, Interconnect, Pool); Defaults to be used for Point Management; Relationships of Points to each other (for Interconnects, Hubs, etc.); Capacities of the Points; Business Associates who have an interest in the Point; and/or Analysts who are responsible for the Point.

Inventory Account Management

An Inventory Account is a transaction grouping mechanism, combined with a set of rules and parameters, to be used in Balancing as well as in Imbalance Trading, Cash-out, and Imbalance Valuation.

For Balancing, the calculation of Imbalance quantities, the operational transactions are aggregated based on the Inventory Account assignments. The Inventory quantity is calculated as the Receipts for the aggregated transactions, less any Fuel and less the Deliveries. An association is established between Accounts and business objects to allow the accurate calculation of Inventory Quantities. An Inventory Account may be associated with the Shipper, Contract, Contract Service, Contract Path, and/or Contract Point. The resulting aggregation is then available to other processes that are dependent upon the Inventory Quantity.

Imbalance Trading, Cash-out, Penalties, and Valuation are all dependent upon a set of rules associated with an Inventory Account. The type of rule, the granularity, and a price structure to be used for valuation, cash-out, and penalties are specified. Business Associates may wish to provide customers with the capability to have these activities at different levels of granularity (for example, Daily Cash-out but Monthly Trading, or Hourly Penalties and Daily Cash-out and Trading), the rules for each activity may be at different levels. It is also possible that a customer may not wish to offer all of the activities. The regulated pipelines will be more likely to have Cash-out and Trading, while the unregulated pipelines may only need the Inventory Accounts penalties.

Any balance left in an Inventory Account may be valued as inventory rather than cashed-out completely. Generally, there is an Inventory Statement that is generated to reflect the starting position, the activity, and the resulting position. The Shipper and Operator Imbalance Inventory Accounts can be associated to any one of the following: Shipper; Contract; Contract Service; Contract Point; and/or Contract Path.

Pooling, Storage, and Interconnect Inventory Accounts can be associated as discussed in the following.

Points (logical or physical): The association of the Inventory Account to one of the items listed above will dictate how the Imbalance quantities for operational transactions are to be aggregated and a shipper may have multiple Inventory Accounts. In addition to the multiple and flexible aggregation levels, this approach allows the user to establish the rules at the Inventory Account level and to use those rules multiple times without having to restate the rules each time.

The trading of Imbalance quantities between shippers requires specifying the Inventory Account at multiple levels. There are economic factors that would cause a pipeline to force trades to occur only on quantities within a certain market area. A pipeline has no control over the trades between shippers unless the granularity of the Inventory Account is at that level.

Shippers may need to group Inventory Accounts together for roll-up purposes. For example, a Shipper may do cash-out at a Contract/Account level, but may do Imbalance Trading at a Shipper/Account level. If a roll-up Inventory Account is used, the distribution order must be stated so that if activity occurs at a roll-up Inventory Account it can accurately be distributed to the other Inventory Accounts. Multiple types of Inventory Accounts will be supported. Each of the Inventory Account types will have processing and validation rules that are specific to the type. Inventory Accounts to be supported includes at least one of the following: Shipper Imbalance; Operator Imbalance; Storage; Interconnect; and Pooling.

The Inventory Accounts for the Shipper in the above example are: Account 1—includes all activity for Contract A, and all activity for Path 1 on Contract B; Account 2—includes all activity for Contract B except for Path 1; and Account 3—is a Shipper Roll-up Inventory Account (note, if there were additional contract activities for the Shipper which were not defined to a different Inventory Account, the other activities would also rolled into Inventory Account 3).

For the Imbalance Period, the following nominations/allocations occur:

|  |  | Rec | Fuel | Del |
|---|---|---|---|---|
| Contract A | Point 1 R – Point 2 D | 100 | 10 | 88 |
| Contract B | Point 1 R – Point 2 D | 500 | 50 | 460 |
| Contract B | Point 1 R – Point 3 D | 700 | 70 | 600 |

Based on the Inventory Account Groupings shown above, the Imbalance Quantity for Inventory:

Account 1 would be −8 (600−60−548).

Account 2 would be +30 (700−70−600).

Account 3 would be 22 (−8+30).

For Imbalance Valuation, Imbalance Trading, and Cash-out, consider the following example:

A shipper has two Inventory Accounts, both with a type of 'Shipper Imbalance'. The rules for all imbalance quantities associated with Inventory Account 1, which covers 3 of his contracts, with the first 50% of the Imbalance Quantity is cashed out at $2.00. The remaining 50% of the Imbalance Quantity is held in inventory and valued at $1.50. The shipper is not allowed to trade any of his Imbalance Quantity on these 3 contracts.

The rules for Inventory Account 2, which cover all remaining contracts for the shipper, say that all quantities associated with Inventory Account 2 are eligible for Imbalance Trading, and that all of the quantity remaining after the Imbalance Trade window is closed is cashed out at $5.00.

The Inventory Account information may include, at least one of the following: Entity; Business Associate; Indication of whether the Inventory Account is Volume-based or Value-based; and method to use for valuing Accumulated transactions (LIFO, FIFO, Pro-Rata);

For each Inventory Account, the rules are specified. The rules information may include, the following: Indication of whether the rule is a Cash-Out, Trade, Penalty, or Valuation Rule; Granularity for the rule (hourly, daily, monthly); and Price Structure to be used.

Inventory Accounts may be grouped together for roll-up purposes. The group information may include, at least one of the following: Indication of which Inventory Account is the Roll-up Inventory Account; Distribution parameters for the other Inventory Accounts (if activity occurs at the roll-up Inventory Account, how does the user wish to allocate the effects of that activity to the other Inventory Accounts).

Resolving Prices and Quantities

Resolution is solving a pricing formula or quantity formula. The resolved price or quantity can then be used for display or charge processing. Deal Maker, Contract Administration and Price Management are related in connection with resolving prices and quantities.

The Price Structure contains two elements for formulas, the Price Formula and the Quantity Formula. The user can specify simple to complex algebraic algorithms to determine a price with the Price Formula. The Price Structure itself contains a multiplier and increment, which can adjust the resolved price or fixed price, and is entered by the user. The Quantity Formula provides a means to reference a specific quantity on which to base a charge or build a complex algebraic algorithm if necessary. A quantity formula is also used to specify a TierLevel Quantity by reference. The formulas provide flexibility and extensibility.

- A Price Formula can be specified on the price structure associated to an object (for example: Contract, Deal, Deal Point, Path, etc.). The user can specify a fixed price or specify a pricing formula. A pricing formula can be comprised of an index reference, formula or complex formula set. The pricing formula allows for a series of algebraic commands, multiplier, increments and combinations of indexes.
- A Quantity Formula can be specified on the price structure associated to an object (for example: Contract, Deal, Deal Point, Path, etc.). The customer can specify a reference to a quantity type and build an algebraic relationship between various quantities. The quantity formula allows for multipliers and specification of minimum or maximum quantities. The quantity formula is used to determine the Billable Quantity on which a charge can be based. It can also be used to specify a Tier Quantity.

One of the primary advantages of utilizing the new architecture is the ability to reuse or share components. Published APIs for external use facilitate reusability. In addition, Integration Points exist for the feed of Index values. As index values are inserted into the system, an event trigger will process pricing formula resolution.

Pricing

Pricing is an integral part of the overall accounting process and is related to the requirements for Contracts, Deals, Business Associates, and Accounts. The requirements of pricing are capturing pricing information, grouping pricing information into packages for easy re-use, and maintaining indexes and formulas.

Pricing for purchases and sales, as well as transportation rates, focus on capturing and associating prices/rates, miscellaneous fees, charges, penalties and credits for a point, deal, contract, account, or business associate.

A price structure is the mechanism used to associate a price with the above objects. Multiple price structures can be associated with a single object. The word 'object' in this document refers to an item that has its own identity in the system and to which items can be attached. A price structure also captures the information required to generate a charge.

The Pricing information may include, one or more of: Price/Rate Information: defines the method for determining the price (fixed value, index, formula, tiers, etc.); Quantity Information: defines the method for determining the quantity (MDQ, flow based, difference between Scheduled and Actual, etc.); General Information: provides definition to the price structure (label, effective dates, etc.); Association method information: enables the user to aggregate price structures at a higher level than they are applied; and Charge Generation Information: provides the additional information the system will need to generate a charge from the price structure.

The types of pricing that are supported via price structures include: Price structures for transactions related to purchases and sales and price structures for transactions related to service contracts.

Transactions related to Purchases and Sales, for example:
$2.00 per Mcf based on actual flow.
95% of Inside FERC First of Month posting for ANR-OK+ $0.05 per Dth based on deal volume.
Avg of (98% of Inside FERC First of Month posting for ANR-OK+Inside FERC First of Month posting for El Paso–Permian Basin+$0.02) with a floor of $1.50 and a ceiling of $4.00 based on actual flow for all points associated with a deal.

Price structures for these transactions can be associated to one or more of: Account; Contract; Deal; and Point.

Transactions related to Service Contracts, for example:
$0.10 per Dth based on actual flow at the receipt meter for all nominations for a contract.
Inside FERC First of Month posting for ANR-OK per Dth based on Contract MDQ+10%.
$0.05 per Mcf based on the difference between Scheduled volumes and Actual flow volumes for all nominations of the GISB transaction type of Current Business.

Price structures for these transactions can be associated to one or more of: Account; Contract; Path; and Point.

Contract Administration

Capacity Administration is related to the requirements of the Business Associates, and Facilities and Points Management requirement documents. Contract Administration is the managing of all contractual information that is needed by operational or accounting processes. A Contract is the legally binding agreement between parties to provide goods or services. A Contract Service is the definitive structure within a contract that defines the rules and requirements for further processing.

The Contract information may include, one of the following: Type of Contract (Commodity, Service.); Contract Parties (Counter-party, Shipper); and Contract Dates (Start, End).

The Contract Service information may include, one of the following: Type of Service (Transportation, Purchase, Sales); Level of Service (Firm, Spot, Term); Quantities; Capacities; Points; and Paths.

The types of Contracts that are supported include: Commodity, Service, and Master Agreements. Commodity contracts are used for sales or purchases of a commodity or commodities. Service contracts are used in performance of a service. Master Agreements are used to manage Capacity Release agreements.

The types of Contract Services supported are Commodity Contract Services and Service Contract Services.

Commodity Contract Services can include: Spot Purchase; Term Purchase; Spot Sale; and Term Sale.

Service Contract Services can include: Firm Transportation; Interruptible Transportation; Firm Transmission; Non-Firm Transmission; Firm Storage; Interruptible Storage; Gathering; Parking and Lending; and Balancing.

Capacity Management

Capacity Management includes all activities that a facility's personnel or a marketer's personnel perform on a regular basis. The facility operation's activities will include analyzing the capacity, managing the capacity release, and managing the facility capacity auction. The marketer's activities will include analyzing the capacity, releasing and acquiring firm capacity, and participating in facility auctions. Capacity Management is related to the requirements for Contract Administration and Pricing Management.

A facility's capacity is the amount of space available on the facility. The capacity can be determined for the entire pipeline, a portion or segment of the pipeline, and for specific points.

A firm transportation contract grants capacity to a service requester at one or more points along a pipeline. Capacity is either specific to location (point) and quantity or is general to location and specific as to quantity. A firm transportation contract gives a service requester the right to cause a transportation service provider to receive a specific quantity of gas from that service requester at a point and/or deliver a specific quantity of gas to that service requester at point over a specific time period.

Capacity Release is the mechanism that has been established to allow shippers the ability to release their excess capacity to another shipper. This is an offer, bid, and award process that can be accomplished either on the Internet or through EDI datasets.

With the advent of the capacity release market, the FERC required pipelines to openly post the deals that their service requesters were seeking to transact. The Commission set up a process whereby all releases would, at a minimum, be posted for informational purposes. If the release was for more than one calendar month, the release was required to be at "Maximum Rate" or to be available for open bidding by all prospective service requesters. The FERC required each pipeline to establish an electronic bulletin board (EBB) through which capacity being released could be posted and offered for sale and upon which prospective service requesters could bid, on-line, for such capacity.

Capacity Auction is the mechanism that has been established to allow pipelines the ability to auction their excess pipeline capacity. This is an offer, bid, and award process that can be accomplished on the Internet.

Capacity Analysis is the process that either the shipper or the pipeline uses to determine their capacity availability and requirements. Under-utilized capacity or over-subscribed capacity could result in a pipeline conducting an auction or offering discounts. Underutilized capacity or oversubscribed capacity could result in a shipper releasing capacity and amending its contract accordingly. If a shipper has a capacity deficit, it could (by request to a pipeline) trigger a capacity auction.

Deal Management

The major business requirements of Deal Management are deal capture, confirmations, bid/offer tracking, position management and credit checking. Deal Management is related to the requirements of the Contracts, Business Associates, and Accounts requirement documents.

A deal is an agreement between two parties to exchange assets or provide a service. The types of deals include physical and financial transactions for natural gas and power and deals such as purchases, sales, transmission, transportation, storage, and capacity release. The general information captured for a deal include:

Deal information—contains the basic information for the deal including the counter-parties, broker(s), and, if applicable, term/dates, contacts, contract relationship, confirmation status/date, etc.

Deal service(s)—the deal may contain one or more services which represent the deal type, location, service type (gas purchase, physical option, etc.), service level, term, etc.

Deal Point(s)—the deal point provides detailed information related to the physical delivery of the commodity associated with the deal.

Deal Path(s)—the deal may contain one or more transportation/transmission paths, which represent the capacity associated with the deal. The deal path will be based on the facility from which the service is provided.

Future Contracts—for exchange traded deals; this will reflect the contract traded, the number of contracts/lots traded and the associated pricing.

Storage—for storage deals (including parking and lending), this will contain information related to the storage capacity, injection/withdrawal quantities, etc.

The types of deals which are supported include:

Example 1

A fixed price physical gas sale between XYZ Marketer and ABC LDC for $4.10 with a 6-month term January-June 2001 for 10,000 MMBTU/Day for delivery at Transco Station 65 would be:

Deal information—Buyer—ABC LDC, Seller—XYZ Marketer, dates Jan. 1, 2001-Jun. 30, 2001

Deal service(s)—Deal service type—Sale, Commodity—Gas, Location—Transco Station 65, Service Level—Firm a Deal Point(s)—Delivery Pipeline—Transco, Delivery Point—Meter 12345, Quantity—10,000 MMBTU/Day.

Deal Price—$4.10 per MMBTU

Deal Path(s)—(Not Applicable).

Future Contracts—(Not Applicable).

Storage—(Not Applicable).

Example 2

A fixed price physical power purchase between XYZ Marketer and ABC Power Marketer brokered by 123 Broker for $50.00 per MWh with a 6 month term January-June 2001 for 50 MW/hour on a 5×16 excluding NERC holidays for delivery at Palo Verde would be:

Deal information—Buyer—XYZ Marketer, Seller—ABC Power Marketer, Broker—123 Broker, dates Jan. 1, 2001-Jun. 30, 2001

Deal service(s)—Deal service type—Purchase, Commodity—Power, Location—Palo Verde, Service Level—Firm w/Liquidated Damages Deal Point(s)—Delivery Point—Palo Verde 250 KW bus, Quantity—50 MW/hour on a 5×16 excluding NERC holidays.

Deal Price—
(1) $50.00 per MWh
(2) Broker Fee—$0.01 per MWh payable to 123 Broker Deal Path(s)—(Not Applicable).

Future Contracts—(Not Applicable).

Storage—(Not Applicable).

Example 3

XYZ Marketer acquires 5,000 MMBTU/Day of transportation capacity from ACME Pipeline from Zone 1 to Zone 3 for $0.15 per MMBTU demand charge and $0.05 per MMBTU commodity charge:

Deal information—Buyer—XYZ Marketer, Seller—Acme Pipeline, dates Jan. 1, 2001-Jan. 31, 2001

Deal service(s)—Deal service type—Capacity Release, Commodity—Gas, Facility—Acme Pipeline, Service Level—Firm Deal Point(s)—(Not Applicable).

Deal Price—
(1) Demand Charge—$0.15 per MMBTU For Zone1 to Zone3 Capacity Delivered Quantities
(2) Commodity Charge—$0.05 per MMBTU For Zone1 to Zone3 Capacity Delivered Quantities
Deal Path(s)—From Zone 1 to Zone 3, 5,000 MMBTU/Day of Capacity
Future Contracts—(Not Applicable).
Storage—(Not Applicable).

Division of Interest Processing

Division of Interest Processing is related to the requirements for Contract Administration. In addition, the Interest Ownership of a wellhead is managed through the Division of Interest assignment. Three types of interest owners are specified—Working Interest Owners, Royalty Interest Owners, and Equity Interest Owners.

The Working Interest is specified at the Point level and may be specified for any Contract Service. The percentage of interest for a Working Interest Owner is used to calculate the quantity that the owner is entitled. The measured quantity is multiplied by the interest percentage, resulting in the allocated quantity to the Working Interest Owner. A wellhead may have multiple Working Interest Owners, but the ownership percentages may not total up to more that 100%. Procedures must be in place to resolve situations where undedicated interest exists (where the Working Interest Owner percentages sum up to <100%).

The Royalty Interest is specified at the Point level and may be specified for any Business Associate. The Royalty Interest Owners are those who share in production free of costs if and when there is production. The Operator of the Point is responsible for providing the Royalty Interest Ownership breakdown and the Over-riding Royalty Interest Owners must be identified.

Gas Quality Rules Processing

Gas Quality Rules Processing is related to the requirements for Contract Administration, Measurement and Sampling Management, and Pricing Management.

Contracts (Service and Commodity) or Contract Services may have clauses to allow for penalties and charges if the gas that is being measured is not according to specifications set forth in the contract. These clauses, or rules, are specified at the Contract Contract Service, or Contract Service Point level.

The value of the measured sample is compared to the Gas Quality Rule for pricing. If the measured sample value falls outside of the terms of the gas quality rule additional charges for the Contract, Contract Service, or Contract Service Point must be created.

There may also be situations that warrant a credit or charge if the sample falls within the terms of the gas quality rule associated with the Contract, Contract Service, or Contract Service Point. The information captured will support either condition.

Heat Content Rules Processing

Heat Content Rules Processing is related to the requirements for Contract Administration and Facilities and Point Management.

Contracts (Service and Commodity) or Contract Services may stipulate the use of a Heat Content type. This type may be different from the default Heat Content type used in converting a volumetric quantity to energy, or an energy quantity to volume. These clauses, or rules, are specified at the Contract, Contract Service, or Contract Service Point level.

The Heat Content Types and their associated values are received as a function of measurement sampling. When a volumetric quantity is nominated, scheduled, confirmed, or allocated, the appropriate Heat Content type is critical for converting from volume to energy or energy to volume for quantity maintenance.

The hierarchy for determining the correct Heat Content value to use is Contract Service Point, Contract Service, and then Contract. If no Heat Content rule has been specified at any of those levels, the Heat Content of the point should be used. The default facility Heat Content should be used if there is no Heat Content at the point.

Due to the fact that Contractual Heat Content Rules may differ from what is used by the Facility or Point, the aggregation of quantities at a Point using the Contractual Heat Content Rules may differ from the quantity at the Point or Facility.

Allocations Processing

Allocations Processing is related to the requirements for the overall process of providing transportation services and/or utilizing transportation services and Nomination Processing, Confirmation Processing, Scheduling Processing and Measurement/Sampling Management.

Allocation Processing includes all allocation-related activities that a facility's operations personnel perform on a regular basis. These activities include pre-determined allocation (PDA) rules maintenance, performing validations on PDA's and allocation processing, and reviewing the allocated quantities before publishing the allocation information to other operational areas, other facilities or marketers.

Allocation Requirements

The allocation requirements for business processes define facilities (regulated or non-regulated) that require nominations from their shippers prior to gas flow and non-regulated facilities that utilize Division of Interest (DOI) percentages for allocating quantities at points.

International nomination data elements are similar to North American (GISB) required elements. Allocation Requirements also defines requirements unique to International customers, Non-regulated customers and new/enhanced functionality requirements outside the scope of GISB.

Terminology

Allocation—Allocation is defined as the systematic distribution of measured quantities at a point that can involve nominations, purchase and sales contracts, logical points, entities, and other objects.

Pre-Determined Allocation (PDA)—Actual flow of natural gas is allocated to the parties involved in the transaction. These parties can include producers, operators, transporters and shippers using various methodologies to allocate actual quantities. In order to manage the impact of actual quantities varying from scheduled quantities, the specification of the method to be used in allocating actual quantities prior to gas flow is imperative. PDA's accomplish this goal by securing the agreement of the allocating—and allocated-parties on the method to be used for computing the allocation, i.e. relating scheduled quantities to actual physical flow. The implementation of a PDA clarifies all parties' expectations and responsibilities prior to gas flow.

The list of allocation methodology types from which two parties may agree is Ranked, Pro Rata, Percentage, Swing and Operator Provided Value.

Ranked—The quantity to be allocated utilizing this methodology is allocated by taking the individual line item transactions which are allocated based on ranks identified for the transaction(s), with the transaction(s) with the lowest rank value allocated before the next sequentially higher ranked transaction(s).

Pro Rata—The total quantity to be allocated is multiplied by the ratio established by taking each individual scheduled line item and dividing it by the total of all scheduled line items applicable to the quantity to be allocated.

Percentage—The allocation is derived by taking the total quantity to be allocated at a location and multiplying it by the percentage(s) provided. When percentage is the only methodology provided the percentages should total 100.

Swing—One or more of the scheduled line items, or a separate contract, is designated as the "swing". All other scheduled line items are allocated the scheduled quantity. The line item(s) identified as "swing" are allocated the remaining difference between total quantity to be allocated and quantities allocated to non-swing line items, in accordance with instructions provided with the PDA. If the swing line items(s)/contract(s) are not permitted to be allocated a quantity which would result in a negative number, the negative quantity is allocated to the remaining scheduled line items.

Operator Provided Value—A mutually agreed upon allocation methodology that indicates that the operator will provide a quantity for the subject transaction(s) for use in the allocation.

Balance and Imbalance Calculation

Balance and Imbalance Calculation are related to the requirements for Nominations, Scheduling, Allocations Processing, and Inventory Account Management.

The terms Balance and Imbalance are often interchanged within the industry. Balance will be used to define the difference or an out-of-balance condition between two numbers and will have to be resolved (or not) according to other requirements. A Balance is calculated for processing purposes, but never stored. An Imbalance defines the difference between receipt, fuel, and delivery quantities. The Imbalance will be resolved according to other requirements, i.e., Imbalance trading and Cash-out. Starting, current, and ending quantities are associated with Imbalances.

Balance and Imbalance Calculations identify the different types and levels of imbalance and balance calculations required throughout the project. Several of the other requirement definitions make reference to "Balance and Imbalance Calculation" and each has different requirements on what to do with the difference identified.

Terminology

Shipper Imbalance—The difference between receipt quantities, less fuel quantities, less delivery quantities. Imbalance can be at different levels i.e. path, contract, shipper, agent, etc.

Point Balance (Quantity vs. quantity)—The difference between two quantity statuses at a point. One example would be the difference between the scheduled or nominated and allocated measured quantity. Another example would be the difference between the deal quantity and the nominated quantity. Another Point Balance is the difference between the receipts and deliveries at a point with the same quantity status. An example of this would be the difference between the receipt and delivery nominations at a pooling point.

Nomination Balance—The difference between the path quantities and point quantities that are inherent in pathed non-threaded nominations model types. The quantities could be nominated, confirmed, scheduled or allocated volumes.

Interconnect Balance—The difference between the quantities into and out of an interconnect. An interconnect is a relationship between multiple points.

Confirmations Processing

Confirmations Processing is related to the requirements for the overall process of providing transportation services and/or utilizing transportation services and Nomination Processing.

Confirmation processing includes all confirmation-related activities that a facility's operations personnel perform on a regular basis. These activities include maintaining the rules for confirmation methodologies, processing confirmation requests, performing validations on confirmations, acknowledging confirmation responses, updating quantity statuses and reviewing the confirmed quantities before publishing the information to other operational areas for scheduling.

International confirmation data elements are similar to North American (GISB) required elements. Where there are common data elements, the GISB version 1.4 Standards capture those requirements. The remainder of the document focuses on requirements unique to International customers, Non-regulated customers and new/enhanced functionality requirements outside the scope of GISB.

Terminology

Confirmation Requester—A Service Provider (including a Point Operator) which is seeking to confirm a quantity of gas via the information outlined in GISB Standard 1.4.3 with another Service Provider (the Confirming Party) with respect to a nomination at a location.

Confirming Party

A Service Provider (including a Point Operator) which provides a confirmation for a quantity of gas via the information outlined in GISB Standard 1.4.4 to another Service Provider (the Confirmation Requester) with respect to a nomination at a location.

Confirming Parties—Refers to the Confirmation Requester and the Confirming Party.

Confirmation by Exception ("CBE")—The Confirming Parties agree that one party deems that all requests at a location are confirmed by the other party (the CBE party) without response communication from that party. The CBE party can take exception to the request by so informing the other party within a mutually agreed upon time frame.

Elapsed-Prorated-Scheduled Quantity

The portion of the scheduled quantity that would have theoretically flowed up to the effective time of the intraday nomination being confirmed, based upon a cumulative uniform hourly quantity for each nomination period affected.

Forecasting

Pipeline Forecasting is related to the requirements for Scheduling, Deal Management, and Allocations Processing. Forecasting is the process by which pipelines and marketers predict information that will affect future operations, either near-term or long-term.

Pipeline Forecasting has defined three required operating modes; Short-Term Capacity Utilization, Short-Term Capacity Availability, and Long-Term Investment Analysis. Short-Term Capacity Utilization involves predicting the pipeline's capacity to handle the current nomination load under impending reductions in service capacity. Short-Term Capacity Availability is used to determine where the pipeline is currently being under-utilized and where additional capacity sales opportunities exist Long-Term Investment Analysis is used to perform screening studies concerning future expansion investments for handling predicted increases in demand for pipeline capacity.

Pipeline Forecasting for commercial operations has defined two required operating modes; to predict demand patterns of end users and load forecasting.

Pipeline Forecasting assumes that the user is familiar with the contents of the following: Scheduling; Deal Making; and Allocations Processing.

Imbalance Trading

Imbalance trading is an imbalance management mechanism. Imbalance trading can be done throughout the month on the operational imbalances and at the end of the month on the actual accounting imbalance. This process must enable shippers to trade among each other in an effort to reduce their overall imbalance. The pipeline will determine the operational areas on their pipeline and the level that they will allow shippers to trade imbalances. This will be similar to other offer/bid processes where shippers post imbalances and other shippers bid or trade that imbalance. The result will be an increase or reduction in each shipper's imbalance. Imbalance Trading is related to the requirements for Nominations, Scheduling, Allocations, Imbalance Accounts and Balancing.

Imbalance Trading includes all activities that a facility's personnel or a marketer's personnel perform on a regular basis. The facility operation activities include managing the imbalance on a monthly, daily, hourly, and sub-hourly basis and provide a mechanism for the shipper to trade their imbalances. A marketer's activities include monitoring the imbalance on an hourly, daily, and monthly basis and trading and offsetting those imbalances.

The following definition and examples for Shipper Imbalance came directly from the GISB Flowing Gas Related Standards (keeping the definition in whole, our requirements will also include supporting hourly and sub-hourly processing):

Natural gas flows from source points to disposition points in accordance with the scheduled nominations made by various parties. The actual flow of gas is then allocated among the various parties to transactions, in accordance with pre-determined allocation methodologies. A shipper nominates a quantity of gas at a receipt point and contracts with a pipeline to transport this quantity of gas to a delivery point.

Allocated quantities at the receipt point and delivery point may not be the same, i.e., with reductions for fuel quantities, over-delivery by the transportation service provider at the delivery point, or under delivery by the transportation requester at the receipt point, the quantities at the receipt point and delivery point may not be the same. The resulting difference is referred to as an imbalance.

Imbalances are reported by the allocating party to the affected parties involved in the transportation transaction. Imbalances may be reported on an hourly, daily or monthly basis and may be resolved in a number of different ways.

The nomination starts the procedure, after which the allocation takes place. Gas is allocated at a location level and contract level. The imbalance data set provides contract allocation information and can be calculated using this information. This information can be a daily or a multi-day function, or it can be final closing data for an accounting period. The monthly imbalance should be monitored throughout the month, so the imbalance may be minimized.

As the result of FERC Order 637, pipelines will be required to provide imbalance management services, like parking and loaning service, and greater information about the imbalance status of shippers and the system, to make it easier for shippers to remain in balance in the first place. Pipelines also will be required to permit third parties to offer imbalance management services that will allow shippers to avoid imbalances.

The ability to allow third parties to trade imbalances is required. Third parties are defined as companies that do not have a transportation contract with the pipeline, but are allowed to trade imbalances. Some type of contract and contract service will need to be established for these business associates. There will be no transportation or commodity charges associated with these contracts or trades.

Measurement & Sampling Management

Measurement and Sampling Management supports the requirements for maintaining the measurement data as well as other measurement information about the measurement facilities. Service providers will regularly record measurement information for downstream processing. The measured quantities are generally the source for Point Allocations. The measured samples will effect pricing. A meter is a representation of a physical device that is used to record the data related to flowing gas for a facility.

This data is often collectively referred to as measurement data, and as such may include not only volumetric quantity information, but also sampling information in the form of quality or component specifications. Accurate and timely recording and processing of measurement data is critical because of the downstream processes.

The measured quantity is the source for point allocations and a statement is typically based on allocated quantities, the receipt of the measured quantity has a direct economic impact on the facility. In addition, for those facilities that base penalties or credits on the quality of the gas, the recording and processing of the measured samples also has a financial impact on both the facility and its customers.

Meters are associated directly with a transactional point for a facility. A point may have one or more measurement meters associated with it—the quantity recorded for each of the measurement meters is summed up to the point quantity for allocation purposes. Information captured for the meter(s) will determine how the best available quantity for the point is determined.

Nominations Processing

Nominations Processing requires familiarity with the requirements for the overall process of providing transportation services and/or utilizing transportation services. Nominations processing includes all nomination-related activities that a facility's operations personnel or a marketer's scheduling personnel perform on a regular basis. These activities will differ depending on the role. The facility operation activities include maintaining the rules for nomination acceptance for different types of nominations or services, performing required validations on the nominations, and reviewing the nominations before publishing the nomination information to other operational areas for scheduling or confirmation. A marketer's activities include creating and maintaining the nominations and submitting the nominations to the appropriate facility for further processing.

There are some International nomination data elements that are similar to North American (GISB) required elements. There are also some requirements unique to International customers, Non-regulated customers and new/enhanced functionality requirements outside the scope of GISB. While Cross Contract Ranking and Title Transfer Tracking are two major issues yet to be finalized by GISB, it is contemplated that the system architecture of the present disclosure can be configured to provide capabilities for supporting the same.

Scheduling

Scheduling is related to the requirements for Facilities and Points Management, Contract Administration and Nomination Processing. Scheduling is the process that occurs at a facility (Pipelines, Gathering Systems, Storage Systems, and Power Transmission Facilities) to determine if requested nominations individually meet pipeline nomination requirements, and, if taken as a whole, can physically be handled by the facility.

If either of these two requirements is not met, reductions (and in rare cases increases) may be made to the nominations. The remainder of this section will discuss this process as it applies to a pipeline, under the assumption that most of the requirements can be applied to other types of facilities. If a specific point could differ for other types of facilities, that will be pointed out.

The two different modes of operation for the scheduling processes, and including pipeline scheduling, are the scheduling mode and forecasting mode. In scheduling mode, the process is run using planned operations, usually for the next day or cycle, based upon actual transportation requested by the shippers. Forecasting mode uses predictions of needs ranging from days to years in the future.

Storage Processing

Storage Processing requires familiarity with the requirements of providing storage services and/or utilizing storage services and Facilities and Points Management, Contract Admin, Balancing and Imbalance Calculation, Inventory and Imbalance Management and Nominations. Storage processing is applicable to a facility that operates a pipeline facility as well as a storage facility, an independent third party storage service provider and a marketer who contracts with a storage service provider for the right to store gas.

Storage processing includes all storage-related activities that a facility's operations personnel or a marketer's scheduling personnel perform on a regular basis. These activities will differ depending on the role. The storage facility operation activities include maintaining the rules for storage injection/withdrawal and tracking inventory quantity before publishing the nomination information to other operational areas for scheduling or confirmation. A marketer's activities include requesting storage injection/withdrawal and inventory quantity exchange services and tracking inventory quantity and valuation.

Terminology used in connection with storage processing can include the following. A facility refers to a storage facility. Storage transactions include injection, withdrawal and transfer services. Storage fields refer to facilities that are usually natural geological reservoirs such as depleted oil or gas fields or water-bearing sands sealed on the top by an impermeable cap rock. The facilities may be man-made or natural caverns.

No Notice Service refers to a transportation service pursuant to which form shippers can receive delivery of gas on demand up to their firm entitlements on a daily basis without incurring balancing and scheduling penalties. This "no-notice" service will enable pipeline customers (i.e. firm shippers) to continue to receive unnominated volumes to meet unexpected requirements caused, i.e., by unexpected changes in temperature. Pipeline customers (i.e. firm shippers) will receive varying volumes of gas to meet their fluctuating needs during a twenty-four hour period.

For a storage service provider, Facility Operator Transfers refer to the exchange of storage quantities between contracts of the same service subscriber or between contracts of different service subscribers. For a storage service user, Marketers Transfers refer to the exchange of storage quantities between its own storage contracts or the purchase/sale of storage quantities between one or more service subscribers.

Gas Marketing Business Process

In FIG. 12, a sample screen view of for Trading, Make Deal, module is shown. From the Trading, Make Deal screen, access to one or more of the following is available: make deal, manage deal, contract administration, confirm deals, cash position, pricing, portfolio, and service type. The various deals formulated via a Make Deal module can be saved in one or more portfolios. The Make Deal screen includes at least a column of Deal Group, Deal, Status, Begin Date, End Date, Type, and Level. The Make Deal screen further includes an area for a quick deal entry, configured to receive information relating to a Deal Group, Type, Level, Term Code, Accounting Company, Trader, Begin Date, End Date, Counterparty, Contact, Contract, Price, Price Units, Facility, Location, Point, Quantity, Quantity Unit, Broker, Broker Contact, Region, Broker Fee, Fee Units, and Classification. User options for the Make Deal module include Full Create, Save As New, Save, and New.

Figure 13:
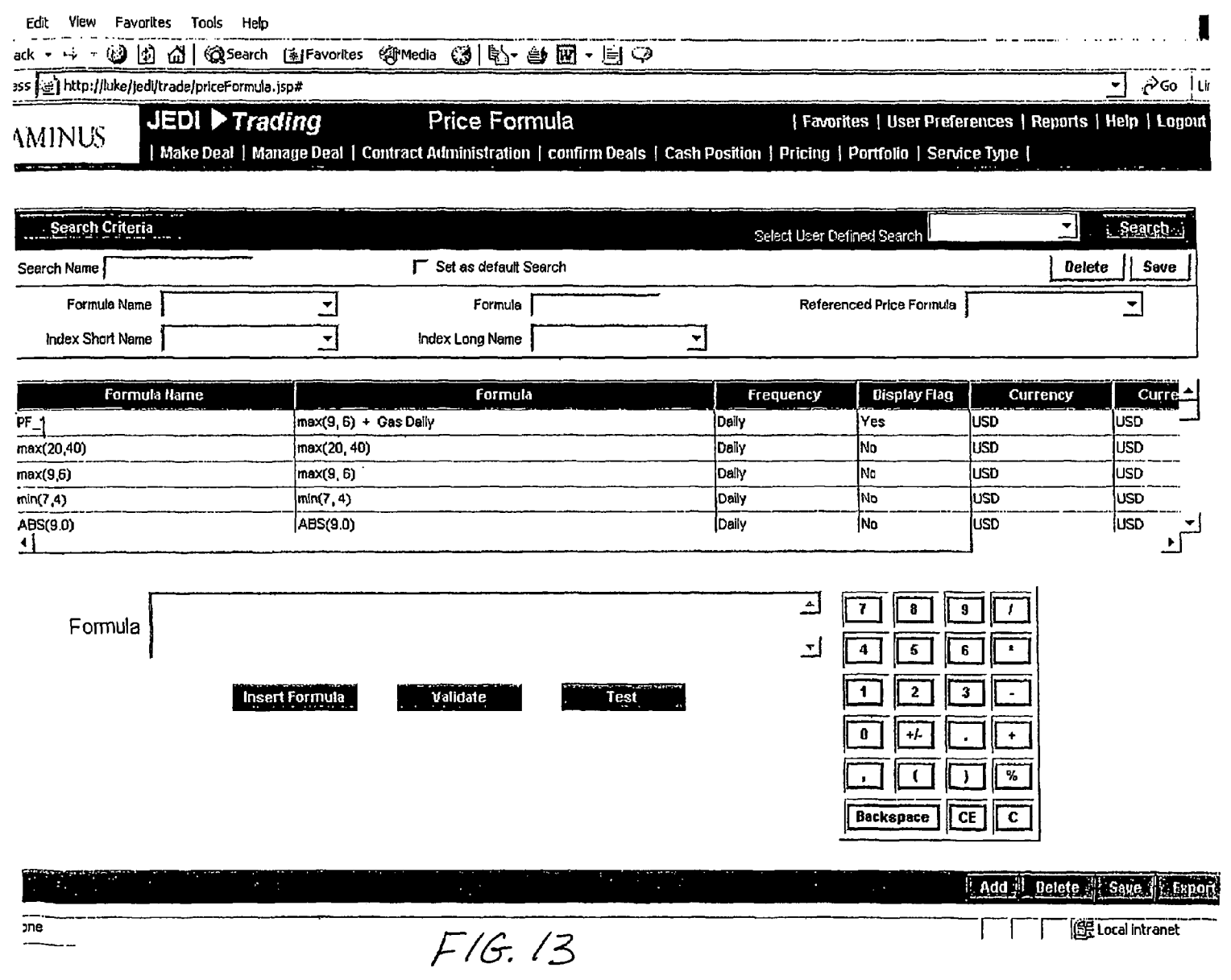

In FIG. 13, a sample screen view of for Trading, Price Formula, module is shown. User options for the Price Formula module include Add, Delete, Save, and Export. From the Price Formula screen, access to one or more of the following is available: make deal, manage deal, contract administration, confirm deals, cash position, pricing, portfolio, and service type. The Price Formula module includes input for a formula name, formula, referenced price formula, index short name, and index long name. In addition, a more detailed display of existing formulas per formula name, formula, frequency, display flag, and currency is provided. The Trading, Price Formula, screen includes a formula entry box, with user selectable options of Insert Formula, Validate, and Test. The Trading, Price Formula, screen display further includes a calculator.

Figure 14:
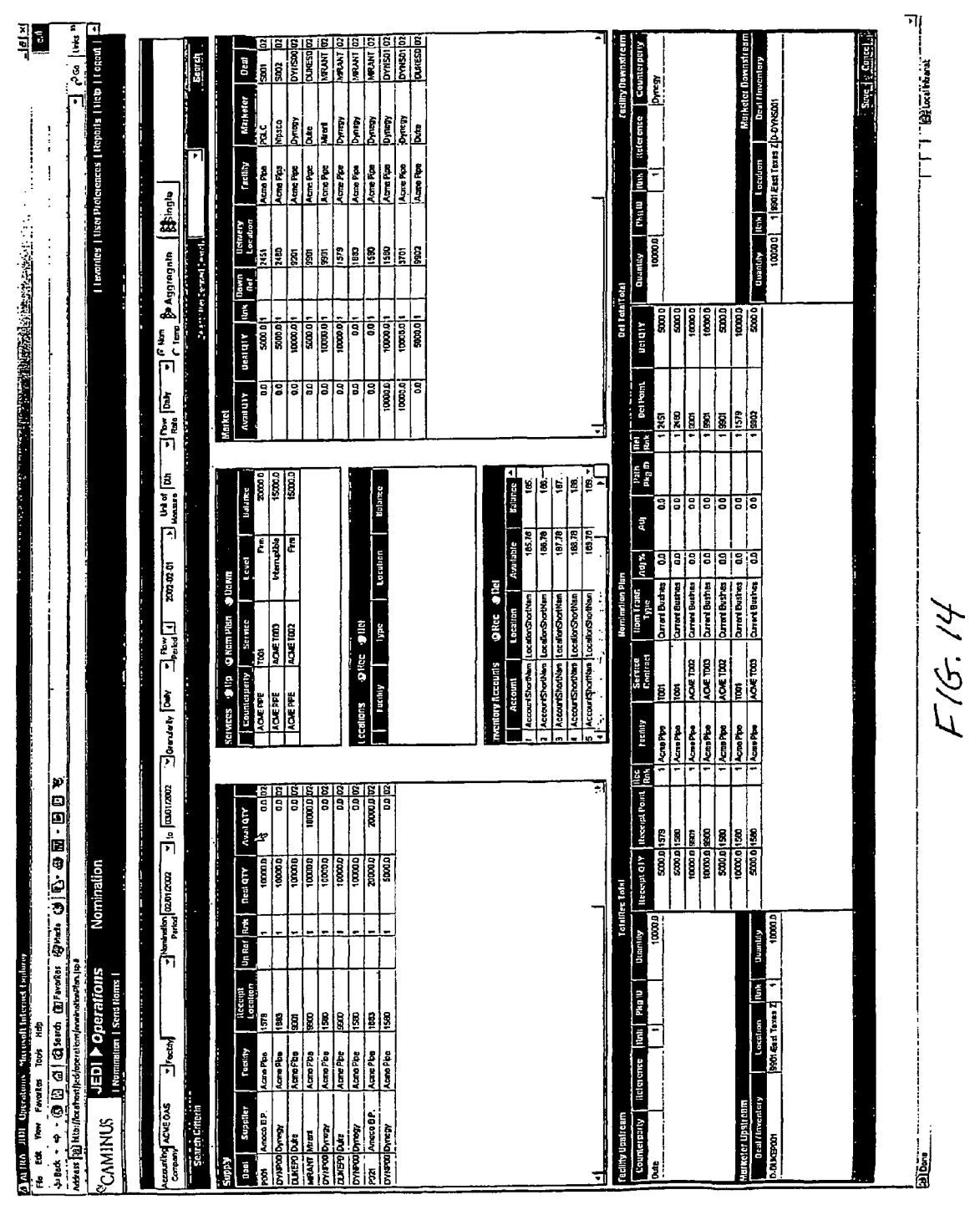

FIG. 14 illustrates an exemplary screen display of an Operations, Nomination module. In this embodiment, regions are provided for Supply, Services, Location, Inventory Accounts, Market, Facility Upstream, Nomination Plan, Facility Downstream. For the Supply, the information includes at least one of Deal, Supplier, Facility, Receipt Location, Up Ref, Rnk, Deal QTY, Avail QTY. For Services, an option for selecting Upstream, Nomination Plan, and Downstream are provided. The Services include at least one of counterparty, service, level, and balance. For Locations, an option for selecting Receipt and Delivery Location is provided. Locations further include at least one of Facility, Type, Location, and Balance. For Inventory Accounts, an option for selecting Receipt and Delivery is provided. Inventory Accounts further include at least one of Account, Location, Available, and Balance.

Referring still to FIG. 14, for the Market, the information includes at least one of Avail QTY, Deal QTY, Rnk, Down Ref, Delivery Location, Facility, Marketer, and Deal. With respect to the Upstream information, the Facility Upstream information includes at least one of Counterparty, Reference, Rnk, Pkg ID, and Quantity. Further with respect to Upstream information, a Marketer Upstream information includes at least one of Deal/Inventory, Location, Rnk, and Quantity. For the Nomination Plan, information includes at least one of Receipt Quantity, Receipt Point, Receipt Rnk, Facility, Service Contract, Nom Trans Type, Adj. %, Adj., Path Pkg ID, Del Rnk, Del Point, and Del QTY. With respect to the Downstream information, the Facility Downstream information includes at least one of Quantity, Pkg ID, Rnk, Reference, and Counterparty. Further with respect to downstream information, Marketer Downstream information includes Quantity, Rnk, Location, and Deal/Inventory. User selectable options for the Nomination screen include Save, or Cancel. Additional detail of alternate embodiments of the nominations screen are provided herein.

Figure 15:
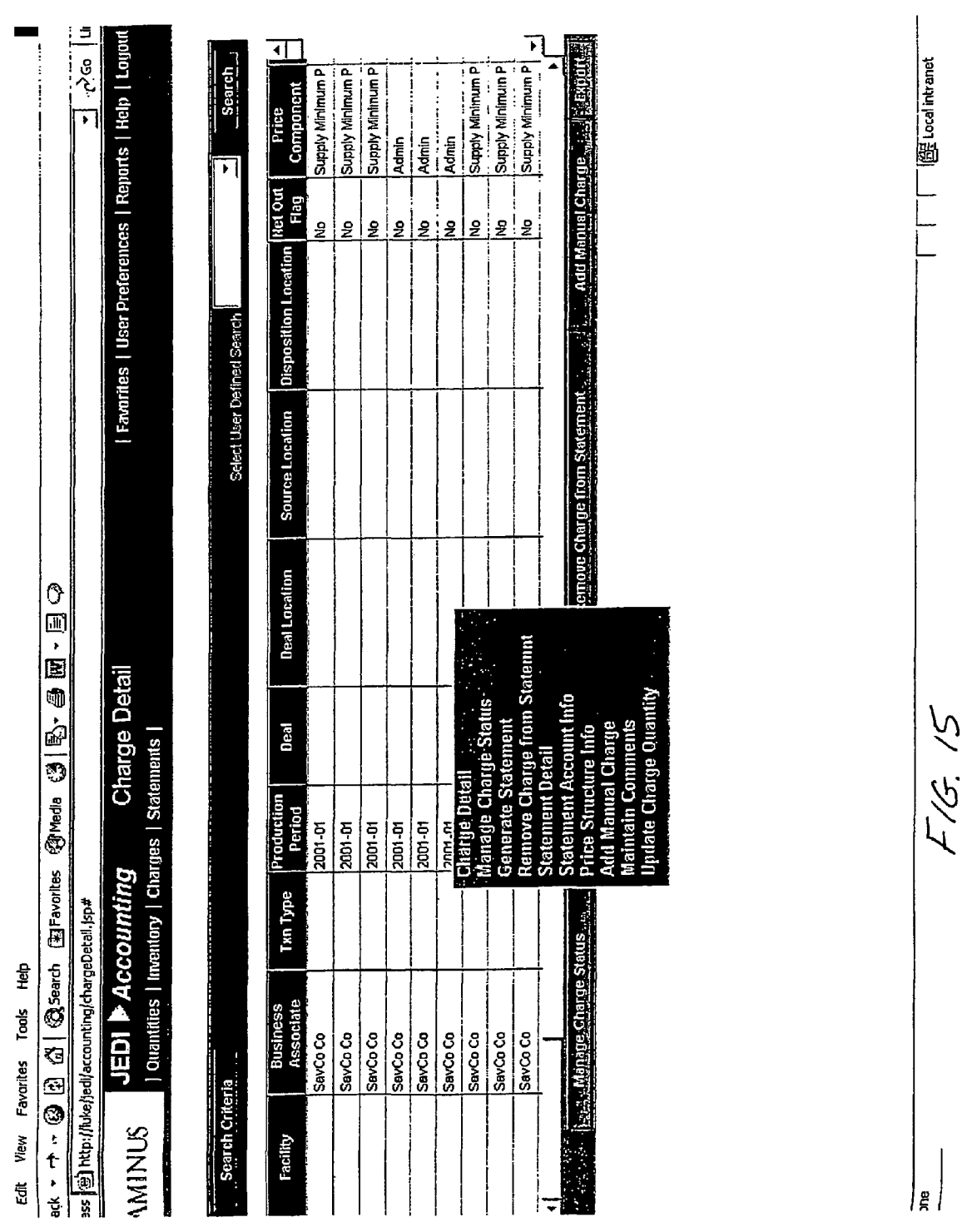

In FIG. 15, a sample screen view of for an Accounting, Charge Detail, module is shown. From the Accounting, Charge Detail screen, access to one or more of the following is available: Quantities, Inventory, Charges, and Statements. The Charge Detail screen includes at least a column of Facility, Business Associate, Transaction Type, Production Period, Deal, Deal Location, Source Location, Disposition Location, Net Out Flag, and Price Component. The Charge detail screen further includes a pop-up display for a quick access to charge detail, manage charge status, generate statement, remove charge from statement, statement detail, statement account information, price structure info, add manual charge, maintain comments, update charge quantity. User selectable options on screen may also include manage charge status, remove charge from statement, add manual charge, and export.

Nominations

Adding Nominations

According to one embodiment, the system architecture is configured to support GISB standards version 1.4 for North American FERC Regulated Facilities. This includes the Pathed Threaded, Pathed Non-Threaded and Non-Pathed nomination model types. According to another embodiment, the system architecture is further configured to support EDI-Gas standards for sending and receiving operation data and messages utilized by European shippers and facilities. While the EDIGas Standards are different from the GISB Standards, there are some commonalities. The system architecture provides various features as disclosed in the following.

Support for a User Defined Time Period for Nominations (marketer and facility) includes the capability of adding/updating multiple day hourly nominations without the use of profiles. For example, a nomination effective from 9:00 am to 10:00 am could be added/updated for days 1 through 15.

Support for the capability of nominating paths on the same transportation contract using different time periods includes providing a rule requiring that the time period for the nomination is no less than the lowest level of granularity defined in the contract. That is, for a contract defined at a daily level, daily is lowest level that can be nominated. It could have two paths; one nominated at a daily level and the other at a weekly, bi-weekly or monthly level but not hourly. The weekly, bi-weekly or monthly begin/end date/times are based upon user defined business processing needs.

The system provides an ability to create/maintain transportation (path/point level and pooling) and storage nominations on a monthly, weekly, daily, hourly and period basis. The system also supports the use of cycles for whatever period is defined. If for example, one side of a nomination at an interconnect has an hourly pattern but the other does not, the side without the hourly pattern will assume a pattern pro rated to the hourly side. While it is not a requirement that non-hourly nominations must be stored at an hourly level, it is a rule to address a specific business condition that exists for International users.

Support for auto pooling for user defined time periods includes the following. Steps in auto pooling involve creating relationships (links) between individual points/locations to a specified pooling point for both receipts (deliveries) and deliveries (redeliveries). The supply or supplies are "pooled" and used to satisfy a sale or sales. Auto pooling allows users to create multiple nominations simultaneously thereby reducing manual intervention.

Support for providing an ability to label, store and retrieve Nomination Profiles (marketer and facility) includes defining a profile as a pre-determined pattern of quantities that may be used in nominations over a specified time period. In addition, the profiles can be configured to support one or more of user defined time intervals; be date/time effective; support energy values, volumetric quantities or both; be available on any type of nomination (point-to-point, pool, storage, park and loan, title transfer); and provide a user's ability to generate an hourly profile from a daily nomination. In the last instance, this would allow an hourly profile to be created from a 24 hour or daily nomination when there is no hourly variation in that nomination. For example, a profile could be that for a given time period, time periods 1-3 are nominated at 10,000 units per period for a specific path and time periods 4-7 should be nominated at 8,000 units per period. There could be numerous possibilities and combinations.

Support for auto pathing/nominating on a higher level than the Nomination Period (marketer and facility) includes, for example, providing the capability of pathing daily using hourly profiles and reduce keystrokes by eliminating the need to create 24 individual hourly nominations. This requires that transportation contracts and points provide the necessary flexibility to allow for nominations to be added/updated hourly on a daily facility that has some hourly points. Conversely, the system can be configured to provide similar flexibility to allow for daily nominations on an hourly facility that has some daily points in order to accommodate various business models.

The system is further configured to support a user defined capability to specify a Nomination Period other than the Default Nomination Period at a facility or entity level (marketer and facility). In addition, gas quality and contact information are included as part of the nomination using the system architecture of the present disclosure.

The system further supports add-nomination capabilities for European capacity releasors and releasees. In Europe when a capacity holder releases capacity (releasor), the pipeline facility is not involved. The facility still requires the original capacity holder to submit nominations for all the capacity (including what was released to a third party—releasee). In addition, the system architecture can be configured to transfer nominations from releasee to releasor, provide a mechanism for releasor to automatically and/or manually receive and input nominations from releasee, and provide automatic and/or manual mechanisms for combining releasee and releasor nominations.

Support for emergency override of facility's nomination period includes allowing the flexibility for a daily facility to conduct business on an hourly basis in the event of an emergency (i.e. a kind of "switch").

Support for the capability of adding nominated quantities based upon temperature includes allowing the user to input a temperature for the gas day being nominated. Depending on that temperature, a nominated quantity will be determined based upon deal quantities and that nomination's corresponding temperature level or tiers.

Support capability of nominating payback at receipt (delivery) or delivery (re-delivery) points are included by supporting one or more of physical points, logical points or pools, and supporting a capability of including or excluding payback from Rate generation, Imbalance calculation, and Fuel calculation. The system architecture is further configured to support user defined rounding and normalization mechanisms.

For example, with respect to normalization, if a daily quantity is required to be nominated as an hourly pattern and there is a remainder after dividing the daily quantity by 24 hours. As a result, users should be able to determine how to distribute the remainder (e.g. add to last hour, first hour, etc.). With respect to rounding, assume fuel is calculated on a monthly basis. A daily-nominated quantity of 20 per day is created with a 2% per month fuel rate. On day 1, the fuel quantity is 0.4 (20×2%). If the proper rounding and normalization rule(s) are not in place, the fuel for that (and subsequent) day could be 0 thereby not capturing the correct fuel quantity.

The system architecture supports Multiple Nomination Units (marketer and facility) in the one or more of the following: select a facility and have that facility's nomination unit be the default unit; capture both volumetric and energy quantities on a nomination, including being able to input either quantity and have the other automatically calculated or have the ability to override the automatic calculation; and have the option of being able to nominate using any other unit.

With respect to a Marketer, the system is configured to support situations where a nomination is created in unit X and is automatically converted prior to sending to a facility utilizing unit Y.

With respect to a Facility, the system is configured to support situations where a Marketer sends in a nomination in unit A and it is automatically converted to unit B (e.g., what the Facility uses). Conversion issues resulting from going to/from different units are addressed by the rounding and normalization requirements described above.

The system architecture supports adding of nominations with user configurable Save capability (Marketers and Facilities) by one or more of the following:
 a) Allowing adding of nominations with capability of placing in "hold" queue. Hold queue is defined as stored but not used in production except for real time calculation of available quantity on a contract, path or point.
 b) Allowing for Update and Delete while in "hold" queue. Only real time calculation of available quantity on a contract, path or point would be affected. A potential capacity releasor that has a nomination in the hold queue would not have that capacity available to release until a final determination is made that the nomination is not needed and will not be used.
 c) Providing capability to send either all or only selected nominations that are in the hold queue into production for further processing (i.e. confirmation, scheduling, balance management, charge generation). This allows users to create, store, review and selectively accept, update or reject nominations prior to releasing into the production environment.

The system architecture further provides an ability for a facility operator to have the capability to manually add nominations received from its shippers, according to one or more of the following:
 a) For pools that are supported or sanctioned by the facility (i.e. not logical pools created by and for shipper use only), a manual add capability is provided. Facilities often designate pools by zone, segment or point thus allowing many pools to be setup. Points within those designated zones or segments are the only ones allowed for pool nomination purposes. Therefore a facility must input such a nomination for its shipper, and the system architecture allows the facility to have the same ease of adding a nomination.
 b) Include adding both logical and physical pool nominations and path level nominations that fully support both North American and International data element standards. A choice of either the GISB, non-regulated (i.e. non-FERC) or International standards would be configured at the facility level.

The system architecture is further configured to provide additional data element requirements for non-regulated facilities. These include one or more of deals and deal points, interconnects/hubs, pools and pooling points, volume requirements, storage data, nominated quantity Status (Nominated, Confirmed, Scheduled), allocated, and hold. These additional data elements form the basis for a non-regulated facilities' nomination.

Support for Cross Contract Ranking, when adding a nomination (marketer and facility), includes configuring the system architecture with capability to set ranks on nominations across multiple transportation contracts on all nomination model types at a single point. This further includes configuring the system architecture to support adding nominations across multiple points and or facilities through interconnects for Marketers.

Figure 16:
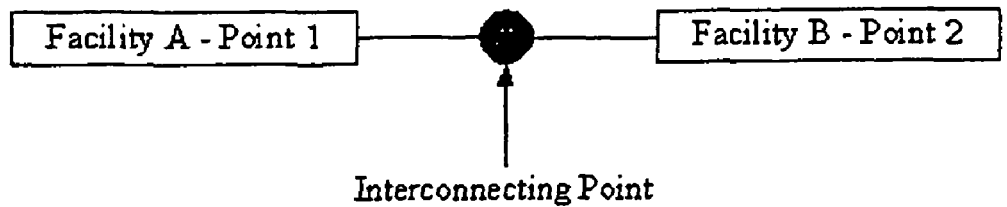
FIG. 16 is a diagrammatic view of an inter-facility single leg path.
Figure 17:
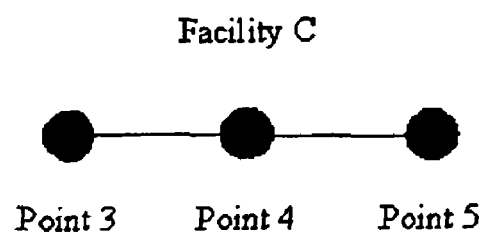
FIG. 17 is a diagrammatic view of intra-facility multi-leg paths.

With the system architecture, a user is able to create pre-defined (or as needed) Inter-Facility single leg paths, including pools such as from Facility A Point 1 to Facility B Point 2, such as shown in FIG. 16. In addition, the system architecture is configured to enable a user to create pre-defined (or as needed) Intra-Facility multi-leg paths (this is sometimes referred to as a "Meter Bounce" or "Bumping") including pools such as shown in FIG. 17. In FIG. 17, A "Meter Bounce" nomination would result when a quantity is nominated for transportation from Point 3 to Point 4 on contract X. At Point 4 the quantity would then be transported from Point 4 on contract Y for delivery to Point 5. This same approach could be used to create pooling nominations across multiple facilities.

Figure 18:
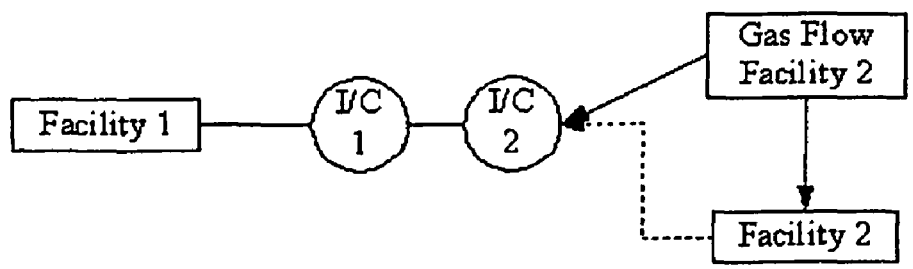
FIG. 18 is a diagrammatic view for nomination and re-nomination capability at a point level.

For International customers, a second type of bounce or bump is as shown in FIG. 18. The business scenario shown in FIG. 18 pertains to a situation where gas is flowing on Facility 2 with the physical capability of flowing or not flowing into Facility 1. If bumping (per International usage) is allowed, then the gas flow on Facility 2 only "bumps" I/C$_2$, continues down that facility and does not flow through I/C 1 into Facility 1. If bumping is not allowed then the gas flow on Facility 2 must flow through I/C 2 to I/C 1.

The system architecture further provides support for nomination and re-nomination capability at a point level for International users to a) specify whether or not bouncing or bumping is allowed at I/C$_2$, and b) if bumping is not allowed then the gas flow on facility 2 must go through I/C 2 to I/C 1. That quantity should automatically be available at I/C 1 (See FIG. 18). The system architecture also supports contract selection for the preceding scenarios by allowing for default contracts to be defined at each point or allowing for selection of other contracts at each point. The system further allows for configuration so paths could be created to/from unregulated and regulated facilities (marketer).

In another embodiment, the architecture is configured to support adding Marketer Nominations at Hubs. A hub is defined as a group of multiple facilities that interconnect with each other and allow for flow across one or more of the facilities. A user should be able to nominate on a facility for delivery to a hub. For example, a nominated quantity on facility A should be available for pathing on any of the facilities that fall within the grouping of hub B. Another example is where a user would be able to specify what quantity is available on multiple facilities. A pre-requisite is the setup of hubs in facilities management The architecture further supports adding of Title Transfer Tracking to Nominations (marketer and facility). This is accomplished by providing capability of adding purchase and sales quantity transfers at a point. Title Transfer is the change of ownership of gas between parties at a location. As such, this will become part of the chain of business activities that will need to be nominated at a point for FERC regulated, non-regulated, and International facilities that require this type of information.

Support for adding Storage Nomination Transfers for Facility Operators (Pipeline) and Marketers includes configuring the system to support a Facility Operator Pipeline) in one or more of the following: a) between storage contracts of the same business associate and b) between storage contracts of different business associates. The system can be further configured to support Marketers: a) between storage contracts of the same business associate; b) between storage contracts of different business associates; c) transfer volumes from a storage contract to a sales commitment; and d) transfer from a purchase commitment to a storage contract The system is configured to provide adding of Storage Nominations for marketer and facility where storage nominations are added directly on a storage contract without using a transportation contract and a nomination is added into/from storage using a transportation contract.

The system is configured to support the following parameters for adding Storage Nomination (marketer and facility): Storage Contract; Direction; Transaction Type; Model Type; Upstream/Downstream Contract; Upstream/Downstream Entity; Upstream/Downstream Pkg Id; Upstream/Downstream Transaction Type; and Date/Time Effective Nomination Range.

Support of Adding Park and Loan Nominations (marketer and facility) can be accomplished by adding a transportation nomination to move quantity to/away from a parking location. This supports both physical and logical points. Rules are setup to define how this can be transacted and requires meter/point designation in facility management.

The system architecture is configured to support the capability for marketers to transfer pool imbalances to transportation contracts. Users should be able link a pool with a transportation agreement and automatically transfer an imbalance.

The system architecture is further configured to support a Copy/Paste function for adding nominations and profiles (marketer and facility) by allowing users to: select a single nomination or a group of nominations and be able to copy/paste the information; have same capabilities for viewing/editing, etc., as would a nomination added completely from start to finish; and specify what data is copied from which day(s). For example, day 31 quantities could be copied or rolled and used to create nominations for all or a portion of the days of the following month. Day seven's hourly profile could be used to establish hourly profiles for all or a portion of the days in the following month. In an alternate embodiment, a "roll" process could also be used instead of or in addition to copy/paste.

The system architecture further supports a complete audit history of nominations for marketer and facility. Original nominations and all changes can be maintained.

The system architecture is further configured to support the capability to allow marketers the option to add/update a point on a deal from within nominations and also have the deal updated to reflect the change.

Three possible scenarios could include: a) Allow for changing the point on the deal from X to Y; b) Not require the deal creator to designate a point and have the deal show up in the nominations area (User would select the point anytime prior to pathing); and c) Adding point Y but retaining point X.

The system architecture is further configured to support the ability for facilities to identify where points are over-nominated on contracts prior to confirmation or scheduling processing.

Updating Nominations

With respect to updating nominations, the system provides the manual capability for a facility operator to update nominations received from its shippers. The system architecture is configured to provide Marketers the capability of updating nominations for items such as quantity, package id, upstream/downstream entity (i.e. all fields that were initially user input/selected should be editable including all upstream/downstream information—non-threaded portion of pathed non-threaded model type). For pools that are supported or sanctioned by a facility (i.e. not logical pools created by and for shipper use only), the same manual update capability is available for the facility. This includes updating both logical and physical pools and path level nominations that fully support both North American and International data element standards.

The system architecture is further configured to support update nomination capabilities for European capacity releasors and releasees; support capability of marketer to update scheduled and allocated quantities on nominations; and support Cross Contract Ranking when updating a nomination (marketer). Users are provided the capability to update ranks on nominations across multiple transportation contracts on all nomination model types.

The system architecture is still further configured to support updating user defined paths across multiple facilities for Marketers. In this case, a user is able to update pre-defined paths. The system is configured so paths can be updated to/from unregulated and regulated facilities.

With respect to updating Marketer Nominations at Hubs, the system enables a user to be able to nominate on a facility for receipt (delivery) from to delivery (re-delivery) to a hub. Furthermore, the system architecture is configured to support updating of Title Transfer Tracking on Nominations for marketer and facility, by providing capability of updating purchase and sales quantity transfers at a point. The system architecture supports updating of nominations in the "hold" queue for marketer and facility; supports user configurable capability for a marketer to update a nomination when that nomination's deal quantity is changed; and supports user configurable capability for a marketer to update a deal quantity if a nominated quantity is changed.

Deleting Nominations

The system architecture supports deleting Nominations added by a Facility or a Marketer. For Nominations added by a Facility on behalf of Shipper the system architecture supports deleting of nominations while in the process of adding; and supports deleting of nominations when in "hold" queue but prior to downstream processing (i.e. confirmation, scheduling). However, the system does not allow deleting after nominations have been used in downstream processing (i.e. confirmation, scheduling, accounting, etc.).

For Nominations received by a Facility from a Shipper the system architecture allows no deleting; only capability to set to "unused" status. Once set to unused status, there occurs a re-calculation of contract and facility capacity in order to update available capacity.

In connection with a Marketer the system apparatus supports deleting of nominations while in the process of adding; and supports deleting of nominations when in "hold" queue but prior to downstream processing (i.e. actualizing, statement generation). However, the system does not allow deleting after nomination has been used in downstream processing including sending to facility. The system further supports user defined choice of allowing deletion of some, all or none of the non-threaded portion of the pathed non-threaded model type (i.e. upstream/downstream designations) and allows user choice of retaining or reversing deal point update during deletion Supporting Fuel Calculations Regardless of whatever combination of variables fuel charges can be based on (date, facility, contract, receipt point, delivery point by period quantity), the system is configured to enable a user to specify fuel rates down to an hourly level. The system is further configured to support Fuel Componentization (marketer and facility). Fuel componentization provides the flexibility of assigning multiple fuel charges to a quantity. This allows fuel charges to be captured at the level at which it is incurred, for example, with respect to mainline transportation fuel, plant fuel, and gathering fuel; as well as loss and unaccounted for, often embedded in a facility's fuel rates but could not be expressed as a separate component.

While supporting fuel calculations may be initially defined at the contract/path level, the system can be configured to provide users with the capability of adding or editing the fuel rate by component on the nomination itself.

The system is further configured to support Matrix Level Fuel Charges (marketer and facility).

When adding/updating a nomination where the fuel rate needs maintenance, users are able to: Access the facilities fuel matrix to specify a rate, as well as, manually specify the fuel rate. This requires that fuel matrices be included in the data management section. Contract management section also utilizes this setup where paths are setup that fall within the parameters of the fuel matrix (i.e. the fuel rate would display and allow the user to accept or override). The system is also configured to delete manual overrides. If system generated fuel charges are overridden manually, users should be able to delete the manual override and allow system generated fuel rates to be re-instated. Lastly, the system is further configured to enter and distribute a fixed fuel quantity through manual or automated means at a contract, path or point level. This gives users the capability of entering a fuel rate and no subsequent processing could update it. Only manual updates would be allowed.

Figures 19, 20:
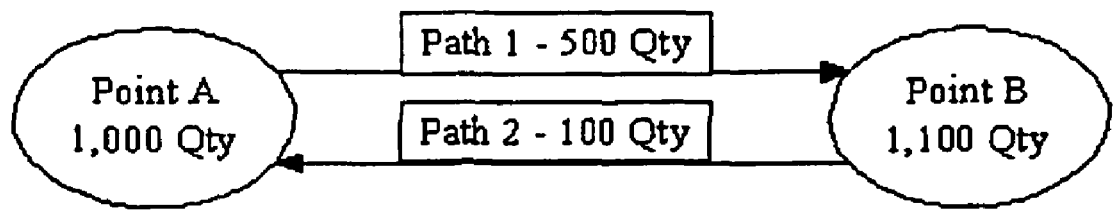
FIG. 19 is a table view of fuel based on receipt for use in illustrating net effect of a negative fuel rate.
FIG. 20 is a diagrammatic view for use in illustrating point level capacity netting.

The system architecture is further configured to support Negative Fuel Charges. Due to a combination of business processes, there is a need to manage negative fuel charges. A possible explanation for this is a case where a shipper supplies gas with a higher heating value than what the facility delivers. The net effect is that even though there is a positive energy fuel charge, the shipper receives more volume than what was delivered to the facility, in effect resulting in a negative fuel rate based upon volume. See for example, fuel based on receipt, as shown in FIG. 19.

The system architecture further is configured to support user choice of Netting Fuel Charges at the path level. Some International pipelines charge fuel based upon "Net Flow". "Net Flow" can best be defined using an example. If a shipper sends 100 units of gas from point A to point B, and 80 units from point B to point A, the fuel charge will only be based upon the net of 20 units of gas. The fuel charge is based on the net movement.

Supporting Capacity Netting

The system architecture supports capacity netting at the point and path level for marketers. For example, at a path level capacity netting results in 350 available. The net capacity utilized is 400 (Path 1 minus Path 2). If the original path MPQ is 750, then the available path quantity is 350 (750 MPQ minus 400 net capacity utilized). At a point level capacity netting results in, as shown in FIG. 20. In FIG. 20, Point A=600 available capacity (1,000 point capacity minus 500 forward haul plus 100 backward haul capacity); and Point B=700 available capacity (1,100 point capacity minus 500 forward haul capacity plus 100 backward haul capacity).

Nomination Validation

The following are key areas where validations should be supported. However, customers may require validations configured differently or in some areas none at all. Therefore to the extent possible, validations should be user configurable by facility with contract overrides.

Exceeding Contract and Path Maximum Period Quantity

The system is configured to provide a notification to users when adding or updating a nomination that results in exceeding the contract, path and/or point MPQ. In this regard, a User can configure by facility to: Ignore when exceeding MPQ; Require nomination to be reduced; Require excess nominated separately (i.e. require new nomination); and Issue only a warning to user and allow to continue. This can be further defined so that only certain users have this right. The system architecture is further configured to support nominations above contract quantity with user-defined percent or volume limitations, or without percent or volume limitations at one or more of: Contract/point level; Zone level; and Segment level. The system architecture further supports validation that alerts user when nominations are in the "hold queue" prior to nomination processing. In this instance, the User has a capability of ignoring and continuing process; or accepting, rejecting or deleting nomination.

User Configurable Validation

User configurable validation includes providing a warning that deal quantities exceed transportation quantities at one or more of Contract level; Path level; Point level; or All levels.

Validation for Ramp Rates

The system architecture is configured to support validation for ramp rates. Ramp rates are needed to prevent changes to a nomination beyond certain pre-determined limits (either plus or minus) because flow rates through a point/meter cannot always be changed (increased or decreased) at will on an hourly basis for example. Ramping should support methodologies based upon a percentage of Maximum Period Quantity (MPQ) or a fixed quantity. Flexibility is also provided in specifying how ramping impacts capacity release. There may be situations where capacity could be released without any ramping associated with it; or ramping could be proportional to the released volume and contract MPQ/MDQ or a fixed portion of the ramping or none at all. A pre-requisite would be that ramp rates are defined for a facility. It has since been determined that ramp rates will not need to be enforced at nomination time. Ramp rates will only be used (optionally) at scheduling time.

According to one embodiment, the system is configured to notify Users when ramp rates have been violated. The system architecture further includes rules that will determine if the user will be allowed to override the ramp rates in adjacent time periods.

Validation for Lead Time

A validation for lead time may result from a business rule that says adds or updates to nominations must be done within a pre-determined amount of time prior to processing. For example, a new hourly nomination must be submitted 4 hours prior to gas flow to allow for physical constraints of the facility. This allows a notification of users that the time frame for using the nominations process (adding or updating) is not within pre-determined time limits. Accordingly, the system is configured to support validation for lead time at the facility, point and contract levels. The system is further configured to support for rules that will determine if the user will be allowed to override the lead-time rule. A pre-requisite would be that lead time rules are defined for a facility.

Validation for Nomination Profiles

The system architecture is configured to support validation for nomination profiles which requires that quantities for profiles are equivalent in total between different time intervals. The sum of 24 hourly profiles will need to equal a daily profile or the sum of seven daily profiles equals one week's profile.

Validation of Storage Nominations

The system architecture is configured to provide support for validation of storage nominations in relation to storage Ratcheting Levels. Ratchet levels (based on time and storage level) are parameters (set by the facility) on storage contracts that limit the withdrawal and injection quantities of marketers. Setup of ratchet levels should be on storage contract; be date/time effective; and allow for tiered level (volume and percentage) penalty calculations. If a nomination violates a ratchet level; then the system is configured to either require nomination within acceptable ratchet levels; or allow override of ratchet level.

Validation for Deleting Nominations

The system architecture is configured to support validation for deleting nominations by not allowing deletion of nominations when the nomination has been used in downstream processing, and allowing deletion of nominations if the nomination has not been used in downstream processing.

Nomination Review

The system architecture is configured to support Reviewing of Contracts Available for Nomination by Date/time range; Facility; Points; and Quantities.

Quantities supported include one or more of: Total quantity; Released quantity (approved and pending statuses); Available quantity (i.e. available for nomination); Path quantity; and Quantity by priority (primary to primary, secondary to primary, secondary to secondary, etc.).

The system architecture further provides support for viewing of contract, path and point quantities in real time. As a user is adding or updating a nomination the contract quantity information described in the preceding section can be updated in real time.

The system architecture further provides Users capability of viewing available contract quantity at the same level at which the contract was defined, as well as, any other user defined time intervals such as: Sub-hourly; Hourly; Daily; Weekly; Monthly; Seasonally; Yearly; and Life of Contract.

Users are provided capability of viewing deal quantities in relation to total, released and available transportation quantities at the same level of detail as the deal quantities. For example, if a marketer has a sales deal for 5,000 units at delivery point 1, the user needs to know if there is sufficient transportation capacity available.

The system architecture further supports reviewing of nominated detail contract activity by Marketer and Facility.

With respect to Marketer and Facility reviewing of the nominated detail contract can occur in any one of the following manners. Filtering capabilities should be provided that allows selection at virtually any single or group of data elements in a nomination.

Support for user defined views at the point, point/contract, contract, pool(s), facility (storage or pipeline, whichever is applicable) and entity levels can be provided.

Support for review by cycle where cycles have been defined.

Support for review by model type; and

Support for user defined begin/end date/times can be provided.

A User may need to review a history of a nomination or selected group of nominations.

Support for the capability of automatically identifying at the end of a user defined time period, any changes to end of day quantities that took place during that hour can also be provided.

With respect to Facility, the system is configured to support filtering capability to review nominations by: shipper (all contracts & their nominations); shipper/contract (all nominations); pool(s) (all pools, pools by shipper, pools by facility, pools by entity); all nominations at a point; specific shipper nominations at a point; and entity.

Changes to a profiled nomination are available to the marketer. If a marketer sends to the facility a nomination created using a profiled quantity and the facility updates it, then the facility must notify the marketer.

The system architecture is further configured to support Reviewing charges for contracts for marketer and facility considering the following: Nominated contracts, unused contracts, and user defined begin/end date/times. With respect to Nominated Contracts (either partially or wholly), for whatever charge methodology is used by facility (i.e. path, zone, segment, facility or entity, etc.) a capability to view total charges by facility or entity is provided.

With respect to Unused Contracts (no nominations currently exist) the system provides capability to view charges by contract at whatever level they were defined. This includes fixed, demand, potential commodity and surcharges.

The system supports user defined begin/end date/times. There should be a business rule in place that states if a firm transportation contract has been nominated on (even if only partially), then any fixed charge should be reflected as a "Nominated Contract".

The system architecture is further configured to support Rate Overrides at whatever charge methodology is used by a respective facility (i.e. contract, contract/path, point, segment, zone, facility or entity, etc.). The system further supports deleting of manual rate overrides. If system generated rate charges are overridden manually, users should be able to delete the manual override and allow system-generated rates to be re-instated.

Support for reviewing of a nominated contract summary considers the following: Beginning Balance (all contract types); Current Month Balance (all contract types); Cumulative Balance (all contract types through current business); Daily Inventory Balance (storage/park and loan); Accumulated Daily Balance (storage/park and loan); Average Daily Inventory (storage/park and loan); Max/Min Daily Inventory (storage/park and loan); Should support user defined begin/end date/times; and Should support user-defined selection of nominated, confirmed, scheduled or best available quantities.

Support for Reviewing of Interconnect Balances, Hubs and Pools is provided via support user defined selection of: Begin/end date/times; Some or all of interconnecting points, hubs between 2 facilities; Some or all of pools on a facility; Hubs and their interconnecting points across multiple facilities; Contracts between two or more interconnecting facilities with related upstream/downstream information; Upstream/downstream information from the respective delivering or receiving entity's point of view for interconnects, hubs and pools.

The system architecture is further configured to support Reviewing of Time Period for Marketer's Deal. User must be able to identify the time period of a deal (i.e. sub-hourly, hourly, daily, etc.)

Nomination Balancing

Nomination Balancing is made to be user configurable by contract and facility requiring that all nominations (Path threaded and Pathed Non-threaded) (as well as upstream/downstream quantities) be balanced (i.e. receipts less fuel less deliveries=zero); allowing nominations (Path threaded and Pathed Non-threaded) (as well as upstream/downstream quantities) to be un-balanced (i.e. receipts less fuel less deliveries < > zero); allowing Non-pathed Nominations to be either balanced or un-balanced at a contract level; allow for pools to be out of balance with the choice of allowing the pool to remain out of balance or allowing the transportation contract to be out of balance; when operational and business conditions permit, some facilities will permit pools to be out of balance (usually on a temporary basis) as a convenience to shippers (For instance, this would allow shippers time to secure additional supply or market in order to rectify pool imbalances and not force shippers to adjust supplies or markets immediately); and support user defined methods of balancing nominations with date range capability. Manually and Automatically (i.e. rank, rank with quantity levels)

Volume Management

With respect to Facilities and Marketers, the system architecture is configured to support the capability of being able to view the nominated, confirmed, scheduled and allocated quantities simultaneously at the same level at which the contract was nominated as well as various other levels (sub-hourly, hourly, daily, weekly, monthly, etc.).

With respect to Facilities, the system architecture is configured to support the capability of sending confirmed, scheduled and allocated quantities to business associates, such as: EDI for FERC Regulated facilities; EDIGas for European facilities; Caminus Web™; Downloaded reports; Internet; Auto Fax; and/or Email With respect to Marketers, the system architecture is configured to support the capability of receiving confirmed, scheduled and allocated quantities from facilities. A marketer must be able to receive and merge it with their original data. The data should not overlay existing data so that a proper audit trail can be maintained.

Information Publishing

Facility API parameters of the system architecture are supported for exporting: Date/time range designation for nom period; Nom type designation (transport, storage, park and loan, all); Support batch processing/time schedule; and/or Data storage mechanism designation (table, comma delimited file, Excel, Access).

Facility communications of the system architecture support: CaminusWeb; Email; Fax; Marketer's web page; and/or Instant messaging.

Facility contact groups supported include: Facility level; Meter/point level; Contract level; Agent/shipper level; and/or Nominating Party level. A nominating party is defined as an entity that prepares, updates and sends nomination information either on its own behalf and or on behalf of third parties. This user-defined level could be used if and when nominating parties are not designated or identified as either "agent" or "shipper".

Marketer API Parameters of the system architecture are supported for exporting: Date/time range designation for nom period; Nom type designation (transport, storage, park and loan, all); Support batch processing/time schedule; and/or Data storage mechanism designation (table, comma delimited file, Excel, Access).

Marketer Communications of the system architecture are supported using: CaminusWeb; Email; Fax; Marketer's web page; and/or Instant messaging.

The system architecture is configured to provide Marketer Contact Support for user defined groups such as: Facility level; Meter/point level; Contract level; Agent/shipper level; and/or Nominating Party level. A nominating party is defined as an entity that prepares, updates and sends nomination information either on its own behalf and or on behalf of third parties. This user-defined level could be used if and when nominating parties are not designated or identified as either "agent" or "shipper".

GISB Version 1.4 Nomination Standards

With respect to the GISB version 1.4 Nominations Standards, there are three model types that can be utilized, depending on the routing methods of the transportation service provider. The model type may be pathed, non-pathed or pathed non-threaded.

The model type used affects the data required for a single transaction line item. All data elements required in the nomination standards are utilized for each of the model types. The placement and number of occurrences of the required elements may vary by model type. The transportation service provider specifies which model (or models) is used to nominate.

The pathed model (model type 'P') expresses a transaction from a receipt location to a delivery location. This pathed line item depicts a single requested receipt or delivery quantity of gas for the path and date combination.

The non-pathed model (model type 'N') expresses a transaction at a receipt location or a delivery location. The non-pathed transaction (line item) varies with the location of the quantity. If the quantity is a receipt quantity, then a line item may be defined by a contract, receipt location, upstream identifier and contract, rank (two are available), quantity type, capacity type indicator and package id for a specified effective date range. If the quantity is a delivery quantity, the line item may be defined by a contract, delivery location, downstream identifier and contract, rank (two are available), quantity type, capacity type indicator and package for a specified effective date range. The non-pathed line item depicts a single requested receipt or delivery quantity of gas for the location and date combination.

The pathed non-threaded model consists of two components. The components are the threaded segment (model type 'T') and the unthreaded segment (model type 'U'). The threaded segment defines the receipt location to delivery location path of gas, with its associated contract, receipt and delivery location, quantity type and package id for a specified effective date range. The unthreaded segment functions similar to the non-pathed model above with the exception of the usage of ranks. In the unthreaded segment, the upstream and downstream ranks are sender's option and the receipt and delivery ranks are not used, while in the non-pathed model the receipt and delivery ranks are sender's option and the upstream and downstream ranks are mutually agreed upon.

The beginning date, ending date, and ending time are required data elements for all nominations. A Transportation Service Provider may also require the beginning time in nominations. When a nomination is submitted to request transportation of gas beginning with the start of the gas day and stopping at the end of the gas day, the beginning time and ending time may be defaulted to the standard. In this case, the service requester would include the beginning date and ending date for a nomination without the beginning time and ending time.

Whether the model is pathed, non-pathed or pathed non-threaded, a single line item is referenced by the nominator's tracking id. This data element accompanies every line item in the nomination transaction set. When the Quick Response and Scheduled Quantity transaction sets are returned to the service requester, the line items are referenced using the nominator's tracking id. This number facilitates a quick and consistent means of tying originating line items to their corresponding response transaction.

The service provider's activity code is assigned by the transportation service provider to identify a combination of nomination data elements specified by the transportation service provider. It is used within the nomination process to represent a portion of the nomination components as specified by the transportation service provider.

For all nomination line items, the quantity type indicator is required. The quantity may be a receipt quantity or delivery quantity or may be designated as the quantity for both the receipt and delivery point ('both'). By utilizing the GISB standard fuel calculation, both the sender and receiver of the nomination can derive the corresponding receipt or delivery quantity when one quantity is provided.

The quantity in a nomination is always expressed as a daily (gas day) quantity, even for intraday nominations. This holds true regardless of the model type or quantity type indicator. Thus in the case of intraday nominations, the quantity expressed is always a daily quantity, even if the gas will not be scheduled to flow over an entire gas day.

The transaction type is utilized to distinguish types of transactions such as fuel, overrun or payback. For regular transportation the default is "current business".

The package ID may be utilized by the service requester to make a single nomination line item different from another nomination line item when two or more line items are otherwise identical. For instance, a pathed nomination line item may be for the same contract, receipt and delivery location, and upstream and downstream parties, but the service requester needs the transactions to be unique for internal reasons. The package ID could be used by the service requester to distinguish between the two transactions and keep them unique. The service provider is not obligated to validate the package id, and should return the package id as received as applicable in the dataset(s) transmitted to the service requester. When combined with all of the other components of a nomination line item, it is used to determine if a nomination line item is unique.

Nominations—GUI

Figure 21:
FIG. 21 is a flow diagram view of a nomination processing use case diagram according to an embodiment of the present disclosure.

Turning now to FIG. 21, a flow diagram view of a nominations processing use case diagram according to one embodiment of the present disclosure is shown. A gas controller can possess access to a number of modules according to a given security access, such as provided by a system administrator. The modules can include one or more of: Describe Nomination Plan, Describe Pipeline Templates, Describe Pipeline Configuration, and Create Pipeline Nomination. The Describe Nomination Plan module receives input from a Maintain Nomination module and a Describe Nom Plan Reference Information Module. In response to input from the Gas Controller, as well as the Maintain Nomination Plan and Describe Nom Plan Reference Information modules, the Describe Nomination Plan module is configured for describing a nomination plan. The Describe Nomination Plan provides an output to a Manage Best Available Quantity module.

The Describe Nom Plan Reference Information provides input to the Describe Deal Location module. In addition, the Describe Nom Plan Reference Information and the Describe Deal Location module provide input to a Manage Deal module.

The Create Pipeline Nomination module receives input from the Gas Controller, as well as the Describe Pipeline Templates module, Describe Pipeline Configuration module, a View Pipeline EBB View, and a Send Pipeline Nomination module. In response to the input, the Create Pipeline Nomination module is configured to create a pipeline nomination.

Figure 22:
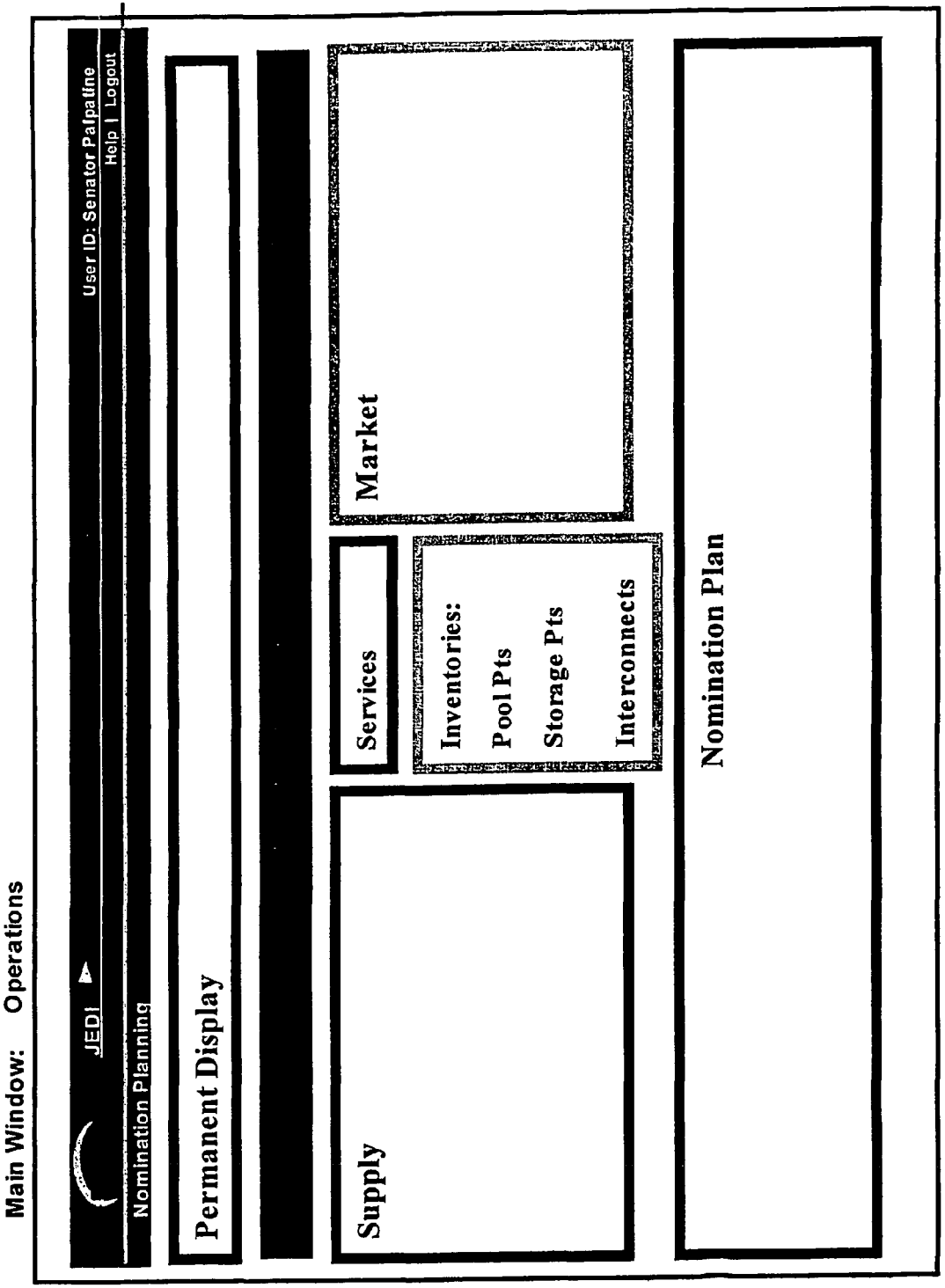
FIG. 22 is an exemplary screen view of an operations screen layout for nomination planning according to one embodiment of the present disclosure.

FIG. 22 is an exemplary screen view of an Operations screen layout for nomination planning according to one embodiment of the present disclosure. The Operations screen layout includes a title bar, a permanent display area, search criteria area, supply, services, inventories, market, and nomination plan areas. Inventories includes pool points, storage points, and interconnects.

Figure 23:
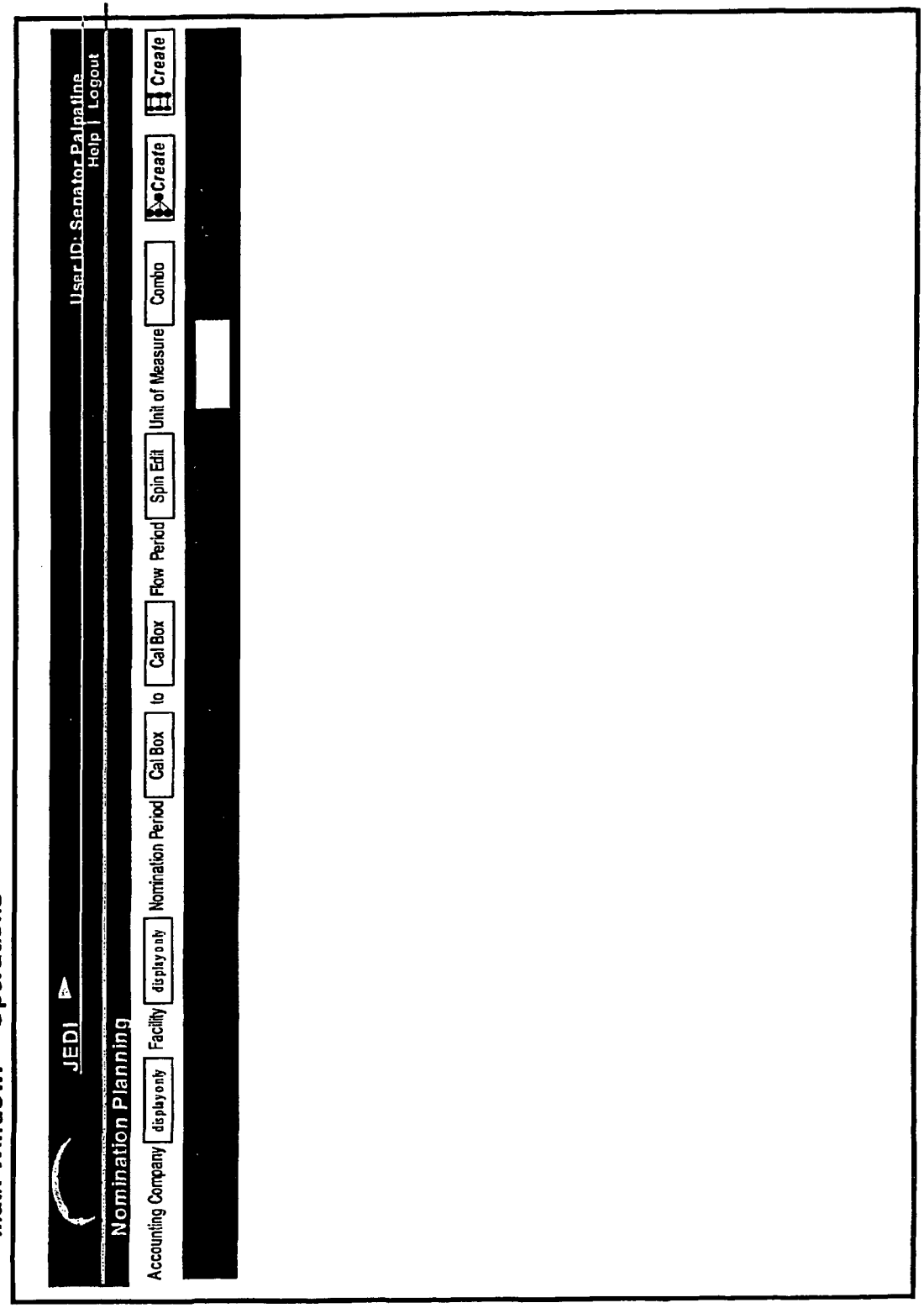
FIG. 23 is a screen view of an operations screen for nomination planning according to an embodiment of the present disclosure.

FIG. 23 is a screen view of an Operations screen layout for nomination planning including an example of content for the permanent display area. As shown, in one embodiment, the permanent display area includes identification/information relating to an accounting company, facility, nomination period, flow period, unit of measure, and options for creating aggregate or single connections. In addition, the search criteria area includes an input box for entering a desired text to be searched and a search execution option.

Figure 24:
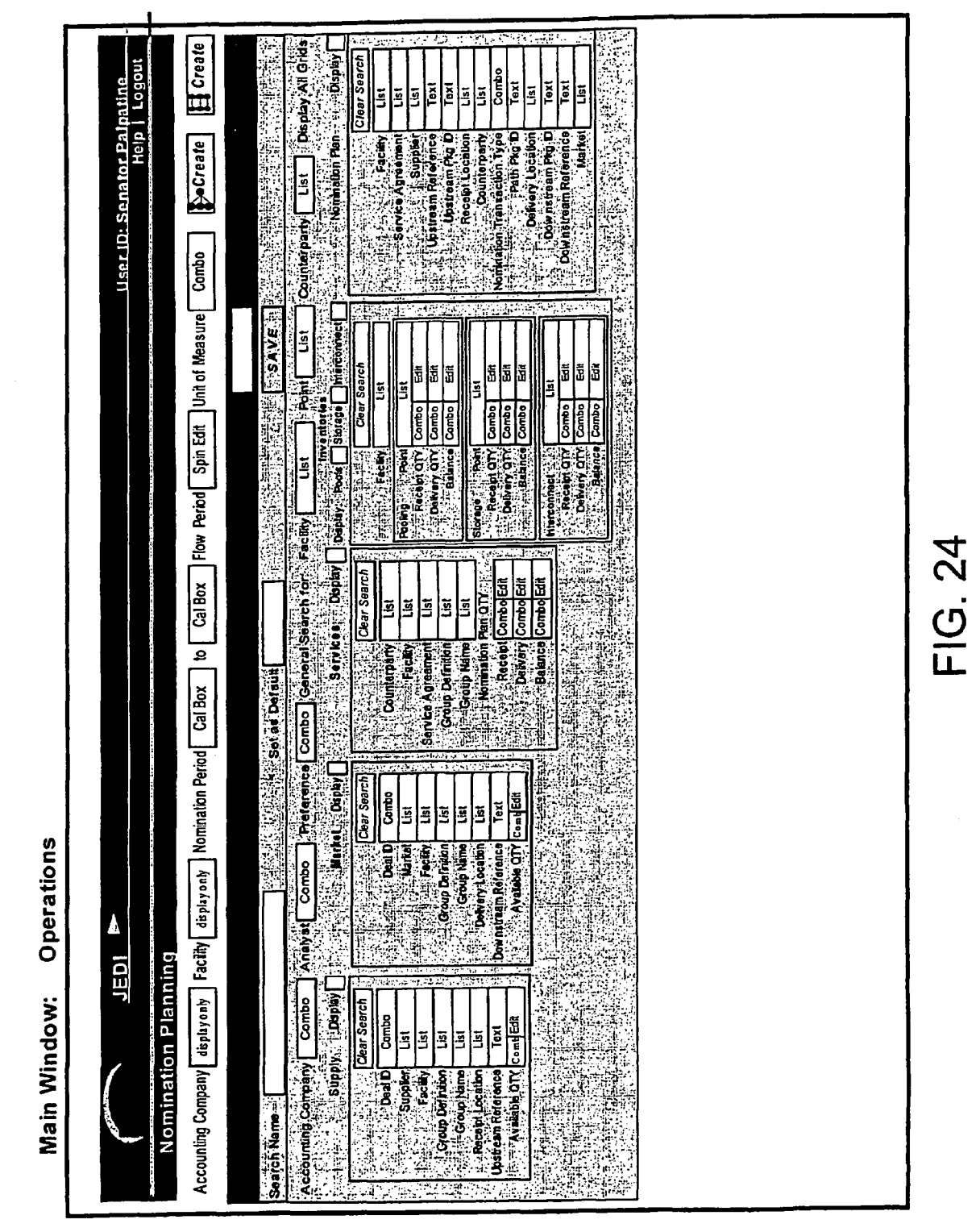

FIG. 24 is a screen view of the Operations screen layout for nomination planning showing further detail of exemplary search criteria. The search criteria can be saved for subsequent usage or set as a default Searching is available in one or more combinations of supply, market, services, inventories, and nomination plan. Supply attributes include Deal ID, Supplier, Facility, Group Definition, Group Name, Receipt Location, Upstream Reference, and Available Quantity. Market attributes include Deal ID, Market, Facility, Group Definition, Group Name, Delivery Location, Downstream Reference, and Available Quantity. Services attributes include Counterparty, Facility, Service Agreement, Group Definition, Group Name, and Nomination Plan Quantity including receipt, delivery, and balance.

Referring still to FIG. 24, the Inventories attributes include Facility, Pooling, Storage, and Interconnect. For Pooling, the attributes include Point, Receipt Quantity, Delivery Quantity, and Balance. For Storage, the attributes include Point, Receipt Quantity, Delivery Quantity, and Balance. For Interconnect, the attributes include Receipt Quantity, Delivery Quantity, and Balance. Lastly, for Nomination Plan, the attributes include Facility, Service Agreement, Supplier, Upstream Reference, Upstream Pkg ID, Receipt Location, Counterparty, Nomination Transaction Type, Path Pkg ID, Delivery Location, Downstream Pkg ID, Downstream Reference, and Market.

Figure 25:
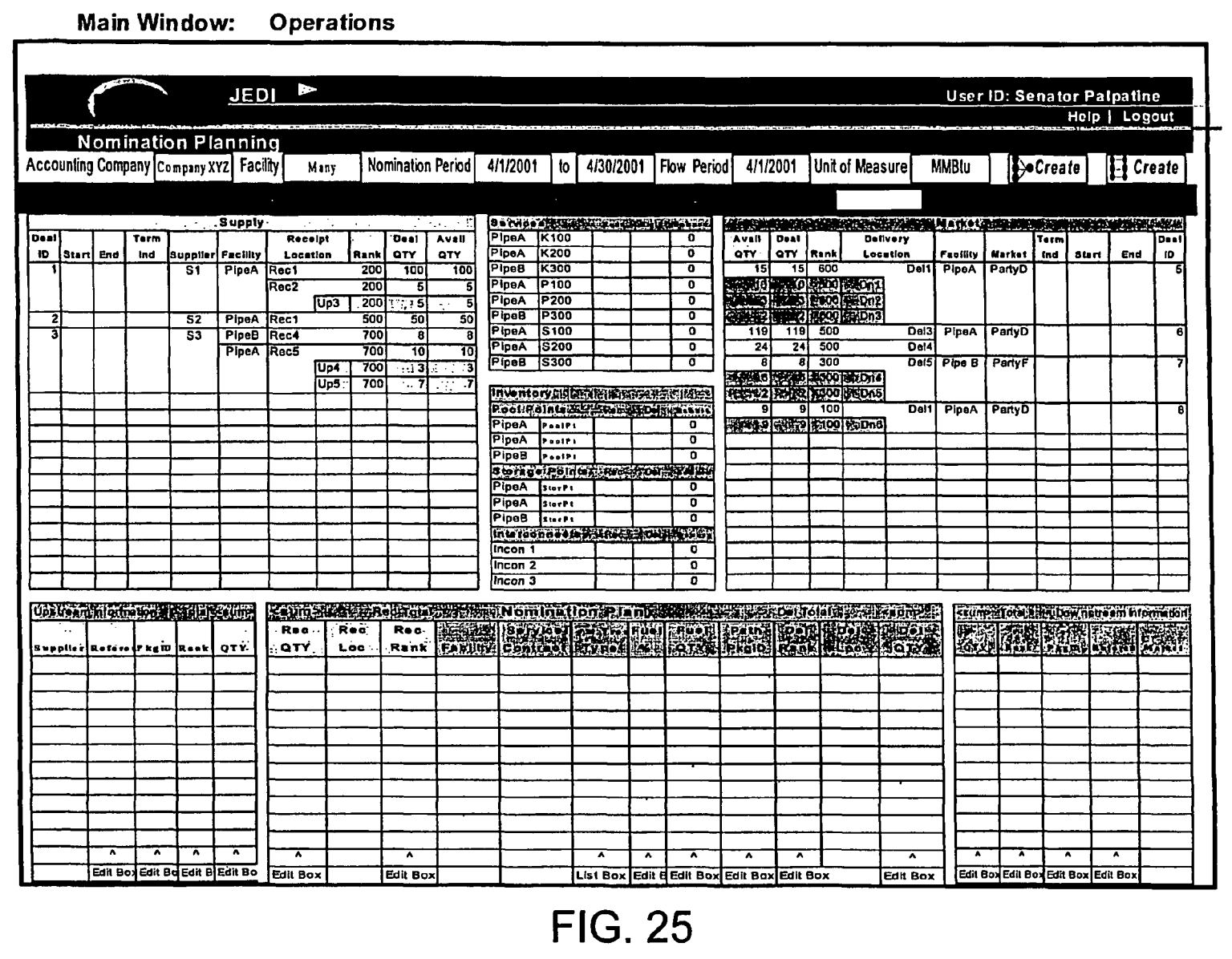

FIG. 25 is a screen view of the Operations screen layout for nomination planning showing further exemplary detail. The screen layout illustrates nomination planning for the accounting company Company XYZ having a nomination period of Apr. 1, 2001 to Apr. 30, 2001, and with a unit of measure MMBtu. As shown, the supply area indicates three deals, ID 1, ID 2, and ID 3. Each deal can be characterized by one or more of a Start, End, Term Ind, Supplier, Facility, Receipt Location, Rank, Deal Quantity, and Available Quantity. The Services area includes for one or more Facility, Service Contract, a Receipt, Delivery, and Balance. The Inventory Area includes Pool Points, Storage Points, and Interconnects, including one or more of Counterparties, Type, Receipt, Delivery, and Balance.

With reference still to FIG. 25, the Market area indicates four deals, ID 5, ID6, ID7, and ID8. Each deal can be characterized by one or more of an Available Quantity, Deal Quantity, Rank, Delivery Location, Facility, Market, Term Ind, Start, and End. In the lower left hand region of the Operations, Nomination Planning, screen view, an Upstream Information area is provided. The Upstream information includes one or more of supplier, reference, Pkg ID, Rank and Quantity. In a lower central region of the Operations, Nomination Planning, screen view, a Nomination Plan area is provided. The nomination plan includes a receipt total and a delivered total. Each line of the nomination plan table, can include one or more of Receipt Quantity, Receipt Location, Receipt Rank, Facility, Service Contract, Type, Fuel %, Fuel Quantity, Path PkgID, Delivered Rank, Delivered Location, and Delivered Quantity. Lastly, in the lower right hand region of the Operations, Nomination Planning, screen view, a Downstream Information area is provided. The Downstream information includes one or more of Quantity, Rank, Pkg ID, Reference, and Market.

Figure 26:
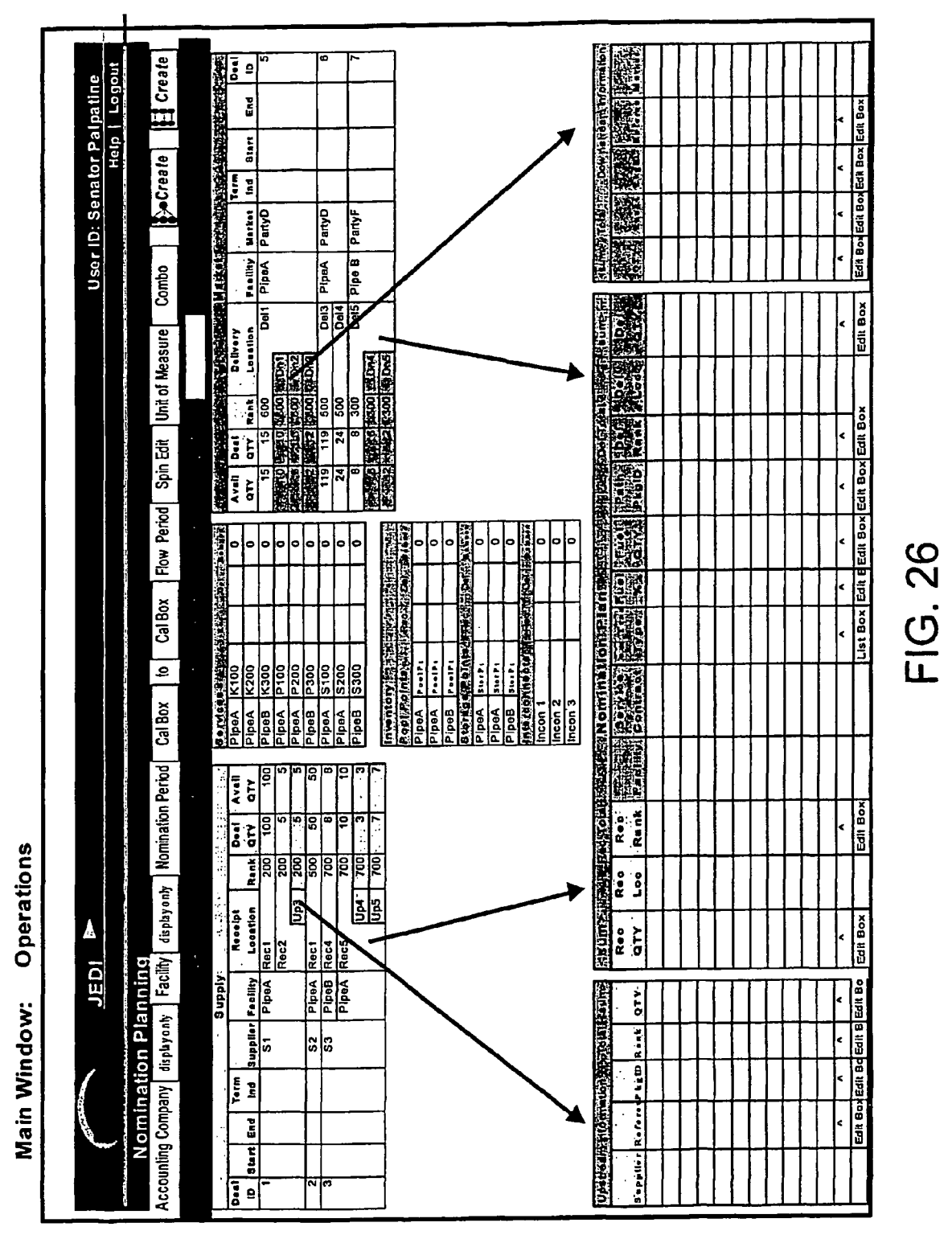

Referring now to FIG. 26, another screen view of the Operations screen layout for nomination planning is shown in further exemplary detail. For Deal ID 1 in the Supply table, the Receipt Location information includes further detail for receipt location Rec2, corresponding to Upstream Information Up3. Additional upstream information can be provided in the upstream information area of the display, as indicated by an arrow. For Deal ID 3, the Receipt Location information includes further detail for receipt location Rec5, corresponding to Upstream Information Up4 and Up5. Additional receipt location information can be provided in the nomination plan information area of the display, as indicated by an arrow.

Further with reference to FIG. 26, for Deal ID 5 in the Market table, the Delivery Location information includes further detail for delivery location Del1. In particular, Del1 includes Dn1, Dn2, and Dn3, as well as respective available quantities, deal quantities, and ranks. Additional downstream information can be provided in the downstream information area of the display, as indicated by an arrow. For Deal ID 7, the Delivery Location information includes further detail for delivery location Del5, corresponding to Downstream Information Dn4 and Dn5. Additional delivery location information can be provided in the nomination plan information area of the display, as indicated by an arrow.

Figure 28:
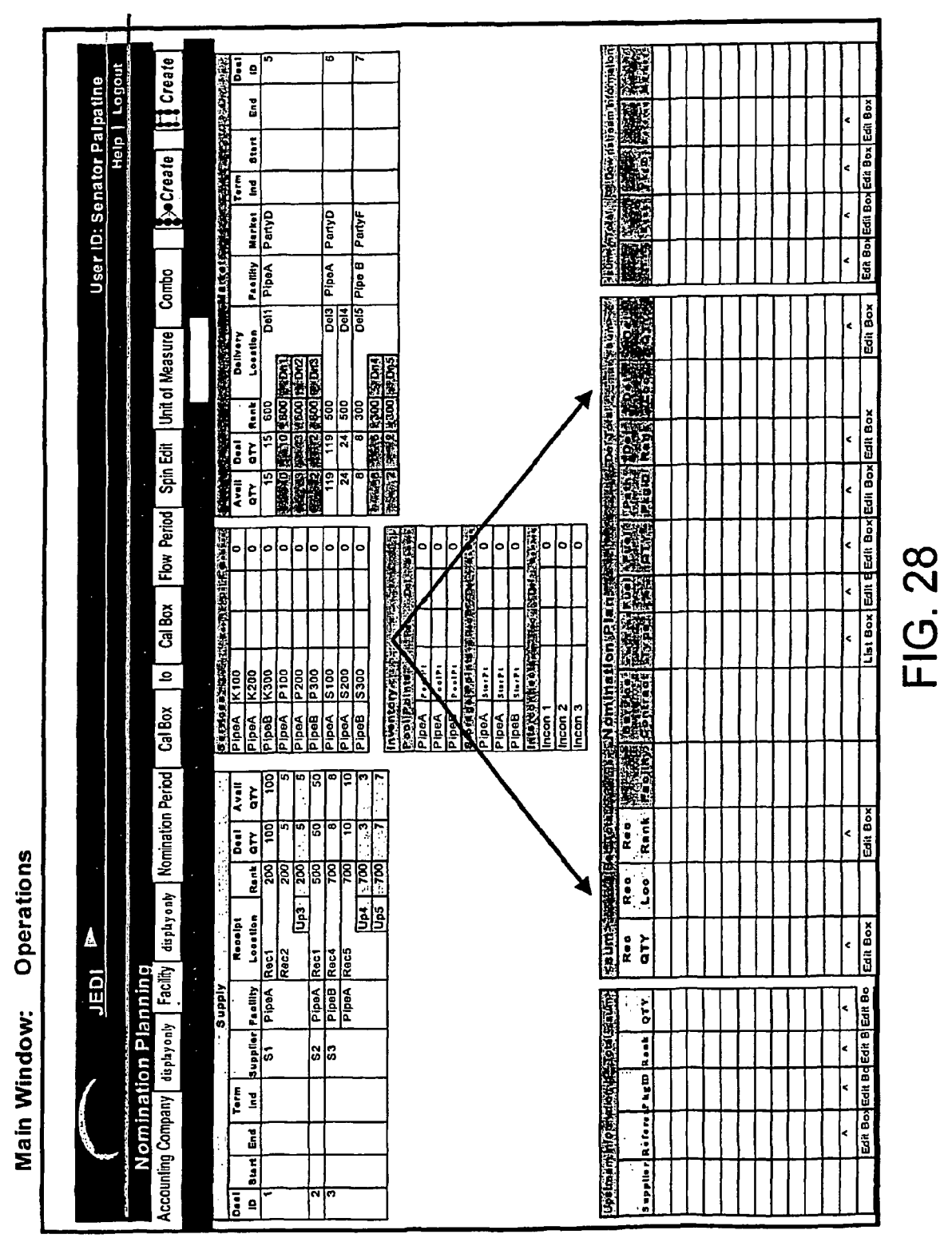

In FIG. 27, the screen view of the Operations, Nomination Planning, shows additional exemplary services information in the service contract column of the nomination plan information area of the display, as indicated by an arrow. In FIG. 28, the screen view of the Operations, Nomination Planning, shows additional Inventory information in the receipt and delivery columns of the nomination plan information area of the display, as indicated by arrows.

Figure 30:
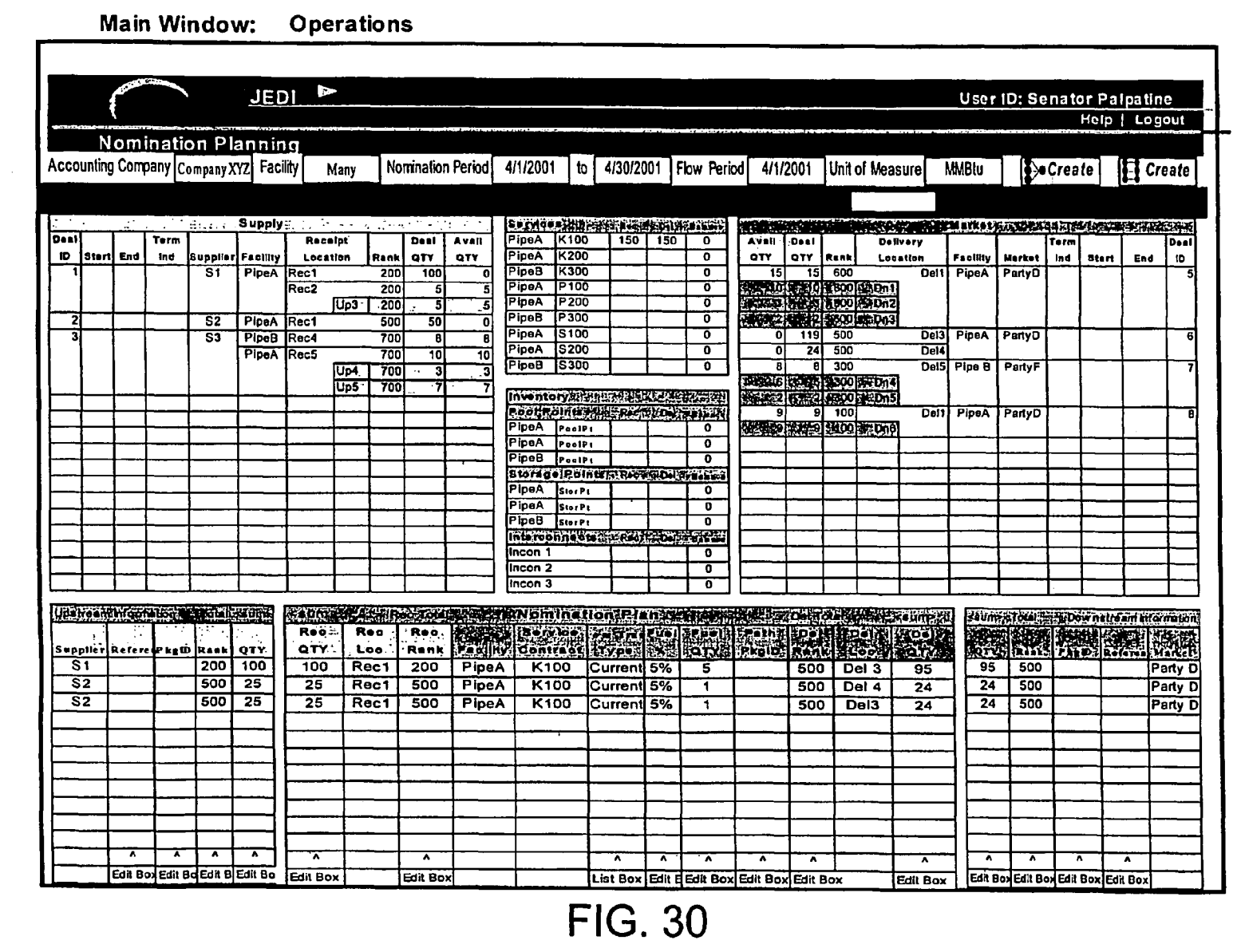
Figure 31:
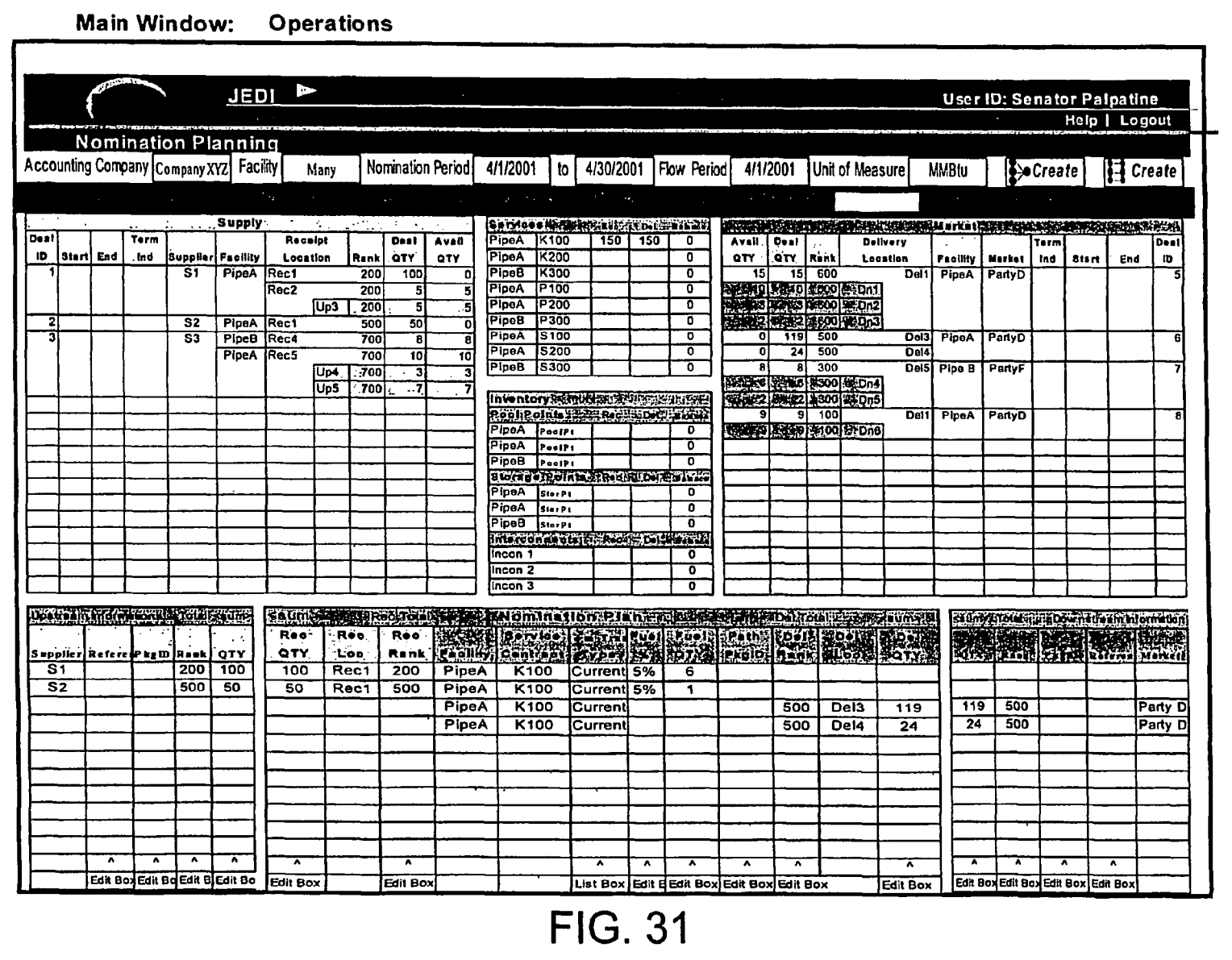
Figure 32:
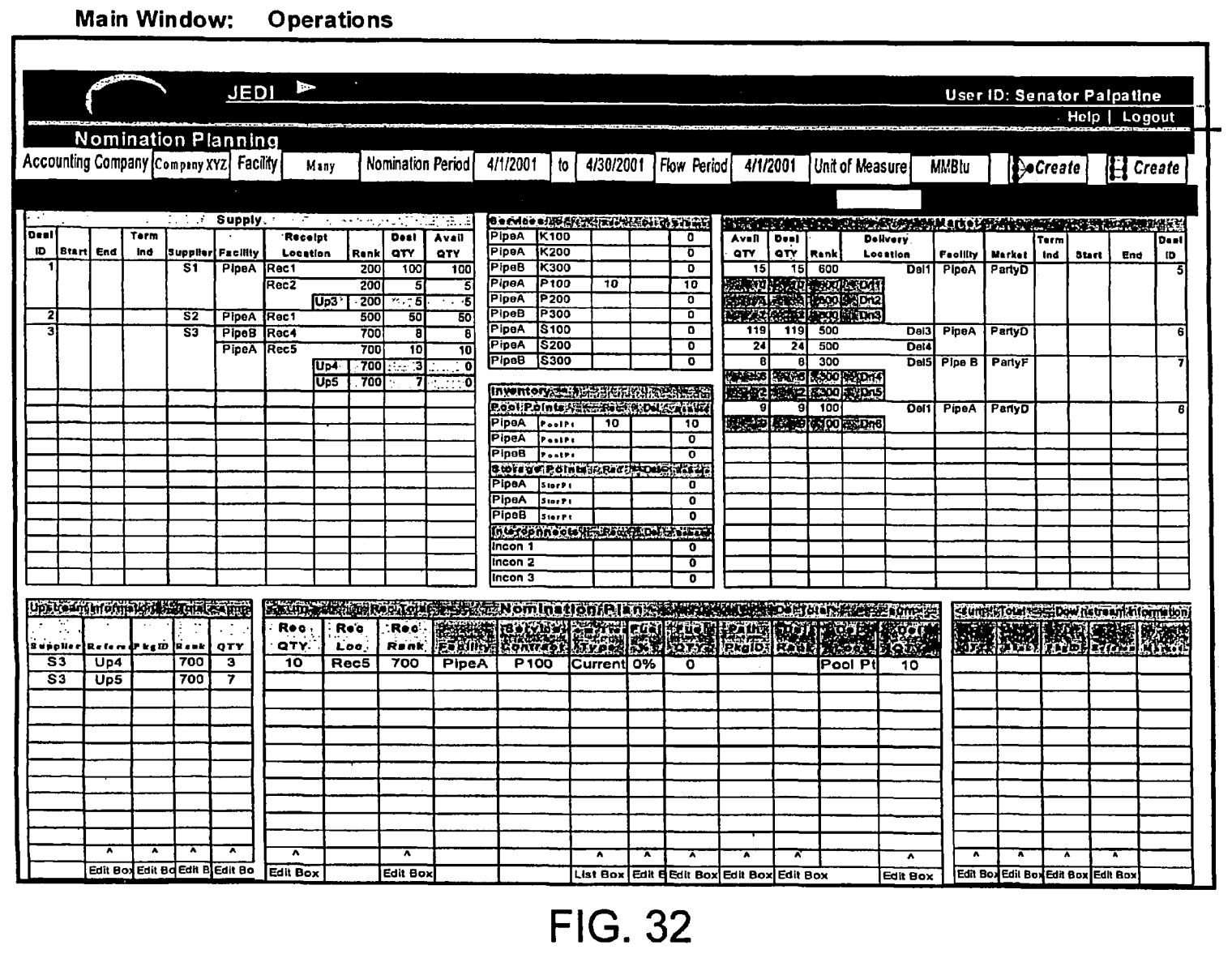
Figure 33:
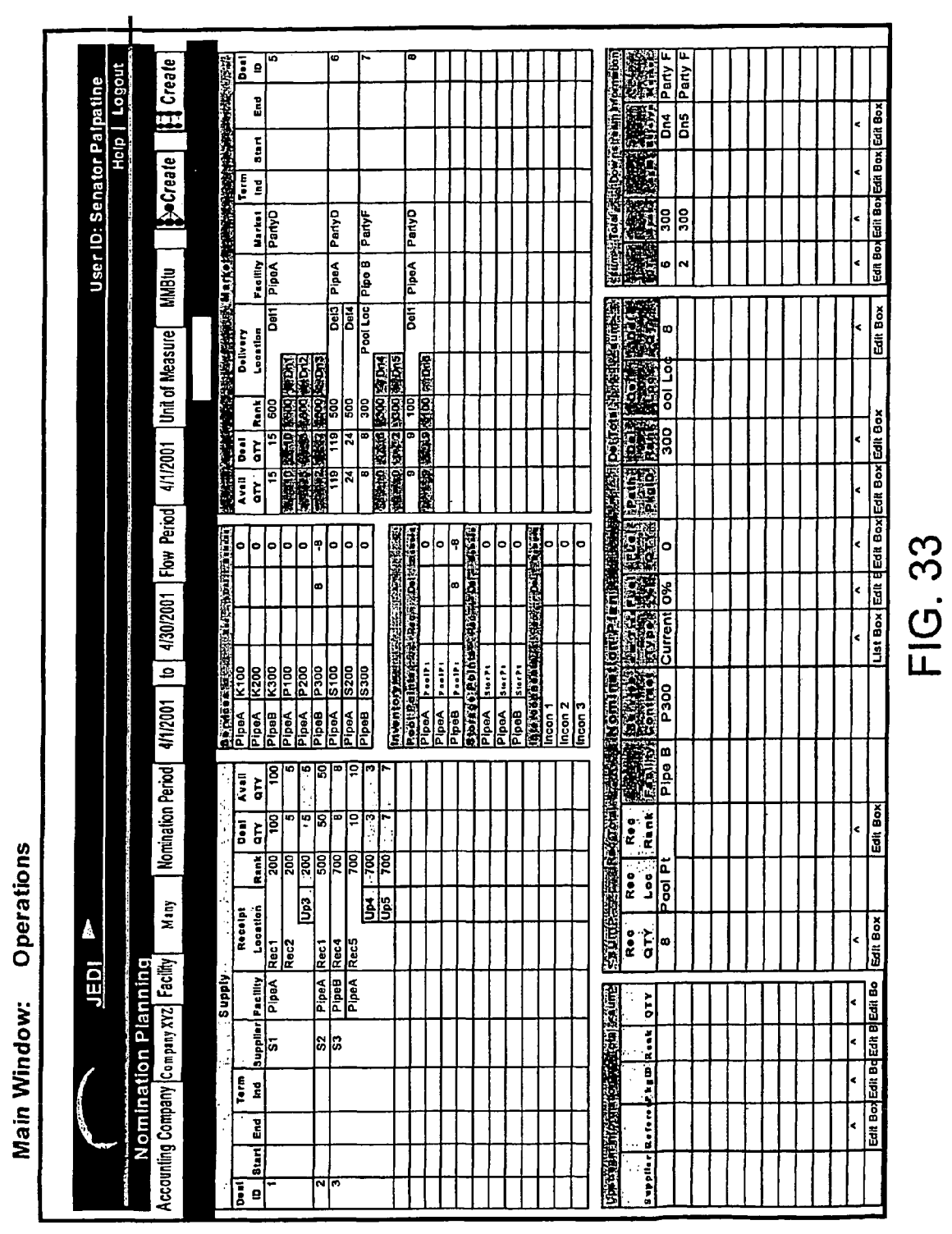
Figure 34:
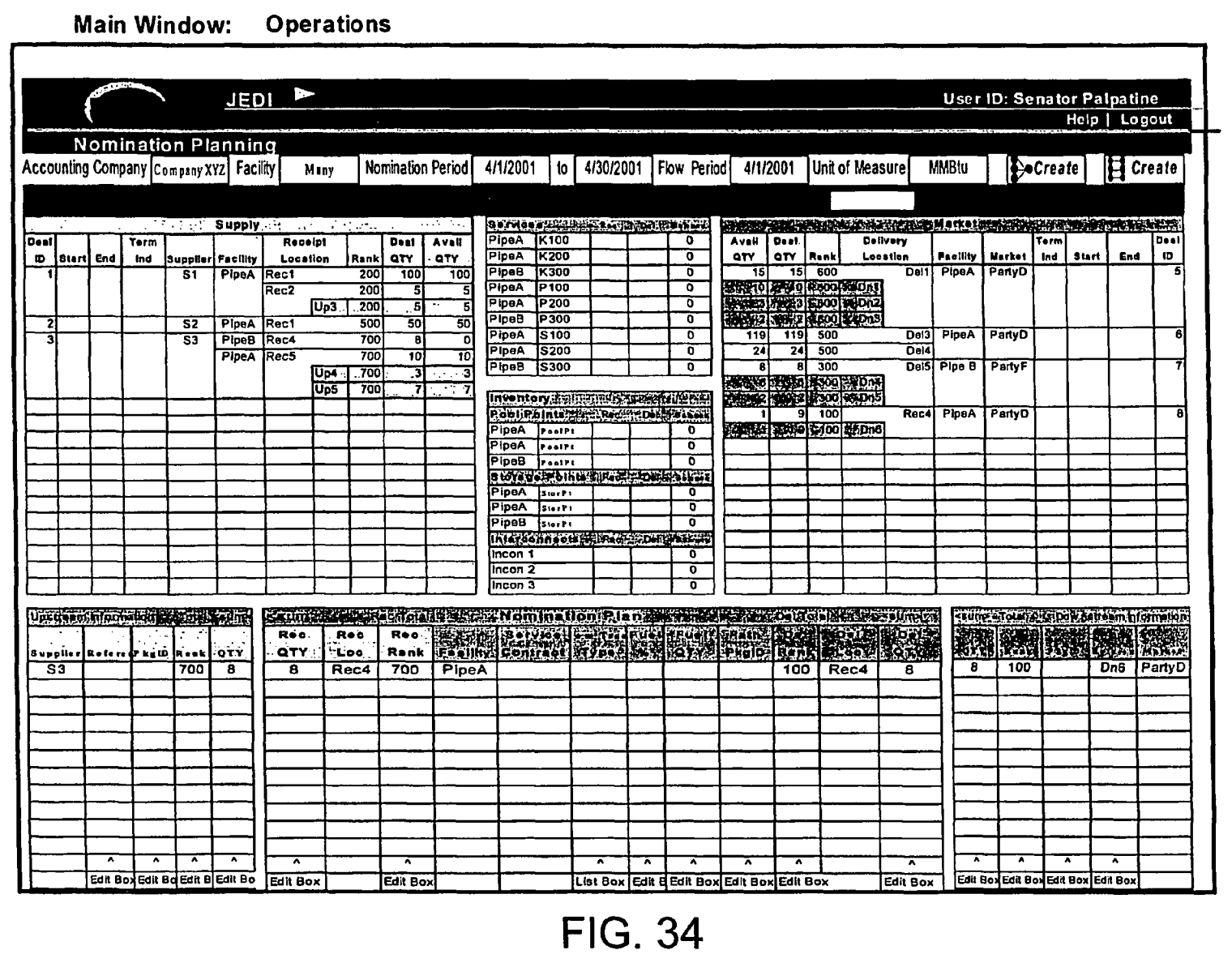

In FIGS. 29-34, the respective screen views of the Operations, Nomination Planning, display of FIG. 25 are shown in further exemplary detail. In particular, in FIG. 29, one set of reference information is shown depending upon which delivery or receipt location is highlighted, as indicated by the arrows. In FIGS. 30 and 31, additional nominations detail is shown in the nomination plan area of the display, as well as upstream and downstream information. In FIG. 32, the additional nominations detail includes upstream information and a corresponding nomination plan. In FIG. 33, the additional nominations detail includes a nomination plan and corresponding downstream information. In FIG. 34, upstream information, a nomination plan, and corresponding downstream information are shown.

Turning now to FIG. 35, an illustrative screen view of a whiteboard detail for nomination planning according to one embodiment is shown. The whiteboard detail enables a system user to evaluate various deal scenarios for potential use in a given nomination plan or plans. The whiteboard detail includes a region for Purchase, including Deal ID, Price, Quantity and Flow Unit. A region for Sales includes Flow Unit, Quantity, Price, and Deal ID. A central region is provided for Converted data, corresponding to respective purchase and sales deals. For each of the Purchase and Sales columns, a Deal Sub Total is provided, as well as Interconnect Sub Total, and a respective Total Purchases/Total Sales. Any difference between the total purchases and total sales is provided as a Difference variable. FIG. 36 provides a further screen view of the whiteboard detail of FIG. 35 according to another embodiment of the present disclosure, including Deal ID, Volume, Flow Unit, Currency, Price/Index, Current Unit, Points, Area, Region, Service, and Spot/Term Dealmaker. FIG. 37 provides a further screen view of the whiteboard detail of FIG. 35 according to another embodiment of the present disclosure, for example, a whiteboard summary including for each respective pipeline, a total difference, and a purchase, sales, and difference for a baseload, a swing, and an interconnect.

Standard API for Date Range Records

According to one embodiment, validation patterns are used in connection with the database tables (entities). An exemplary table of terms, definitions, and respective database mappings is provided in the table below. The terms "table", "column" and "row" are used when referring to validations derived from the data model.

| Term | Definition | Database Mapping |
| --- | --- | --- |
| Class | For the purpose of this disclosure, a class represents an entity class, which maps to a specific database table. | Table |
| Date-Range Object | Used in describing Date-Range classes. One or more rows in a table (or instances of a class) may comprise a single Date-Range Object. Depending on the date in question, a different table row will represent the current status of the Date-Range class. | Master ID Key Column |
| Business Object | This refers to a specific class, "Business Object". This class is used to generate unique ID keys for several classes that share sets of intersection tables, for identifying relationships, groups and attributes. | BusinessObject table. |
| Instance | Single item that implements a class | Row |
| Attribute | Member variable that belongs to a class | Column |
| Role | Attribute that represents an instance of another entity class. | Foreign Key Column |

Date Range Vs. Non-Date Range Class Type

Non-Date Range: The Physical Key for the class uniquely represents a single object. The class may have attributes for a begin and end date that represents the active range of that object, but the begin and end dates are not part of the logical key of the class. There is no way to represent an object that has different attributes for different date ranges on this class. An example of a Non-Date Range table with begdate and endDate attributes is the CodeValue class.

Date-Range: The class is used to represent a Date-Range Object. It has different attributes for different date ranges. The class will contain a master ID attribute that represents a single object. The Physical Key for the class does NOT uniquely represent a single object, but rather the definition of that object for a date-range. The class must have attributes for a begin and end date that represents the definition of an object for that active range. The logical key for the class must include the begin and end dates. An example of a Date Range table is the Facility class.

Classes that use a Business Object Class may include the following. The physical key of the class is generated from the BusinessObject class. The class is assigned a unique ID in the BusinessObjectType Class. The classes that use the BusinessObject Class can either be Date-Range, or Non-Date Range classes. An example of a class that uses the Business Object table is the Facility class.

The system architecture includes a standard API that is designed to be used to select, create, update, and delete date-range records. Several tables have been created that serve only to generate Master ID keys for a related date-range table. Examples of these tables are the point and pointheader tables. The pointheader table contains a primary key, Further with respect to the API for date range records, the terms below represent both columns on a typical Date Range table, and also parameters used in the API for date-range records.

| Term | Definition |
|------|------------|
| Master_ID | ID column that identifies a single object. This object may have different values on different dates. Records that have the same Master_ID value, represent the values of a specific object for a specific instance of time. NOTE: There will be some date-range objects that have a composite master ID key. The API for those objects will contain the correct number of parameters necessary to handle the composite Master ID key. |
| BegDate | Beginning date. The date at which a set of attributes applies to an object. |
| EndDate | Ending date. The date at which a set of attributes stops applying to an object |
| Attribute 1..N | List of all of the attributes that apply to an object, excluding Master_ID, BegDate, and EndDate. |

Selects

Selects for a date-range record can have many different variations. Several examples of selects are shown below:
1. Select all records for an object uniquely represented by "Master_ID=7".

| Method | Returns | |
|--------|---------|---|
| FindByVariableFilter | Set of 0 or more records | |
| Attribute | Operation | Value |
| Master_ID | "=" | 7 |

2. Select an object uniquely represented by "Master_ID=7". Select zero or one records that exist for the date of "Oct. 1, 2000".

| Method | Returns | |
|--------|---------|---|
| FindByVariableFilter | Set of 0 or more records | |
| Attribute | Operation | Value |
| Master_ID | "=" | 7 |
| BegDate | "<=" | "10/1/2000" |
| EndDate | ">" | "10/1/2000" |

3. Select an object uniquely represented by "Master_ID=7". Select all records that exist between the dates of "Oct. 1, 2000" and "Oct. 25, 2000".

| Method | Returns | |
|--------|---------|---|
| FindByVariableFilter | Set of 0 or more records | |
| Attribute | Operation | Value |
| Master_ID | "=" | 7 |
| BegDate | "<" | "10/25/2000" |
| EndDate | ">" | "10/1/2000" |

4. Select all objects that have a name like "TIM". Select all records that exist between the dates of "Oct. 1, 2000" and "Oct. 25, 2000".

| Method | Returns | |
|--------|---------|---|
| FindByVariableFilter | Set of 0 or more records | |
| Attribute | Operation | Value |
| Name | "LIKE" | "TIM" |
| BegDate | "<" | "10/25/2000" |
| EndDate | ">" | "10/1/2000" |

The findByVariableFilter method allows any combination of selects using any of the attributes on an entity, and the following allowed operations:

| = | < | > | <= | >= | <> | IS NULL | IS NOT NULL | LIKE |
|---|---|---|----|----|----|---------|-------------|------|

Inserts

An insert of a new date-range record is straightforward affair. The calling process sends the attributes of the entity and a date-range. The information is validated and inserted. If any validation errors are found, a compiled list of validation messages is sent to the calling process.

| Method | Create |
|--------|--------|
| Parameters | Attribute 1..N |
|  | BegDate |
|  | EndDate |
| Returns | Value of new Master_ID |

Updates

An update of an existing date-range object requires a Master_ID attribute to uniquely identify the object to be updated. The calling process also sends the new attributes of the object and a date-range. The information is validated and inserted. If any validation errors are found, a compiled list of validation messages is sent to the calling process.

| Method | Update |
|--------|--------|
| Parameters | Master_ID |
|  | Attribute 1..N |
|  | BegDate |
|  | EndDate |

When a new record is saved, old records are checked to see if they overlap. They must then be resolved. This process assures that no overlapping records are created when an update occurs.

Deletes

A delete of an object involved deleting all date-range records that are associated with that object. The calling process sends the master ID only. Validations are done against deleting all for that master_ID. If the deletion passes the validations, then all records with the master ID are deleted. If any validation errors are found, a compiled list of validation messages is sent to the calling process.

|  |
| --- |
| Method |
| Remove |
| Parameters |
| Master_ID |

Change Lifespan

Date-Range entities where no gaps are allowed will have additional functionality to deal with "Lifespans". A lifespan represents the logical beginning and ending date of a Date-Range Entity Instance.

Change Lifespan API Definition

Every date-range entity that allows no gaps, and that has a logical end date would have the following method:

|  |
| --- |
| Method |
| ChangeLifespan |
| Parameters |
| Master_ID |
| BegDate |
| EndDate |
| ValidateDataLoss |

The calling process would call "ChangeLifespan" to change the lifespan of a record. The newBeginDate or NewEndDate parameters could be null, indicating no change on that date. If validateDateLoss is True, then a validation occurs whether any rows of data will be deleted when the date range is changed. If any rows of data would be deleted, then an error message is sent to the calling process.

Every date-range entity that allows no gaps, and that has NO logical end date would have the following method:

|  |
| --- |
| Method |
| ChangeLifespan |
| Parameters |
| Master_ID |
| BegDate |
| ValidateDataLoss |

The calling process would call "ChangeLifespan" to change the lifespan of a record. If validateDateLoss is True, then a validation occurs whether any rows of data will be deleted when the date range is changed. If any rows of data would be deleted, then an error message is sent back to the calling process.

Delete Range

Date-Range entities where gaps are allowed will have additional functionality to deal with deleting specific ranges. These will typically be transactional records that have no single lifespan. They can go in and out of existence.

Every date-range entity that allows gaps, would have the following method:

|  |
| --- |
| Method |
| DeleteRange |
| Parameters |
| Master_ID |
| BegDate |
| EndDate |

Example: Nomination #1 might have the following date-range records:

Jan. 1, 2000- - - Jan. 10, 2000 Jan 10, 2000- - - Feb. 15, 2000

If the user wanted to delete the nomination from Jan. 5, 2000 to Feb. 10, 2000, the user would call the "DeleteRange" method with the master ID key, and a begdate of Jan. 5, 2000, and an endDate of Feb. 10, 2000. The result would be:

Jan. 1, 2000- - - Jan. 5, 2000 Feb. 10, 2000- - - Feb. 15, 2000

Update Changed Attribute

In one embodiment, an update of one or more attributes independent of the existing date range records can be accomplished as follows. Several modes are identified for this.

1. Lifespan—Update Attributes for the lifespan of the date-range object.
2. Current Date Forward—Update attributes from the current date, through the lifespan end date of the date-range object.
3. Selected Date Range—Update attributes from the selected begin date, to the selected end date.

To meet the needs of these three modes, a standard method was introduced:

|  |
| --- |
| Method |
| UpdateChangedAttributes |
| Parameters |
| Master_ID |
| Attribute 1 |
| setAttrbute1Null |
| Attribute 2 |
| setAttrbute2Null |
| ............... |
| Attribute N |
| BegDate |
| EndDate |

The calling process sends in null values for Attributes that have not changed. The calling process sends in the changed values for the attributes that have changed. If an attribute is needed to be set to null, then the corresponding "setAttributeXNull" parameter is set to true. The "SetAttrbuteXNull parameters are only included if the corresponding database column is nullable.

The BegDate and EndDate parameters have the following logic:

If the begdate parameter is null, then the lifespan begin date will be used for the begin date.

If the enciDate parameter is null, then the lifespan end date will be used for the date range.

This allows for the following types of calls to be done:

| Action | begDate Value (sent by calling process.) | EndDate value (sent by calling process.) |
| --- | --- | --- |
| Update for Lifespan | Null | Null |
| Update for current date forward | Populated with current date. | Null |
| Update for date range | Populated with selected begin date. | Populated with selected end date. |

A validation is done to test for any gaps between the begin and end date of the update. If there are any gaps where records don't exist, then the update will fail, and a validation message will be returned.

When an update is done, all records that exist for the date range to be updated are retrieved, and the changed attributes are merged with the existing attributes for each date range record. These merged records are then resubmitted as regular updates through a standard "Update" method of the present embodiments.

This means that all attributes will be revalidated on an update, not just on the attributes that are changed. If somehow a record got corrupted so that it has an invalid attribute on it, the user will see a validation message for that attribute, even if the user did not change that attribute. This means in effect, that any invalid record must be corrected for all invalid attributes in order to change a single attribute.

This approach greatly simplifies the validation logic that is shared for the standard "create", "update", and "updateChangedAttributes" methods.

API Design Standards

The business layer utilizes API's that model a respective domain and not the underlying data model. In other words, each API interface is made to be more object or semantic oriented rather than data centric. In addition, the location of methods for each API design is made to be intuitive. For example, all finds for facilities are on the facility API and any code values associated with a facility come from the facility API.

The business layer API is also made to be non-screen centric. That is, the API does not focus on screens, although the primary consumer is the GUI. Rather the API accommodates the needs of the screens while providing an API that can be used for other applications, such as reporting, conversion, and voice response units. A GUI Screen may call several API classes, each API class mapping to a business object that the GUI needs to communicate with.

API Standards

With respect to API classes, they represent domain objects that hide the physical storage in the database. API's are not mapped to screens but to domain models. All external calls go through an API bean. The Non-API business layer beans are not called directly from a GUI.

An API has been created for selecting lists of code values. The class is called "SystemAPI". It contains a method referred to as findCodeValuesByCodeType. This allows for any list of code values to be selected back, as long as the calling process can specify the constant for the associated code type. Other API classes would only be required to provide "find" methods for code values if there is a business requirement to filter the code values that are sent back.

Find methods on the API's are designed to return all columns from a database table, when selecting from a single table. The calling process, however, can ignore any unneeded columns. Standard findByVariableFilter methods provided on the Entity EJB's are used when selecting data from a single database table.

When table joins are performed, the code sends back the columns that the calling process requires. There would be no need to return all of the columns of all of the tables on a 5-table join. However, the code returns any physical key columns, or foreign key columns that the calling process will need to uniquely identify a related object.

All remove methods contain a physical key or master ID (which may be a compound key) and, if required, a force delete argument. The force delete argument tells the remove method that the caller wants to delete the data and disregard warnings.

Many business objects being manipulated through an API will have a single physical ID key that maps to the name of the business object. However, the names of physical keys are documented in the API documentation when an <entity>ID is not explicit. This relates mostly for Date-Range objects, where Master_ID keys are used instead of physical keys to uniquely reference a business object. The Master_ID key is often related to a header, instead of the business object itself. For example: A "facility" object is uniquely identified by a "FacilityHeader_ID" value.

GUI to API Interface Design

Sequence diagrams are useful for mapping combos, list boxes, and grids of a GUI to the corresponding methods of an API class. They serve two purposes. First, the sequence diagrams can provide documentation so that a GUI designer can verify that there is an existing interface for all of a respective screen's requirements. Secondly, the diagrams can provide documentation to the GUI developer so that the developer knows which method on which API class to call for each screen element on a particular GUI.

API classes are defined with respect to functional areas. A single API class may be used in multiple sequence diagrams across different functional areas. Sequence diagrams concentrate on the unique needs of a specific GUI.

Sequence and activity diagrams can be used to document business processes that occur underneath the API class. For example, sequence diagrams can be used to show what other classes are being called by the API class. Activity diagrams can be used to show the logical flow of complex business processes Coding API's for Domain objects Each domain object identified in the system is associated with an API class. The particular class is a stateless session bean and provides a set of methods for manipulating the domain object and all of its associated details.

The methods for creating or updating a domain object may require XML-Bound classes to allow a calling process the ability to send in a complex structure of data. This structure may contain collections of domain detail information. The API class will be in charge of brokering the domain detail information to the "Entity" EJB's that it relates to.

Shared Domain Detail Objects that Have Their Own API's.

Some Domain Detail Objects are shared by more than one Domain Object. An example would be "Groups." Many Domain Objects have groups of other Objects. A Groups API hides the complexity of dealing with groups. A calling process calls a Domain Object's API to get a list of it's detail groups. The Domain Object would then call the Groups API.

If a Domain Object has Detail Objects that have their own API's, the Domain Object can be used as a broker for looking up existing details. A Domain Object can contain methods to manipulate (create/update/delete) a Domain Detail Object, but this should be limited to the scope of the Domain Object. For example, a PointAPI bean could allow functionality where points can be added to or removed from existing groups of points. This would involve the PointAPI bean calling the GroupAPI bean. If, however, the calling process wanted to create a new group, or a new type of group, a Generic Group Screen is provided that calls the Group API directly.

System-Wide Utilities

The system architecture includes a number of System-Wide Utilities, several of which are presented below. A class factory creates a corresponding class.

Utility Factory Class

In creating utility classes, most utility classes will implement an interface and are created by a factory class, based on a customer's ASP customer ID. This allows the system to have variations in how the utility classes work between companies. This is important for a pipeline operations product, because different companies may have very exacting and conflicting criteria for how the system handles some math and business operations.

In one embodiment, the factory class is com.altra.common.util.UtilityFactory. The class factory contains a set of static create methods for use to create a utility that implements a utility interface. The utility may be different depending on the parameter(s) sent into the create method. Typically, the create method will only accept an ASP Customer ID as a parameter which allows for different utilities to be instantiated for different customers.

Rounding Utility

With respect to rounding, some companies may have different standards for rounding than others. In order to deal with this business scenario, the utility factory creates the correct rounding utility according to the ASP customer that is doing the rounding. For example, when the system needs to do rounding, a call is made to:

UtilityFactory.createRoundingUtility(Integer ASPCustomer_ID). As this is a static method, the system does not instantiate the factory class.

An example (Inside a session EJB) can include the following:

```
double value = 1.234;
int decimalPrecision = -1;
IRoundingUtility iRoundingUtility =
    UtilityFactory.createRoundingUtility(getCallContext( ).
    getAspID( ));
double result = iRoundingUtility.round(value, decimalPrecision);
```

Documentation for the iRoundingUtility.round method is as follows:

| parameter | value | Contains the value to round. |
|---|---|---|
| parameter | decimalPrecision | Contains the decimal place to round. Based on the power of 10. |
| | 2 = round to nearest 100 | |
| | 1 = round to nearest 10 | |
| | 0 = round to nearest 1 | |
| | −1 = round to nearest .1 | |
| | −2 = round to nearest .01 | |
| returns | rounded number. | |

Date Constants

With respect to date constraints, there are many instances where dates are specified only as "beginning of time" and "end of time." These are constants, so they will be uniform throughout the application. For example, DATE_BEGINNING_OF_TIME and DATE_END_OF_TIME can be declared in a Date Constants file, such as, com.altra.common.date.DateConstants.

Bound Data Objects

Bound data objects are business objects that can be marshaled through the system architecture of the present embodiments. They are designed to support a configurable object state (i.e. ADD, UPDATE, DELETE), and can be generated and validated from an XML Schema file.

In order to set up a schema, a file similar to the one below is created. An explanation of this file structure is provided subsequently. The text in bold will be explained. The file structure of .xsd files is kept the same for various schemas of the present embodiments, except for the <element> elements (in box), which contain the information about the XML-Bound Objects to generate.

```
<?xml version="1.0"?>
<!DOCTYPE schema [
    <!ENTITY system_objects SYSTEM "file:./system.xsd">
]>
<schema xmlns="http://www.w3.org/2000/10/XMLSchema"
        targetNamespace="http://www.altra.com/etm/businessObjects">
    &system_objects;
    <annotation>
        <documentation>
            This contains the definitions of the business objects used by ETM
        </documentation>
    </annotation>
    <!-- Point object and dependent objects -->
    <element name="PointData">
        <complexType>
            <sequence>
                <element name="pointHeader_Id" type="int"/>
                <element name="shortName" type="string"/>
                <element name="begDate" type="DateType"/>
        <element name="heatValue" type="float"/>
                <element ref="AliasData" maxOccurs="unbounded" minOccurs="0"/>
            </sequence>
            <attributeGroup ref="CommandAttribute"/>
        </complexType>
    </element>
    <element name="AliasData">
        <complexType>
            <sequence>
                element name="Alias_Id" type="int"/>
                <element name="shortName" type="string"/>
            </sequence>
            <attributeGroup ref="CommandAttribute"/>
        </complexType>
    </element>
</schema>
```

Structure Explained:

| | |
|---|---|
| <element name="PointData"> | Defines a PointData java class. |
| <element name="pointHeader_Id" type="int"/> | Defines a "pointHeader_ID" member variable of the PointData Class as type int. |
| <element name="shortName" type="string"/> | Defines a "shortName" member variable of the pointData Class as type String. |
| <element name="heatValue" type="float"/> | Defines a "heatValue" member variable of the PointData Class as type float. |
| <element name="begDate" type="DateType"/> | Defines a "begDate" member variable of the PointData Class as type java.util.Date |
| <element ref="AliasData" maxOccurs="unbounded" minOccurs="0"/> | Defines a collection of AliasData objects. MaxOccurs="unbounded" means that there is no maximum limit to how many AliasData objects can be in the collection. MinOccurs="0" means that the collection can be empty. |
| <element name="AliasData"> | Defines an AliasData java class. NOTE: Since the PointData class references the AliasData class, the definition of the AliasData class has to be in the same file as the PointData class. |

XML Bound Data Objects

XML-Bound Data Objects are used by an API whenever the calling process needs to send collections of data, or structures of data through the API's method parameters.

Process Methods for XML Bound Data Objects

API's that allow the calling process to do creates, updates, and removes through XML-Bound Objects have a single method, "process". The method uses a "getcmd" method on every item in the XML-Bound object to determine whether a Create, Update, or Remove action should be performed on that item. For example, in one embodiment, the process method can return an "int" value. On a create, the "int" value can be the ID Key of the first row created. On an update or remove, a zero value can be returned.

XML-Bound objects often either contain collections of other XML-Bound Object, or are collections of XML-Bound Objects. Collections are iterated through and each item in that collection is checked to see if it is marked for a Create, Update, or a Remove action. If the item is not marked for any of these actions, it is ignored.

It is possible that an XML-Bound object could contain a header item which is marked for no action, and one or more detail items that are marked for some action. In this case, the header item is ignored, and the detail items are processed. If the XML-Bound Object being processed is a related object, then the method would include "Process<Object>", where <Object> is the name of the business object that is being changed.

Create, Update, and Remove Methods.

APIs that are not using XML Bound Objects to perform creates, updates and removes utilize "create", "update", and "remove" methods. The "create", "update" and "remove" methods that manipulate a domain object can be named, "create", "update" and "remove". For example, PointAPI.createO can be used to create a new point. The "create", "update" and "remove" methods that manipulate a detail of the domain object can be named, "create<OBJECT>", "update<OBJECT>" and "remove<OBJECT>" where <OBJECT> is the name of the domain detail object. For example, PointAPI.createAlias( ) can be used to create a new alias for a point.

Lifespan Functionality

Some GUI's require lifespan functionality for certain business objects. These business objects are date-range objects that are considered to have lifespans. This means that the business object is not transactional and that it could not go in and out of existence.

The API for the related business object can include public methods that correspond to the following methods, for example:

| | |
|---|---|
| findLifespan | Returns the absolute begin and end dates for a date-range object. |
| updateLifespan | Changes the absolute begin and end dates for a date-range object. |
| findByDates | Returns all of the date-range records for a specific date-range object. |

The findLifespan and updateLifespan methods call the same methods on the related DL class. The DL Class inherits the findLifespan and updateLifespan methods from a BaseDateRageDL class. The findByDates method can be defined as follows:

```
public XmlRowSet findByDates ( Integer master_ID,
                java.util.Date begDate,
                java.util.Date endDate,
                String orderBy) throws RemoteException;
```

The findByDates method can be implemented, for example, by calling a findByVariableFilter method on a related "Entity" class.

Deletion by Date Range

Some API's may require the ability to remove the definition of a business object for a date range. These business objects are date-range object that are considered to not have lifespans. This means that the business object is transactional and that it could go in and out of existence.

The API for the related business object can include a public method, for example, that corresponds to the following: RemoveForDateRange. This API method can be configured to call the same method on the related DL class.

Validation Logic Vs. Business Logic

According to one embodiment of the present disclosure, validation logic is placed in the "Entity" EJB's (as opposed to the API EJB's) to enforce data integrity. This accomplishes two things. First, validations are processed if the calling process circumvents the API and calls the Entity EJB directly. Secondly, by having all of the validations in the "Entity" EJB's, all validations can be done and returned to the calling process as a package.

Business Logic that is not data integrity validation logic and involves more than one "Entity" EJB can be placed in the API EJB. For example, when a new language is created, the TranslationAPI.createLanguageDefinition method is called. Inside this method the following "Entity" EJB's are called:

I. TermEJB—Store the name and description of the language in the term table. Language names can be translated to other languages.

II. LanguageDefinitionEJB—Create a new Language Definition record. Use the Physical keys generated by the termEJB.create methods for the name and descriptions.

III. TermSetEJB—Create a Default Term Set, related to the new language.

Remove Methods that Require Cascading Deletes.

The API may get remove requests that require cascading deletes. Cascading deletes are handled inside the main "Entity" EJB's remove method. Deletes on dependant business objects are done through the corresponding "Entity" EJB's standard remove method. Accordingly, this assures that whatever validation logic is placed into the "Entity" EJB for removes gets called.

API EJB's Calling "Entity" EJB and DL Classes.

When an API class needs to do a create, update, or remove on a database table, then the API class calls the "create", "update" or "remove" method on the "entity" EJB class. The API class does not call the "entity" DL class directly, unless validation rules are to be circumvented.

When an API class requires custom SQL that cannot be handled by the existing "Entity" EJB classes "findByVariableFilter" method, then an API DL class is created and the custom find method is placed in the API DL class. The API DL class extends the com.altra.common.ejb.BaseDL class. The file is named <Domain Object>APIDL.java, where <Domain Object> is the same name used in the name of the API bean. The API class should instantiate the DL class through the "DLClassFactory" class for the package.

In one embodiment, an API class can be configured to directly call another DL class' find methods. Accordingly, an API class is able to call another DL class directly for invoking a find method.

Domain Objects and Domain-Object Details

As used herein, a domain object describes a single person, place, thing, or concept. The domain object contains sufficient detail information with it to have meaning on it's own, without the necessary association with other domain objects. A Domain Object keeps a consistent identity, regardless of the changes to it's associated detail information. Domain objects may also be referred to as Business objects.

A Domain Object Detail is a piece of information, or attribute, that is needed to flesh out the details of the domain object. A Domain Object Detail is ambiguous on it's own, unless associated with a domain object. Domain Object Detail information can have date-ranges associated with it, that give a Domain Object different attributes on different dates.

In one embodiment, a Domain Object Detail comprises a small number of attributes, and is tightly bound to a single Domain Object. If a Domain Object Detail has a significant number of attributes and can be related to more than one domain object, then the Domain Object Detail is considered as a separate Domain Object.

An example of an object that has both Domain and detail characteristics includes a Point. A Point might be considered to be a detail of a Facility. Because it can also be thought of as a detail of Contracts and Nominations and Deals, Point is treated as an independent Domain Object, with relationships to Facilities, Contracts, Nominations, and Deals.

An illustrative example of a straight forward Domain Object/Detail determination will now be briefly discussed. If you had objects comprising: a facility, a termination date, a point, a longitude, a latitude, a contract, a nomination, a point of view, and a quantity, then which would be a Domain Object, and which would be a Domain Object detail? Determining which are the domain objects can be established by whether the object can be "Pictured" or conceptualized without any association to another domain object. Determining which are the Domain Object Details can be established by whether the object seems more like the attribute of a domain object, and whether the object doesn't make sense unless associated with a domain object.

A facility will have significant detail information associated with it and only it. It can be conceptualized as an object based on information that is only associated with it. A contract, point and nomination can also be described as domain objects under this same criteria.

A termination date, point of view, latitude, longitude, or quantity have ambiguous meanings unless associated with some domain object. This makes the several items more like attributes than Domain objects, and therefore should be considered Domain Object Details.

An illustrative example of an ambiguous Domain Object/Detail determination is an Address. Is it a Domain Object or a Domain Object Detail? An address can have significant detail information associated with it. It can have street name, street number, city, state, and zip code information associated with it. It can be conceptualized as uniquely identifying a certain spot in the world. It can also be thought of as being ambiguous until associated with a person, place, or thing. It is certainly a necessary attribute of many possible domain objects (House, Restaurant, Hospital, etc.).

Accordingly, the thing that will make an address a domain object, or a domain object detail is the requirements of the product. The necessary relationships of an "address" to different domain objects could cause this object to be treated as a Domain Object, or Domain Object Detail.

An address can be treated as a domain object if more than one domain object would be allowed to have an associated address. A single repository or set of tables can be used for all addresses, with foreign keys to relate the addresses to one or more types of domain objects (such as Domain Parties and Facilities). In addition, more than one domain object can be made to share the same address object, however, this would make a change to the address object effect all related domain objects.

An address could be also be treated as a domain object detail, if addresses are restricted to a single domain object. If only Domain Parties can have addresses, then it might make sense to think of addresses as a detail of the Domain Party object. Even in this case, an address has a rich enough set of detail information associated with it alone to be considered a Domain Object.

Dynamic Labeling

Dynamic labeling allows the user to modify form titles, form labels, system messages, and certain system code data fields. This option is required for both multiple language support as well as for different ways to refer to the same object in the same language. For example, this function can be used if a label is displayed in English and the user wishes for that label be displayed in French. Another example of the use of this function will be if one English user wishes to see the point where gas enters a pipeline referred to as "Receipt Point", and another wants to call it "Delivery Point", while a third wants to call it "Entry Point."

Note that for each user, the entire system will be displayed in one selected language. In other words, all screens will be displayed in the selected language. The Deal Making screen cannot be in English while the Allocations screen is in French for the same user.

Generation of, and maintenance of, dynamic labeling facilities involves considerable effort. In addition to providing the functionality to make this function, additional tools are provided to reduce the effort required for the user to generate and maintain these additional languages. Requirements for this function include the following:

Allow for Dynamic Modification of Form Titles—Each form has a title at the top that is used to identify it, such as "Maintain Nominations." The system provides the ability to have these titles translated into multiple languages.

Dynamic/Translation Form Title Information
Form ID
Form Description
Title Value
Display Field Length
Language ID
Default Allow for Dynamic Modification of all Form Labels—Throughout a form, text strings and text blocks are used to provide descriptions, identify data fields, indicate instructions, etc. The system provides the ability to have these strings and blocks translated into multiple languages.

Dynamic/Translation Form Label Information
Label ID
Label Description
Label Value
Display Field Length
Language ID
Default Allow for Dynamic Modification of all System Messages—At various times, the system generates messages to the user, usually in the form of a pop-up window. These messages can be informative (i.e. "2 Nominations Added—OK"), warnings (i.e. "Nomination Point will be deleted—OK—Cancel"), system errors (i.e. "Statement i.d. was not set. Invoice cannot be generated—OK"), or foundation software messages (i.e. "Column name 'Date' not found in table 'PriceIndex'—OK"). All messages that are generated from within system code are configured to have the ability to be translated into multiple languages. Any foundation software system messages over which there is control may also be translated, as necessary.

Dynamic/Translation System Messages Information
System Messages ID
System Messages Description
System Messages Value
Display Field Length
Language ID
Default Allow for Dynamic Modification of System Code Data Fields—The data options for entry fields sometimes come from entries in a code table (see RD-SYS-Objects and Codes-.doc). The system architecture is further configured with a facility to provide for translation of these fields into multiple languages.

Allow for Dynamic Modification of System Reports—All reports that are included with the system are configured to provide for dynamic labeling of all text fields and system code fields.

Dynamic/Translation Form Label Information
Label ID
Label Description
Label Value
Language ID
Display Field Length
Default Provide for Dynamic Field Width—The translation of words or phrases into different languages can result in a significant variation in the size of the resulting text. It is necessary to allow for this variation, and assure that reasonable modifications in displays and reports are automatically generated to accommodate this variation in text length while preserving functionality and general appearance.

Provide a Description Field for Each String—It is necessary to provide descriptive text for each string. These descriptions need only be provided once for each string, not necessarily once for each translation of the string. An important use for this feature occurs when the same English string may be used in two or more different contexts in different places within the system. The other language may need to provide different translations for the different contexts. In these cases, two dictionary entries for the same, base English string must exist. Therefore the description field can be used to differentiate the different contexts of the otherwise-identical strings.

Allow for Language Variations—Within a single language, variations in spelling and even words can and do exist. Examples of this include receipt/delivery points, delivery/redelivery points, and entry/exit points. These are all English, but different locations and facilities use different labels. The system is configured to provide for these variations.

Provide Special Tools for Generating Language Variations—A language variation is different from a new language in the fact that, for a variation, the vast majority of text strings are identical. A special methodology for generating these variations is provided. One method is to generate table entries of only the variations. Another method involves the "copying" of one language to the variation, and then modifying the entries that are different, the method being configured for assuring that the unmodified fields remain synchronized.

Provide Facility for Selecting a Language for Each User—Language will be selected by each individual user, not established for all users of a database. This allows a company that has users in multiple countries, who speak different languages, to provide each user with a system in their preferred language. The system allows changing the language to which each user is assigned. In one embodiment, a user can select his own language without having to rely on the system administrator to select it for him or her.

Provide Facility for Allowing a User to Override his Translation for Individual Items—On certain occasions, a specific user may want to see a different translation of a specific text string. The system is configured to provide ability for individual users to override the presentation of a string.

Provide Identification Facility for Forms, Reports, Fields, and Messages—When all of the text fields are translated into a different language, it may be difficult to identify which item a user is referring to when he or she calls customer service with a question or problem. Accordingly, numbers, codes, or other suitable means are employed to provide positive identification of the items to which the caller is referring.

Provide Facility for Generating a New Language—Generating a new language for all screens, reports, messages, etc. is, at best, an extremely difficult and time-consuming task. The system includes a tool provided to help facilitate this onerous task.

One way to do this is to provide a display with the base system string on one side and a slot for entering the new string on the other. At the other extreme, a more sophisticated implementation could display the screen or report that contains the string, highlight the string to be translated, and provide a slot to enter the translated string.

Whatever method is used, the system is configured to bypass strings that the user does not need to translate. For example, if the translation is intended only for a pipeline, there is no need to translate strings that only occur in items dealing with purchase or sales deals.

Provide Facility for Maintaining Each Language—After the new language is generated, the system is further configured to allow the user to maintain their new language. This may involve situations where the user just wants to change a translation or when additional items must be added.

Provide Facility to Assist with New System Releases—When a new system release occurs, data strings may be added or deleted from the dictionary. A user with other languages or variations in their dictionary will have to update their dictionaries for the new release. The system is further configured to provide such a facility.

Provide Facility for Using Different Language Variations for Different Occurrences of a Form—On some occasions it may be desirable to use different language variations on different occurrences of the same form. One example may be that different pipelines might be using different terms for the same thing (such as the receipt/delivery point example stated previously). Another example could be a scheduler who may want to see the labels displayed differently for certain pipelines, even though they are using the same language. Another example could be the desire to show gas acquisition on a large pipeline as a "deal", and gas acquisitions on an owned gathering system as a "purchase."

Provide a Single English Language Set of Strings—According to one embodiment, the system includes a single dictionary of American English versions of the strings.

Allow Users to Define Additional Strings in Their Own Language—Users are encouraged to, and will, develop their own custom applications to work with the system software and database. In most cases they will likely hard-code the text strings in their normal language. But in some cases they may wish to have users in different countries see these screens in different languages. Accordingly, the system is configured to provide them the ability to use the multi-language facility of the system. This involves giving them the ability to enter their own entries in the tables, with some ability to differentiate their entries from base system entries so database updates will not interfere with user-defined strings.

Provide a Facility to Search The Dictionary for Existing Strings—If a new string is to be entered by either the system manufacturer or a user, the system provides a tool to allow them to determine if the string already exists in the dictionary.

Provide a Facility to Search Dictionary for Duplicate Strings—As strings are entered and edited, it may be possible that duplicate strings (not involving different contexts) may find their way into the database. Accordingly, the system is configured to identify duplicate strings so that they can be eliminated.

Identify Strings Which Are Part of the Base System—The system includes a suitable routine necessary to differentiate between strings that are part of the base system from strings that have been entered by the user.

Provide a Facility to Search For Missing Strings in a Language—While it is not always necessary to translate every string into your new language, there will be situations where it will be desirable to identify strings that do not contain a translation into a specific language. For example, if some strings on screens or reports are not printing, it will be necessary to scan the dictionary to determine which strings are minus their translation. Accordingly, the system is configured to provide a facility to identify untranslated strings.

Provide a Facility to Assure that Source Code Can Be Connected to Specific Character Strings—With every text string on every screen, pop-up, and report being assigned to a database table instead of included in the source code, it can be very difficult to navigate through the code to find where a specific data item is being generated. One way around this is to assure that copious comments are used to identify the data fields with the text strings. However, even this method could be problematic in cases where the display strings are changed in the database. Accordingly, the system is configured to provide a facility that automatically generates comments in the code with the text representation of each field that is generated from the dictionary.

Maintain a cross-reference of where each dictionary entry is being used—Keeping the database dictionary entries clean and up-to-date can be difficult. Accordingly, the system provides a suitable tool generated to assist with this task.

One tool for achieving this could be the generation of a cross-reference showing where each dictionary entry is used. For example, suppose a programmer replaces a string on a screen with a different one, or if he deletes a string or even an entire form. A decision has to be made whether the deleted string should be removed from the dictionary, or whether it must be retained because it is being used elsewhere. In another case, if a string is changed on one screen it may be desirable to also change it on certain other screens but not all other screens. Having a cross- reference available can help make these decisions and can also do a great job of keeping the dictionary clean.

Maintain Language Information by ASP Customer—The application is configured to be able to know one customer from another from both a deployable and hosted perspective. A customer will have a default language—a user may also have a different default language. This information will be used to determine which language to display the application if no user profile has been set up for the user currently logged into the application.

Language Maintenance Information
Language ID
Language Name
ASP Customer ID

In one embodiment, the System does not support the translation of user-entered data from one language to another except for a few exception system value codes such as "Receipt"/"Delivery", "Entry"/"Exit", "Yes"/"No", etc. In one embodiment, the default language for the system is English and the users can create/maintain any other language desired.

ASP Implementation

According to one embodiment, multiple ASP Customers can exist in the same database of the system architecture of the present disclosure. Accordingly, the system architecture further includes an ASP function to support a number of ASP Customers within a single database. Security is provided to prevent one ASP customer from being able to see any data from another ASP customer, even if they are using the same database.

According to one embodiment, database tables are created to include an attribute to designate an ASP Customer ("ASPCustomer"). The ASP implementation of the system architecture of the present disclosure can be accomplished, for example, using a database server, such as commercially available from Oracle. By having an "ASPCustomer" attribute in every table, the system takes advantage of a security feature on the database server that allows the system architecture to automatically limit every userid to only access table rows that are assigned to the "System" or to that user's company. In this way, no special coding is required for the "ASPCustomer" fields—and none can be accidentally overlooked. Also, it will function regardless of the method the user uses to access the database. While the "ASPCustomer" attribute will not be functional for a SQL Server, having this field in the SQL Server tables will allows consistent table structures for both DBMSs.

All system-supplied data is labeled with a standard "ASPCustomer" code of 0. All user-supplied data is labeled with a non-zero code assigned to that ASP Customer. Accordingly, using a database security feature, each user can access rows that contain an "ASPCustomer" of either zero or their respective assigned code.

Any new items added by an ASP customer to a list of system-supplied data is stored with their "ASPCustomer" code, and the security will simply retrieve both system and user data as a cohesive set. If an ASP Customer needs to change certain system data, then that data can be converted into customer data for that particular customer or all ASP customers using the particular database.

For Language-TermSet data, all ASP Customers will have access to any base language in the database. Each TermSet, however, is maintained and accessed only by a single ASP Customer. This can be accomplished by loading all Language-Base TermSet data with an "ASPCustomer" code of zero. Other TermSets will have the "ASPCustomer" code of the user adding the respective TermSet. Accordingly, this allows the ASP host, or an agent of the ASP host, to maintain base language sets for an installation, and allow any user to access them. At the same time, individual ASP Customers can create their own modified (non-Base) TermSets for their own use without affecting other users.

Language Translation

In one embodiment, the system architecture includes language translation. A function of the language translation is to translate labels and grid headers which appear in user interfaces from a first language to a second language.

Functions of the language translation may be handled at both the presentation layer and the business layer. In such a configuration, the presentation layer is configured to perform functions related to translating labels or header column names in the hyper text markup language ("HTML") information generated by the system architecture. On the other hand, the business layer is configured to perform functions related to translating standard system messages generated by the system architecture.

Application Level Dictionary

To facilitate the functions related to language translation, the language translation may be configured to include a dictionary. In one embodiment, the dictionary may be stored within a web server application variable. In addition, the dictionary may be implemented as a hash table.

EJB Dictionary Generator

In order to generate the hash table and load the web server application variable for the dictionary, an Enterprise Java Bean ("EJB") may be used. An example embodiment of the logic configured to load the hash table is shown below:

From each row of a language translation table, generate a key and an element. The key will be of type String, made up of:

ItemID <Tab> LanguageID <Tab> Term Set ID

The element will be the contents of the translation column.

In the example shown above, when the dictionary is either created or refreshed, it will be completely recreated and loaded from the language translation table. The entire content of the language transaction table will be loaded. The dictionary may be initialized with the number of rows from the language translation table, because that will allow allocation of memory resources to be more efficient.

Live Dictionary Refreshes

Language translation may be configured to allow refreshes to be done manually through an "apply" is button in a "language translation setup" window. The "apply" button signals an EJB to create a new language translation dictionary, to replace the current dictionary stored in the web server application variable. Because dictionary is configured to be thread-safe, the replacement of the current dictionary with a newly created dictionary may occur dynamically. For example, EJB may create a new dictionary concurrently while the current dictionary continues to handle translations.

However, the process of modifying the web server application variable to store the new dictionary must be synchronized. The synchronization may be performed using an application lock. An example of embodiment of this process is shown below:

```
<%
    dictionaryEJB.generateDictionary ( ); /, /* create the hash table */
    Application.Lock ( );
    Application ("Dictionary") = dictionaryEJB.dictionary ( );
    /* Hand over the reference to the new hash table dictionary */
    Application.Unlock ( );
%>
```

The process shown above is extremely fast, and users will not notice a delay in the processing time.

Translation Information in Session Variables

Login process is configured to assign two session variables to users. The session variables are configured to provide information specific to each user in language translation. The session variables are configured to represent the language and the term set that a specific user prefers. The language and the term set may be selected from the userLanguageProfile table, based on the userID for the user. Login process is configured to set the languageID to 1 and the termSetID to 0 If the language and the term set are not found for the userID in the userLanguageProfile table. An example embodiment of the session variables is shown below:

```
int termSetID    Uniquely defines the term set used to do translation
int languageID   Uniquely defines the language used to do translation
```

Language Translation Servlet

The system architecture includes a language translation servlet. The servlet is configured to perform the function of language translation. In order to perform the translation function, the servlet is configured to access the dictionary stored in the web server application variable.

According to the embodiment of the present disclosure, the servlet will be passed parameter to facilitate the translation function. For example, following parameters may be passed to the servlet:

From HT page:
int itemID
From the Session Variable:
int languageID
int termSetID ItemID uniquely defines a label, header, or a message to be translated. As discussed earlier, the is dictionary is implemented as a hash table. To facilitate the translation function, a combined key of itemID, languageID, and termSetID are sent to the hash table. When a term is looked up from the hash table, following process occurs:

First, a lookup of the key will be performed for the following combination:

ItemID    languageID    termSetID

If the key fails to find a match with the above combination, then a second lookup will be performed with termSetID set to 0 as shown below:

ItemID    languageID    0

If the key fails to find a match once again, another lookup will be performed with default language of English as represented by setting languageID to 1:

ItemID    1    0

If the key fails to find a match for the final time, then itemID will be returned as a string. This indicates to users that there was a problem with -continued the language translation. The problem may be that either the itemID value is not defined or the hash table was not stored correctly.

Price Structure

In one embodiment, the system architecture includes price structures adapted to handle all types of pricing and valuation occurring within the system architecture. The objective of price structures is to provide a single mechanism for capturing all possible prices within the system architecture, thereby allowing all prices and valuations to be resolved using common routines.

Complexities of price structures are masked from users by graphic user interfaces, reducing the amount of data entry and the amount of information communicated to users. In addition, price structures are configured to allow users (such as data administrators) and application programming interface ("API") to add, edit, and delete a price structure.

A function of price structures is to provide an association mechanism. Another function of price structures is to provide flexibility in defining quantities, prices and how they relate to each other. Price structures are further configured to provide the system architecture with sufficient information to calculate prices and valuations.

With respect to the association mechanism, price structures are configured to allow users to either associate a price structure directly with the object to which it will be applied, or associate it with an object that is at a higher level than the object for which the price structure information is being entered. The association mechanism reduces the amount of user data entry required, and is especially advantageous in business scenarios where one price structure applies to multiple items.

With respect to providing flexibility in defining quantities and prices, the flexibility is achieved by price structures' including quantity formulas, price formulas, patterns, and multiple tiers of the same.

In more detail, the quantity formulas may be configured to facilitate derivation of total billable quantity for a price structure. Quantity formulas may be previously defined and preloaded in the system architecture or configured for user definition. Quantity formulas may also be configured to allow users and API's to add, edit, and delete a quantity formula.

Price formulas may be configured to reference indexes, other formulas, and fixed prices. Price formulas may also be configured to perform operations including addition, subtraction, multiplication, and division, and functions including minimum (Min), maximum (Max), and average (Avg). Price formulas may be further configured to allow users and API's to add a price formula, edit a price formula, edit a search criteria, and delete a price formula.

Patterns provide additional definition for price structures, thereby allowing prices to be defined for specific blocks of time within a price structure's effective date range. Patterns provide a more efficient method of capturing time specific information than manually entering the date range for a price structure.

In another embodiment, price structures also include price components. Price components may be configured to provide distinctive names for identifying charges associated with objects in the system architecture. Price components may include information which determine where within a price structure a price component may be used. Price components may also include information which determine how charges will appear on statements, and what processes will consider the charges for a specified price component. Price components may also be configured to allow users and API's to add, edit and delete a price component.

In yet another embodiment, price structures further include price indexes. Price indexes may be configured to maintain information used in price structures. Price indexes may also be configured to allow users and API's to add, edit, and delete a price index. Price indexes may be associated with index prices, which may also be configured to allow users and API's to add, edit, and delete an index price.

Information included by price structures, quantity formulas, price formulas, indexes, and index prices may be placed under these four categories: "attribute names", "required", "data rules", and "default value". For each entry under "attribute name", "required" field indicates whether the data for that entry is required. "Data rules" indicate the rules which apply to the entry, and "default value" indicates the default value for the entry. FIG. 40 is a table describing information included by price indexes. Although entries included by other modules (price component, price formula, etc. . . . ), may differ for each of the categories ("attribute name", "required", etc . . . ), FIG. 40 is representative of the type of information included in the various modules. Other modules may be associated with one or more tables describing information included by each of the modules. As discussed above, all modules are configured to allow users and API's to at least add, edit, and delete objects for each module. These operations modify information as described by various tables associated with each of the modules.

Plug-In Functionality

The following terminology is used with reference to plug-in functionality according to the embodiments of the present disclosure.

A Plug-In generally refers to a component that can override base functionality. The plug-in implements a specific interface, and will be called on by a specific event. An Interface generally refers to a definition that dictates the format of a component's inputs and outputs. The interface is an agreement between a calling process and a component that the component will support certain inputs and outputs. The interface does not restrict the internal activities inside a component. An event generally refers to an activity that the system guarantees can be intercepted by a Plug-In component. The plug-in component that will be picked to intercept and process the event will be determined by the best-fit rules associated with the event. Best-fit rules refer to the criteria that is used to determine which Plug-In will be used to process an event. The criteria are established at design time, along with the interface definition.

As an example, consider a business need to allow different methods of rounding to be plugged in, depending on what rounding method an ASP Customer prefers Because different ASP customers running on the same system may require different rounding methods, the correct rounding method must be decided by the ASP Customer that is doing the rounding. There is no need for rounding methods to be different for different processes for the same ASP Customer.

Accordingly, the best fit rules for rounding are determined by the ASP Customer who the rounding is being done for, and no other criteria.

The Interface for rounding includes:

| | |
|---|---|
| Method: | round |
| Inputs: | Value - amount to round |
| | Precision - Decimal place to round to |
| Outputs: | RoundedValue - amount that has been rounded. |

Any Plug-In component that provides the "round" method with the previously described inputs and outputs can perform rounding.

In order for plug-ins to work, the following things must happen: the interface for the plug-in must be defined; the data required to resolve the Best Fit rules must be defined, and the system must be written so that whenever an event (such as rounding) occurs, that: a) the system has available in memory the data required to resolve the correct Plug-In according to the Best Fit rules and in the case of rounding, it must have access to the ASP Customer ID associated with the data being rounded; and b) the system must find the correct plug-in according to best fit logic. The plug-in must implement the expected interface. Lastly, the system must call the plug-in and get a successful result back.

In another example, there may be a business need to be able to customize certain areas of functionality in the system architecture without affecting the base product. This need for customization falls into several categories that have different technical requirements and complexities. A list of four different architectural approaches to providing plug-in functionality is provided below.

Implementing Plug-In Functionality that Needs to be Over-ridable at a Product Level.

If there is a need to override base functionality at a Product or system level, then this can be done through the switching out of Enterprise Java Beans within the EBJ Server environment. A change done using this technique requires no database tables or special logic. When this change is done to a local installation, it would be across the entire system, regardless of ASP customers. While overriding a base functionality can be accomplished through a switchout of an EJB, it would be technically feasible to replace a component, and then get that component to broker out work to other components based on ASP customer information or other information available to that component.

Implementing Plug-In Functionality that Should be Overridable at an ASP Customer Level.

A coding technique called "Factory Classes" is used to provide plug-in functionality at an ASP customer level. This requires the hard coding of the ASP Customer number inside the factory class for specific ASP customers that require a custom plug-in, instead of a default plug-in. Several plug-in components that have been created using this coding technique, include prorating, rounding, and rounding resolution. Rounding resolution resolves rounding errors that occur as a result of prorating.

Implementing Plug-In Functionality that Should be Overridable According to Best-Fit Pattern Logic.

If Plug-in functionality requires best-fit logic beyond the ASP Customer ID, then it will be necessary to store information about the plug-in to a set of database tables. The database tables should hold: the name of the plug-in; associated best-fit information (This information will be used to determine when the plug-in should be used); a reference to the standard best-fit logic tables; and an association to the event that the plug-in should be associated with.

In this instance, the implementation of the plug-in functionality can take into account information about existing System-Defined events, such as: the interface that a plug-in must implement to be used by the event; the data required to resolve the best-fit logic pattern; and the functionality of the default plug-in that will be called if no other plug-ins are provided, or if best-fit rules find no overriding plug-in.

Implementing Plug-In that can be Added Through Messaging.

One advantage of using a messaging layer is to be able to tie functionality into events associated with calls to the enterprise java bean methods. These will include the creation, updating, and removal of data. This can also include methods that kick off business processes, such as generating a Nomination Plan, or an Allocations process.

Deal Information

In connection with Deal Information, a module configured according to a Describe Deal Use Case Specification (UCS) allows a Marketer's Dispatcher, Gas Scheduler or Gas Controller (collectively referred to as "User") to maintain Deal Reference (Reference Information).

"Reference Information" refers to Upstream/Downstream information (i.e. Contract, Quantity, and Ranks) associated to the Deal Location/Point. The reference information is primarily used for Confirmation purposes with the Facility/Pipelines. The required and optional Upstream/Downstream information will vary by Facility and is always associated to a Deal Location that is a point. Regardless of what is required, the User must be able to access a user interface and maintain this information from different places within the system.

The Reference Information is sometimes gathered by the User, may be provided to the User by the Trader, obtained from an external third party(ies) or a combination thereof.

Given that different Facilities require different Reference Information (which in turn drives what the User is required to provide to the Facility as part of an EDI Nomination), the Describe Deal UCS is a prime candidate for a "Configuration Manager". That would allow Users the capability to designate by Facility the required and optional attributes.

The Describe Deal use case starts when the User wishes to add, edit and/or delete Reference Information in the system.

1. The User specifies the function to perform (either Add, Edit, or Delete Reference Information).
2. The User enters or selects the Reference Information. The system retrieves and displays the applicable Reference information, if any.
3. Once the User provides the requested information, one of the following sub-flows is executed.
    If the User selected "Add Reference Information" or "Edit Reference Information", an Edit Reference Information sub-flow is executed.
    If the User selected "Delete Reference Information", a Delete Reference Information sub-flow is executed.
4. Once the User provides the Reference Information needed, the User selects "Save".
5. The system validates the Reference Information per a Reference Information Attribute Table.
6. A Business Rules Validation alternative flow is executed.
7. The system saves the new or modified Reference Information.
8. The use case ends.

With respect to editing reference information the User makes the desired changes or additions to Reference Information. This includes any of the Reference Information specified in the Reference Information Attribute Table; illustrated below.

| Reference Information Attribute Table | Description - Data elements that comprise Reference Information for a Nomination Plan. | | |
|---|---|---|---|
| Attribute Names | Required | Data Rules | Default Value |
| Deal Location (Point) | Y | Single Valid Value. | This is determined by the Deal Location that the Reference Information is being associated to. |

-continued

| Reference Information Attribute Table | Description - Data elements that comprise Reference Information for a Nomination Plan. | | |
|---|---|---|---|
| Attribute Names | Required | Data Rules | Default Value |
| Upstream Contract | N | Should be alphanumeric. | |
| Downstream Contract | N | Should be alphanumeric. | |
| Quantity | Y | Float | 0 |
| Default Rank | N | 0-999 | From Physical Deal associated to Deal Location |
| Unit of Measure | N | Must be the same as Deal Location Quantity | From Deal Quantity associated to Deal Location |
| Granularity | N | Must be the same as Deal Location Quantity | From Deal Quantity associated to Deal Location |
| Begin Date | Y | Date Range Rules | From Deal Quantity associated to Deal Location |
| End Date | Y | Date Range Rules | From Deal Quantity associated to Deal Location |

With respect to deleting reference information, the following steps occur:
1. The system prompts the user to confirm deletion of the Reference Information.
2. The user verifies the deletion.
3. A Delete Rules Validation alternative flow is executed.
4. The system deletes the Reference Information from the system.
5. The use case ends.

If the use case was successful, the Reference Information is added, edited or deleted from the system.

Describe Deal Quantity

A Describe Deal Quantity use case allows a Trader, Deal Administrator, Gas Scheduler or API Interface (collectively referred to as "User") to maintain Deal Quantities. Describe Deal Quantity can be as simple as entering a quantity or a more complex process of identifying ranges, tolerances, patterns, temperatures, percentages, multiple quantity types, etc. Deal Quantities may be defined and associated to Deal Components, Deal Component Points and Deal Component Path. The Describe Deal Quantity use case will always be invoked by another use case or via an API.

A precondition to the Describe Deal Quantity use case is that the User has identified the Object Type and specific Object (Deal Component, Deal Component Point or Deal Component Path) for which they intend to manage Deal Quantities. In addition, the user has identified the quantity information to be entered. This information is expected to be available via User Profiles and Configuration Parameters. The quantity information can include, but is not limited to, the following:
  a) what classification of quantities are being entered— (e.g., Volume, Energy, Heating Value);
  b) the default Units of Measure to use with each quantity classification;
  c) the Pressure Base information for which quantities are being recorded; and
  d) quantity Type to use as a default (i.e., Deal Max Daily Quantity).

A basic flow of the Describe Deal Quantity use case includes:
1. User enters the desired Deal Quantity;
2. The system will determine the required default attributes required for Deal Quantity;
3. System validates the Deal Quantity information per the attribute tables; and
4. The use case ends. The Deal Quantity is not saved until the user selects save in the use case invoking this use case.

If the use case was successful, then the Entered Deal Quantity is added, edited or deleted from the system; the Calculated Deal Quantity is added, edited, or deleted from the system (the Calculated Quantity will be used in downstream processing. ); message is sent to the Charge Calculation queue; and message is sent to the initiating use case indicating that the Deal Quantity was successfully added, updated or deleted. If the Deal Quantity was updated, the message should specify what changed.

If the system successfully attached a Deal Quantity to a given object a "Change" message will be sent to a manage deal use case.

An advanced edit deal quantity use case starts when the user wants to enter more than a simple quantity. The flow includes:
1. User selects Deal Quantity to manage.
2. System requests that the User specify the function to perform (Add, Edit or Delete a Deal Quantity).
3. User provides requested information, and one of the following sub-flows is executed:
   3.1. If User selects "Add a Deal Quantity" or "Edit a Deal Quantity", the Edit a Deal Quantity sub-flow is executed;
   3.2 If User selects "Delete a Deal Quantity", the Delete a Deal Quantity sub-flow is executed.
4. User selects "Save".
5. System validates the Deal Quantity information per attribute tables.
6. A Business Rules Validation alternative flow is executed.
7. System saves the new or modified Deal Quantity information.
8. The use case ends.

To edit a Deal Quantity the user makes the desired changes or additions to the Deal Quantity information.

| Deal Quantity Attribute Table | The information in this attribute table will be the attributes that the user will be able to view and edit when in advanced edit mode. | | |
|---|---|---|---|
| Attribute Names | Required | Data Rules | Default Value |
| Begin Date | Y | | From associated object |
| End Date | Y | | From associated object |
| Quantity Type | Y | Valid Value Multiples are allowed Ex. MDQ, MHQ, MMQ | From User Profile |
| Volume Unit | N | Single Valid Value Ex. Mcf, | From User Profile |
| Energy Unit | N | Single Valid Value Ex. Dth, | From User Profile |
| Heating Value Unit | N | Single Valid Value Ex. Dth/Mcf | From User Profile |

-continued

| | | | |
|---|---|---|---|
| Pressure Unit | N | Single Valid Value Ex. PSI | From User Profile |
| Flow Rate | Y | Single Valid Value Ex.Monthly, Daily, Hourly | From Minimum Granularity of object being associated. Ex. Deal, Deal Component, Deal Point |
| Minimum Granularity (Per Time Period) | Y | Single Valid Value Examples are Monthly, Daily, Hourly, etc. | From Minimum Granularity of object being associated. Ex. Deal Component or Deal Point. If object is "Deal" the minimum granularity will have to default from the User Profile since Deals do not have Minimum granularity. |
| Pattern | Y | Single Valid Value | From User Profile |
| Pattern Detail | Y | Valid Value Multiples are allowed | From User Profile |
| Volume Quantity | N | Number | |
| Energy Quantity | N | Number | |
| Heating Value | N | Number | |
| Pressure Base | N | Number | |
| Pressure Saturation | N | Single Valid Value | |
| Minimum Temperature | N | Number | |
| Maximum Temperature | N | Number | |
| Temperature Unit | N | Single Valid Value | from User Profile |
| Load Factor Type | N | Valid Values of "MIN" or "MAX" | |
| Load Factor Flow Rate | N | Single Valid Value | |
| Load Factor Percent | N | Positive number | |

To delete a Deal Quantity, the system prompts the user to confirm deletion of the Deal Quantity; the user verifies the deletion; Delete Rules Validation alternative flow is executed; the system deletes the Deal Quantity from the system (Display UCS Message #2); and the use case ends.

To cancel a Delete, if during user verification of the Delete a Deal Quantity sub-flow, the User decides not to delete the Deal Quantity, the delete is canceled; and the use case ends.

If a User requests to save a Deal Quantity in the Advanced Edit Deal Quantity then the rules in the Deal Quantity Business Rules Table are validated. If no violations are found, the validation process returns to the Advanced Edit Deal Quantity process. (If there are any violations to the rules, the system displays an error message specifying the violation and offering the User the choice to fix the data or to cancel the add or edit); and Use case ends. The Deal Quantity Business Rules Table is given below:

Deal Quantity Business Rules Table

| Business Rule | Values | Action |
|---|---|---|
| There must be a corresponding Entered Quantity for every Pattern Detail defined for the specified Pattern. | Pattern | Display UCS Message #3 |
| At least one Quantity must be provided | Volume Quantity vs. Energy Quantity vs. Heating Value | Display UCS Message #4 |

-continued

Deal Quantity Business Rules Table

| Business Rule | Values | Action |
|---|---|---|
| Minimum Temperature must be less than Maximum Temperature | Minimum Temperature vs. Maximum Temperature | Display UCS Message #5 |
| Default information required | Quantity Type | Display UCS Message #6 |
| Default information required | Unit(s) | Display UCS Message #6 |
| Default information required | Flow Rate | Display UCS Message #6 |
| Default information required | Minimum Granularity | Display UCS Message #6 |
| Default information required | Pattern | Display UCS Message #6 |
| Default information required | Pattern Detail | Display UCS Message #6 |
| Granularity validation - Deal Quantity validated against deal location if it is associated with a deal location, or validated against deal component if it is associated with a deal component. Granularity cannot be changed to a lower granularity than the associated object | Minimum Granularity | Display UCS Message #7 |
| Pattern Detail Granularity must be the same as the Minimum Granularity | Pattern Detail | Display UCS Message #8 |
| For each Entered Quantity there must be a Unit of Measure | Volume Quantity/ Volume Unit Energy Quantity/ Energy Unit Heating Value/ Heating Value Unit Pressure Base/ Pressure Unit | Display UCS Message #9 |
| For each Unit of Measure there must be a Quantity | Volume Unit/ Volume Quantity Energy Unit/ Energy Quantity Heating Value Unit/ Heating Value Pressure Unit/ Pressure Base | Display UCS Message #10 |

To assist with an understanding of various terms, the following definitions are provided, however, the meaning is not intended to be limited thereby. Other additional meaning may apply.

Quantity Type—some system, and some user-defined code values that describe the type of quantity that can be added to a Deal Component, Deal Point or Deal Path.

Quantity Unit—Coupled with Flow Rate, describes the rate of flow of energy for a deal, nomination, etc. Example is 100 Dth per Day, where Dth is the Quantity Unit.

Flow Rate—Coupled with Quantity Unit, describes the rate of flow of energy for a deal, nomination, etc. Example is 100 Dth per Day, where Day is the Flow Rate.

Minimum Granularity—An indicator of the frequency for which the quantity may change during the period. Will often be equal to Flow Rate.

Pattern—An identifier of the pattern of flow of energy commodity within the date range of the object. This could mean the energy commodity flows only on certain days of the week, or certain hours of the day, defined by the Pattern Details.

Pattern Detail—The details of the Pattern that indicate which weekdays and which hours of the day that the energy commodity is to flow.

Minimum Temperature—For temperature tiers (often called weather options), this defines the minimum contractual temperature for the band of temperatures applicable for a quantity.

Maximum Temperature—For temperature tiers (often called weather options), this defines the maximum contractual temperature for the band of temperatures applicable for a quantity.

Temperature Unit—For temperature tiers (often called weather options), this defines the units of measurement for temperature for contractual parameters specifying the band of temperatures.

Load Factor Type—Indicates whether the Load Factor percentage is a minimum ("MIN") or a maximum ("MAX") under the contract.

Load Factor Percent—If minimum, describes the minimum percentage of the Maximum Quantity that must be transacted under the contract, if maximum, describes the maximum percentage of the Maximum Quantity that must be transacted under the contract.

FIG. 41 illustrates a number of examples of deal quantities produced using the Deals Quantity Use case. The quantity type EXP ("Expected") identifies a particular quantity for position/risk management, where the contractual Min and Max differ. In addition, "RTC" indicates Round The Clock to denote all hours and all days.

Various functions of the system architecture and method embodiments as described herein, may be implemented in computer software using programming techniques known in the art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

The invention claimed is:

1. A system architecture for energy industry trading and transaction management comprising:
    a business logic server-based layer including a parameter-based configuration of at least one business logic service configurable to enable a deployment of said system to be compatible with a respective business practice of at least one client customer, the at least one business logic service configured to support energy trading and transaction management and to utilize business rules operable on an event basis for processing via an application programming interface at least one of energy trading and transaction management data, including data specific to the at least one client customer;
    a database layer operatively connected to said business logic layer for storing the data processed by said business logic layer in a database;
    a security layer operatively connected to said configurable business logic server-based layer configured to filter requests to said configurable business logic layer according to a system security, wherein said security layer is configured to provide a secure access to said configurable business logic server-based layer, and wherein said business logic server-based layer is further configured to provide security at an object and client company level within said system architecture;
    a messaging layer operatively connected to said business logic layer configured to facilitate an extensible mark-up language based interchange and open messaging transport communication link between said business logic layer and another layer; and
    a presentation layer configured to receive at least one of a client request, a reporting request, a migration request, and a third party request;
    the messaging layer operatively connected between said presentation layer and said business logic layer, said messaging layer configured to facilitate an extensible mark-up language based interchange and open messaging transport communication link between said presentation layer and said business logic layer,
    wherein the business logic server based layer comprises an applications server comprising a hierarchy of components and a configuration file for configuring the hierarchy of components, each component in the hierarchy of components adapted to perform a different energy trading or energy transaction management service;
    wherein the messaging layer is adapted to receive a request via the presentation layer, transform the request to a compatible format, and to select, using a predetermined business rule, to route the transformed request either to a component in the hierarchy of components or to a third party application.

2. The system architecture of claim 1, wherein said business logic layer includes an applications server, and wherein said database layer includes a database server separate from the application server.

3. The system architecture of claim 2, wherein said business logic layer is further configured to provide flexibility, scalability, and extensibility with the use of parameter driven business rules.

4. The system architecture of claim 2, wherein said business logic layer is implemented as a hosted application service provider.

5. The system architecture of claim 2, wherein said system architecture is an open architecture configured for an ease of integration with a client system.

6. The system architecture of claim 2, wherein the parameter-based configuration includes base data attributes that are date effective.

7. The system architecture of claim 6, wherein the base data includes at least one of a business associate, facility, point, and accounts.

8. The system architecture of claim 7, wherein the base data further includes at least one of contract party data, deal party data, and transactional data that are rendered date effective.

9. The system architecture of claim 2, wherein the applications server includes a Java 2 Platform, Enterprise Edition architecture.

10. The system architecture of claim 2, wherein the database server is configured to operate in an application service provider mode.

11. The system architecture of claim 2, wherein the database server further includes security features for partitioning data within the database, and wherein the applications server is configured to communicate to the database server through database connectivity drivers.

12. The system architecture of claim 2, wherein said business logic layer further includes an object-relational mapping tool configured to provide access between said business logic layer and said database layer.

13. The system architecture of claim 12, wherein objects created by the object-relational mapping tool are used to query data in the database and to get query results back.

14. The system architecture of claim 1, wherein the hierarchy of components comprises at least a base component.

15. The system architecture of claim 14, wherein the base component is configured to maintain information about baseline data required by said system architecture, including at least one selected from the group consisting of counter-parties, pipelines, nomination points, meters, and units.

16. The system architecture of claim 14, wherein a next component in the hierarchy of components modules includes a deals component.

17. The system architecture of claim 16, wherein the deals component includes a contract sub-component configured to maintain information about at least one selected from the groups consisting of buy/sell, transportation, storage, pooling, and capacity release contracts that a client has with the client's customers; contracts and custody contracts containing base agreement information; specifications representing terms, points, quantities, and pricing details that are used for billings and payments; and pricing indices.

18. The system architecture of claim 16, wherein the deals component includes a deal making sub-component configured to maintain information about transactions and deals of a client, the transactions and deals including at least one selected from the groups consisting of buy and sell deals, broker commissions, multiple pipelines, point-level pricing, multi-component formula-base price calculations, and deal points, quantities and pricing details used for invoices and remittances.

19. The system architecture of claim 16, wherein a next component in the hierarchy of components includes an operations component.

20. The system architecture of claim 19, wherein the operations component includes a nomination sub-component configured to receive and/or create transportation, storage, pooling, and interconnection nominations, and to perform pool-to-pool transfers, the nomination sub-component further configured to process various nomination models.

21. The system architecture of claim 19, wherein the operations component includes a capacity management and confirmations sub-component configured to perform at least one selected from the groups consisting of schedule pipeline capacity and prioritize contractual volumes based on parameter driven scheduling and curtailment rules; enable a user to model a pipeline and to set constraint points and other criteria that permit tariff compliant reduction of flowing volumes; and obtain confirmation of nominated and/or scheduled quantities at the nomination point level by operator, agent, or shipper.

22. The system architecture of claim 19, wherein the operations component includes an allocations and balancing sub-component configured to perform at least one selected from the groups consisting of maintain allocations information including configurations of tiers, pre-determined allocation rules, and rules; and accept meter and point information and calculate imbalances and point variances based on nominated, scheduled, and measured volumes.

23. The system architecture of claim 19, wherein a next component in the hierarchy of components includes an accounting component.

24. The system architecture of claim 23, wherein the accounting component includes an accounting and settlement component configured to provide at least one selected from the groups consisting of provide necessary processing to consolidate all the contracts, deals, scheduling and allocations information for generating invoices and/or remittances for a client; support external penalty calculations configurable for differing pipeline tariffs; specify override rates and prices, process prior month adjustments, and calculate taxes; General Ledger account assignment, calculation of accruals for business not yet finalized, and support of interfaces to external General Ledger and Accounts Receivable systems.

25. The system architecture of claim 14, wherein the applications server includes a Java 2 Platform, Enterprise Edition architecture.

26. The system architecture of claim 25, wherein at least one component of the hierarchy of components includes: (i) a class factory, wherein the class factory is configured to establish for the respective component a category of objects defined by common properties of different objects that belong to the class, and (ii) at least one selected from the group consisting of: (a) an application programming interface enterprise java bean component operatively connected to an object-relational mapping tool, and (b) an application programming interface enterprise java bean component operatively connected to at least one selected from the group consisting of: (b1) an enterprise java bean enterprise java bean object, (b2) a data layer object, and (b3) at least one selected from the group consisting of a class factory and an application programming interface enterprise java bean component of another of the components in the hierarchy of components.

27. The system architecture of claim 26, wherein the class factory includes a base class factory configured to establish a category of base objects defined by common properties of different objects that belong to a the base class, wherein the base objects include at least one selected from the group consisting of counter-parties, pipelines, nomination points, meters, and units.

28. The system architecture of claim 26, wherein the class factory includes a deals class factory configured to establish a category of deals objects defined by common properties of different objects that belong to the deals class, wherein the deals objects include at least one selected from the group consisting of contracts, pricing, deal making, and transactions.

29. The system architecture of claim 26, wherein the class factory includes an operations class factory configured to establish a category of operations objects defined by common properties of different objects that belong to the operations class, wherein the operations objects include at least one selected from the group consisting of nominations, capacity management, capacity confirmations, allocations, and balancing.

30. The system architecture of claim 26, wherein the class factory includes an accounting class factory configured to establish a category of accounting objects defined by common properties of different objects that belong to the accounting class, wherein the accounting objects include at least one selected from the group consisting of invoices and remittances.

31. The system architecture of claim 26, wherein the object-relational mapping tool is configured to map objects to database tables in the database.

32. The system architecture of claim 26, wherein the data layer object is configured to communicate data to and from the database via database connectivity drivers.

33. The system architecture of claim 26, wherein the API enterprise java bean component is configured to establish a common interface of enterprise java bean enterprise java bean components.

34. The system architecture of claim 33, wherein the application programming interface enterprise java bean component is further configured to execute an entity validation utility for validating incoming data prior to routing the data to an enterprise java bean enterprise java bean component.

35. The system architecture of claim 26, wherein the enterprise java bean enterprise java bean component is configured to act as a remote object to a calling application programming interface enterprise java bean component.

36. The system architecture of claim 35, wherein the enterprise java bean enterprise java bean component is further configured to carry out a parameter based business rule for a respective class.

37. The system architecture of claim 14, wherein the configuration file contains configuration information for the applications program, and responsive to an execution of the applications program, the applications program accesses the configuration file to identify parameters that are in effect for the at least one business logic service.

38. The system architecture of claim 1, wherein said business logic layer includes at least one component for performing the at least one business logic service, the business logic service including a parameter based configuration.

39. The system architecture of claim 38, wherein the parameter based configuration includes date and time effective attributes.

40. The system architecture of claim 1, wherein an event can include at least one of a client customer request, a transaction event, a third party event, and a system event.

41. The system architecture of claim 1, further comprising a simple object application protocol server operatively connected to said presentation layer and said messaging layer and configured to provide a message based protocol to carry an extensible markup language based payload for accessing the business logic layer.

42. The system architecture of claim 1, wherein said presentation layer includes a browser based web server presentation layer configured to construct Java Server Pages, handle java server pages requests, and provide a functional graphical user interface for handling web requests, said presentation layer further including a class factory and a configuration file, wherein the class factory is configured to establish a category of objects defined by common properties of different objects that belong to the class, and wherein a path of an incoming request to the business logic layer is dynamically determined as a function of the configuration file and the class factory, the path including either a direct call from the web server to the applications server or a proxy call from the web server, through said messaging layer, to the applications server.

43. The system architecture of claim 42, wherein the browser based web server presentation layer is further configured to deploy at least one item of web browser page content in a manner wherein the deployment of the content mimics a client/server operation.

44. The system architecture of claim 43, wherein deployment of the at least one item includes placing the at least one item into an ActiveX component within an HTML component.

45. The system architecture of claim 1, wherein said messaging layer is configured for one selected from the group consisting of: to enable an integration of an existing business system into said system architecture; to process at least one of a client request and a system request, wherein processing the request includes at least one of capturing the request, transforming the request, and routing the request to at least one destination selected from the group consisting of a legacy system destination and a system architecture destination; to implement a client specified business rule prior to accessing core business functionality within said business logic layer; to enable bi-directional communication between incompatible enterprise applications of a third party and said system architecture via messages across a common platform; and to enable bi-directional communications between enterprise java beans of said business logic layer and an external application.

46. The system architecture of claim 1, further comprising: a security layer operatively connected to said presentation layer and said business logic layer for providing a secure access to said presentation layer and said business layer.

47. The system architecture of claim 46, wherein said security layer is an lightweight directory access protocol compliant database server-based security layer configured to manage userids, passwords, and roles in said system.

48. The system architecture of claim 47, wherein said business logic layer includes a J2EE applications server, and wherein said database layer includes a database server separate from the application server, said security layer further including a means for handling EJB security, the security means operatively connected to said J2EE applications server for filtering requests to said J2EE application server, said security layer still further including an application level security means configured to render method level security on objects processed within the applications server.

49. The system architecture of claim 42, further including a secure sockets layer connection operatively connected between a client browser and a presentation layer GUI, wherein the secure SSL connection creates a unique session id and wherein said messaging layer is further configured to call an appropriate enterprise bean within the business logic layer under correct credentials in response to the userid, password, and session id.

50. The system architecture of claim 1, wherein said business logic layer includes an applications server, the applications server including a Java 2 Platform, Enterprise Edition architecture, the applications server for running an applications program of a hierarchy of components, the applications server further including a configuration file adapted to configure the hierarchy of components or use in the parameter-based configuration of the at least one business logic service, the hierarchy of components including a base component, a deals component, an operations component, and an accounting component, and wherein said database layer includes a database server separate from the application server, said system architecture further comprising: a presentation layer configured to receive at least one of a client request, a reporting request, a migration request, and a third party request; a messaging layer operatively connected between said presentation layer and said business logic layer, said messaging layer configured to facilitate an XML-based interchange and open messaging transport communication link between said presentation layer and said business logic layer; and a security layer operatively connected to said presentation layer and said business logic layer for providing a secure access to said presentation layer and said business layer.

51. The system architecture of claim 16, wherein the deals component includes a pricing engine configured to perform at least one of price formulas, quantity formulas, indexes, tiers, and a price resolver, the pricing engine further configured to be common across multiple aspects of a respective business.

52. The system architecture of claim 16, wherein the deals component includes an inventory engine configured to perform at least one of tracking inventory, valuing inventory, accessing charges, and assessing penalties, the inventory engine further configured to cover multiple inventory requirements across a respective business.

* * * * *